(12) United States Patent
Yamashita et al.

(10) Patent No.: US 8,306,387 B2
(45) Date of Patent: Nov. 6, 2012

(54) PLAY BACK APPARATUS, PLAYBACK METHOD AND PROGRAM FOR PLAYING BACK 3D VIDEO

(75) Inventors: Ken Yamashita, Nara (JP); Germano Leichsenring, Osaka (JP)

(73) Assignee: Panasonic Corporation, Osaka (JP)

( * ) Notice: Subject to any disclaimer, the term of this patent is extended or adjusted under 35 U.S.C. 154(b) by 481 days.

(21) Appl. No.: 12/508,207

(22) Filed: Jul. 23, 2009

(65) Prior Publication Data

US 2010/0021141 A1 Jan. 28, 2010

Related U.S. Application Data

(60) Provisional application No. 61/111,045, filed on Nov. 4, 2008.

(30) Foreign Application Priority Data

Jul. 24, 2008 (JP) .................................. 2008-190525
Apr. 20, 2009 (JP) .................................. 2009-101846

(51) Int. Cl.
*H04N 9/80* (2006.01)
*H04N 9/70* (2006.01)

(52) U.S. Cl. ........................................ 386/239; 386/300
(58) Field of Classification Search .................. None
See application file for complete search history.

(56) References Cited

U.S. PATENT DOCUMENTS

| | | | |
|---|---|---|---|
| 7,986,866 B2 * | 7/2011 | Tanaka et al. | 386/248 |
| 2002/0118275 A1 * | 8/2002 | Harman | 348/51 |
| 2007/0195082 A1 | 8/2007 | Takanashi et al. | |
| 2007/0286575 A1 | 12/2007 | Oashi et al. | |
| 2008/0036854 A1 | 2/2008 | Elliott et al. | |
| 2008/0145031 A1 | 6/2008 | Tanaka et al. | |
| 2009/0060476 A1 | 3/2009 | Iwamoto et al. | |
| 2009/0190773 A1 | 7/2009 | Katayama et al. | |
| 2009/0202228 A1 | 8/2009 | Tanaka et al. | |
| 2009/0231968 A1 | 9/2009 | Ochi et al. | |
| 2010/0118119 A1 | 5/2010 | Newton et al. | |

FOREIGN PATENT DOCUMENTS

JP 2003-146016 5/2003
(Continued)

OTHER PUBLICATIONS

Lenny Lipton, "Foundations of the Stereoscopic Cinema a Study in Depth", pp. 260-262.
International Search Report in PCT/JP2009/003467, dated Oct. 27, 2009.
International Preliminary Examination Report in PCT/JP2009/003467, dated Aug. 23, 2010.

*Primary Examiner* — William C Vaughn, Jr.
*Assistant Examiner* — Asher Khan
(74) *Attorney, Agent, or Firm* — Greenblum & Bernstein, P.L.C.

(57) ABSTRACT

The playback apparatus realizes stereoscopic viewing by overlaying planar or stereoscopic graphics over stereoscopic video in a way that reduces eye strain using following method in abstract: A graphics plane holds therein data composed of graphics data. A shift engine shifts, in a case when a composition unit composites the graphics data with a left-view video frame, coordinates of each of the pixels is shifted in a first horizontal direction, and in a case when the composition unit composites the graphics data with a right-view video frame, coordinates of each of the pixels is shifted in a second horizontal direction that is opposite to the first direction.

7 Claims, 42 Drawing Sheets

FOREIGN PATENT DOCUMENTS

| | | |
|---|---|---|
| JP | 2003-211921 | 7/2003 |
| JP | 2004-104742 | 4/2004 |
| JP | 2004-208255 | 7/2004 |
| JP | 2004-274125 | 9/2004 |
| JP | 2005-297880 | 10/2005 |
| JP | 2007-200227 | 8/2007 |
| WO | 2005/119675 | 12/2005 |
| WO | 2008/044191 | 4/2008 |

\* cited by examiner

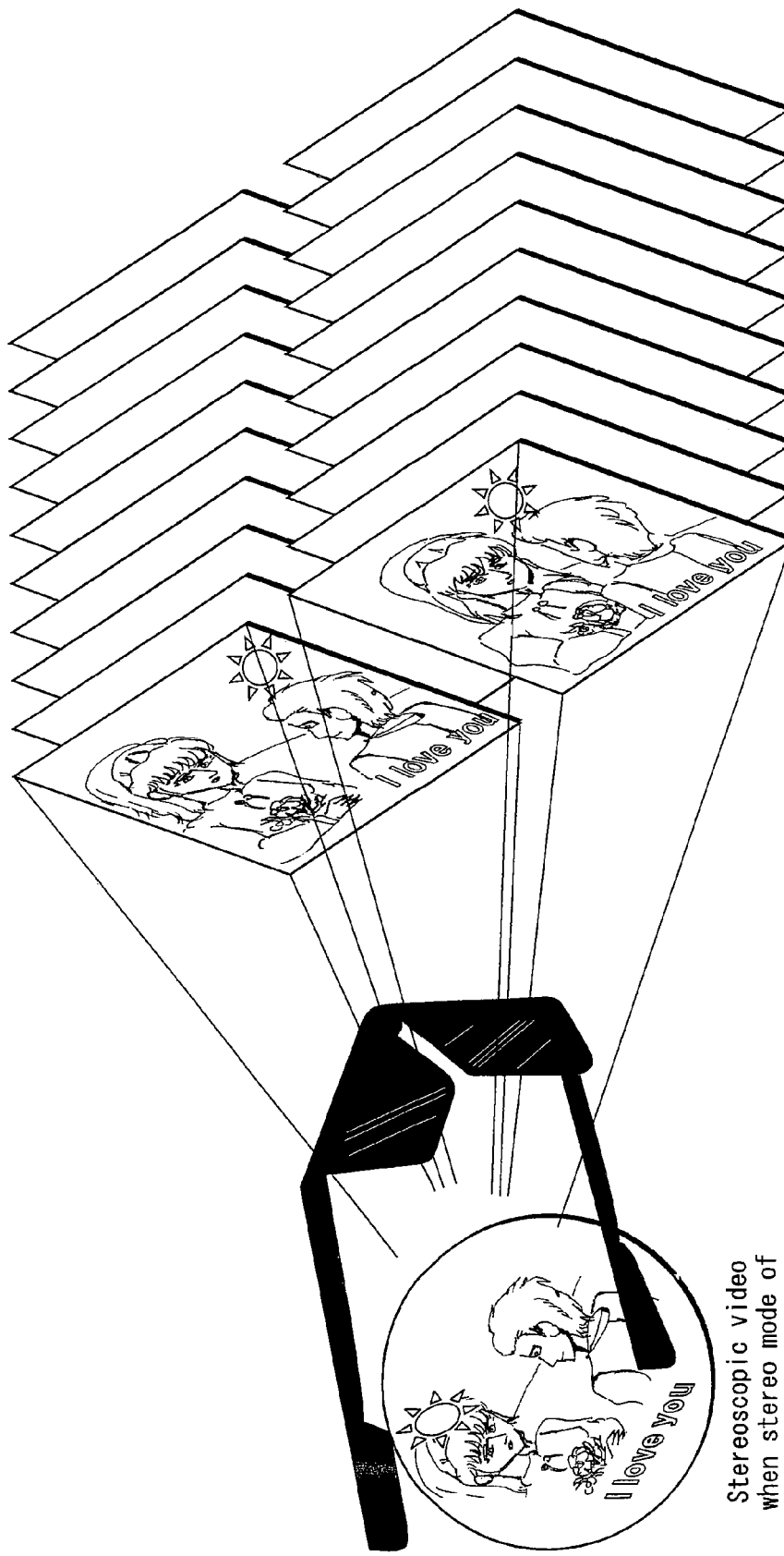

□ ···8-bit area (storing pixel code showing YCrCbα)

| Y value | Cr value | Cb value | Transmittance α |
|---|---|---|---|

□ ···Transparent pixel   Shown by pixel code showing transparent color

■ ···Colored Pixel   Shown by pixel code showing non-transparent color

Shift to right by 15 pixels

Shift to left by 15 pixels

Graphics plane reserved with resolution code = 3

□ ⋯Transparent pixel    Shown by RGB value showing transparent color
■ ⋯Colored pixel        Shown by RGB value showing non-transparent color Shift to right by 15 pixels Shift to left by 15 pixels

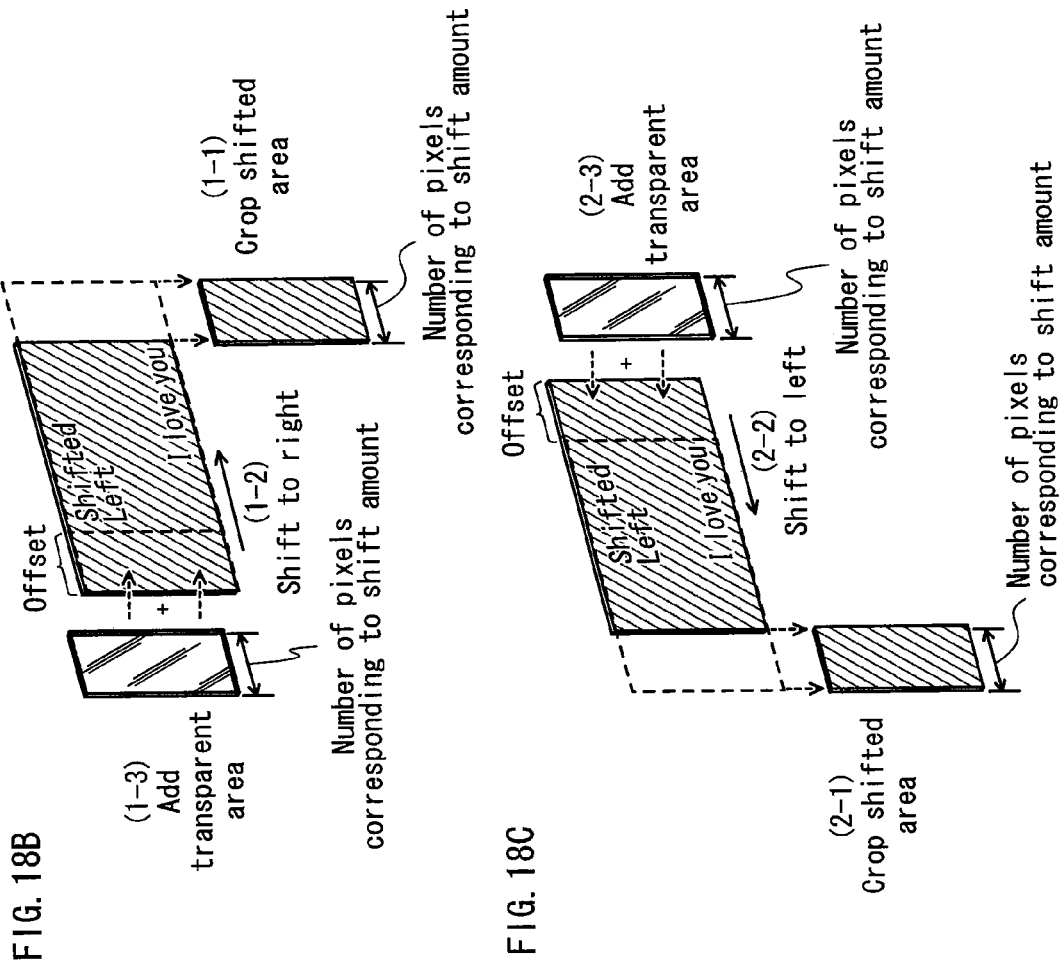
FIG. 18B
FIG. 18C
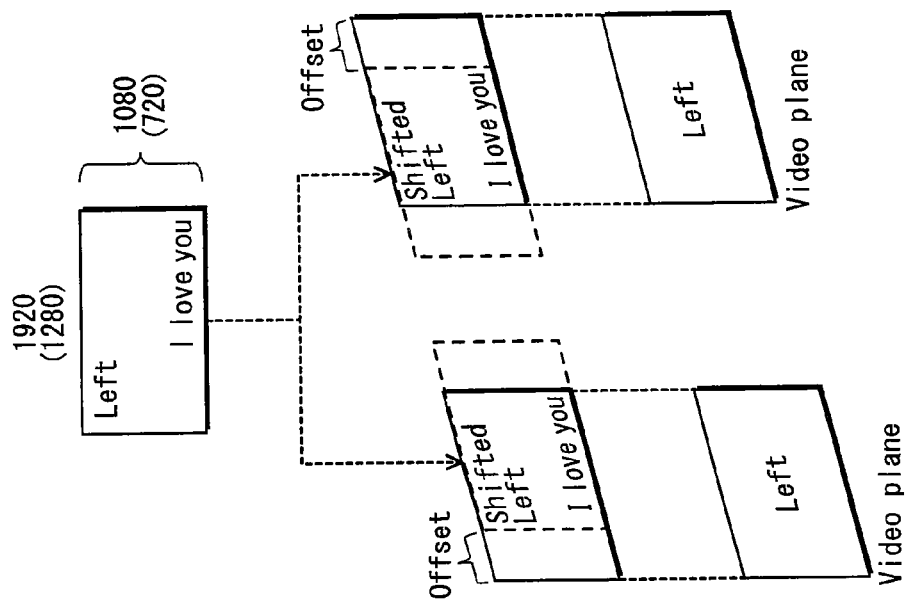
FIG. 18A

FIG. 21

| 0001 | 0002 | 0003 | 0004 | | 07A5 | 07A6 | 07A7 | 07A8 |
|---|---|---|---|---|---|---|---|---|
| (0,0) | (1,0) | (2,0) | (3,0) | ... | (1916,0) | (1917,0) | (1918,0) | (1919,0) |

| 07A9 | 07AA | 07AB | 07AC | | OEE9 | OEEA | OEEB | OEEC |
|---|---|---|---|---|---|---|---|---|
| (0,1) | (1,1) | (2,1) | (3,1) | ... | (1916,1) | (1917,1) | (1918,1) | (1919,1) |

| OEED | OEEE | OEEF | OEF0 | | 1677 | 1678 | 1679 | 1680 |
|---|---|---|---|---|---|---|---|---|
| (0,2) | (1,2) | (3,2) | (4,2) | ... | (1916,2) | (1917,2) | (1918,2) | (1919,2) |

| 1681 | 1682 | 1683 | 1684 | | 1DFD | 1DFE | 1DFE | 1E00 |
|---|---|---|---|---|---|---|---|---|
| (0,3) | (0,3) | (3,3) | (4,3) | ... | (1916,3) | (1917,3) | (1918,3) | (1919,3) |

Addresses of memory elements in plane memory

☐ : Memory element   (xx, yy) : Coordinates of each pixel data stored in memory element

FIG. 22A Shift to right with plane offset being "3"
FIG. 22B Shift to left with plane offset being "3"

FIG. 25

| Display mode immediately before selection of current title | Type of auto start playlist of selected current title | Default resolution value written in BDJO | Display mode and initial display setting in current title |
|---|---|---|---|
| 3D | 3D playlist 1920x1080 | N/A | 3D output (1920x1080) |
| 3D | 3D playlist 1280x720 | | 3D output (1280x720) |
| 3D | 2D playlist 1920x1080 | | 2D output (1920x1080) |
| 3D | 2D playlist 1280x720 | | 2D output (1280x720) |
| 3D | 2D playlist 720x576 | | 2D output (720x576) |
| 3D | 3D playlist 720x480 | | 2D output (720x480) |
| 2D | 3D playlist 1920x1080 | | 2D output (1920x1080) |
| 2D | 3D playlist 1280x720 | | 2D output (1280x720) |
| 2D | 2D playlist 1920x1080 | | 2D output (1920x1080) |
| 2D | 3D playlist 1280x720 | | 2D output (1280x720) |
| 2D | 3D playlist 720x576 | | 2D output (720x576) |
| 2D | 3D playlist 720x480 | | 2D output (720x480) |
| 2D | No auto start PL | HD_1920x1080 | 2D output (1920x1080) |
| 2D | | HD_1280x720 | 2D output (1280x720) |
| 2D | | QHD_960x540 | 2D output (960x540) |
| 2D | | SD | 2D output (720x576 or 720x480) |
| 2D | | SD_50HZ_720_576 | 2D output (720x576) |
| 2D | | SD_60HZ_720_480 | 2D output (720x480) |
| 2D | | HD3D_1920x1080 | 3D output (1920x1080) |
| 2D | | HD3D_1280x720 | 3D output (1280x720) |
| 3D | | HD_1920x1080 | 2D output (1920x1080) |
| 3D | | HD_1280x720 | 2D output (1280x720) |
| 3D | | QHD_960x540 | 2D output (960x540) |
| 3D | | SD | 2D output (720x576 or 720x480) |
| 3D | | SD_50HZ_720_576 | 2D output (720x576) |
| 3D | | SD_60HZ_720_480 | 2D output (720x480) |
| 3D | | HD3D_1920x1080 | 3D output (1920x1080) |
| 3D | | HD3D_1280x720 | 3D output (1280x720) |

FIG. 26

| Current status | | Action | Result |
|---|---|---|---|
| Display mode | Type of playlist during playback | Processing that affects display mode | Final display mode |
| 2D | No playlist | Playback of 2D playlist | 2D |
| 2D | No playlist | Playback of 3D playlist | 2D |
| 3D | No playlist | Playback of 2D playlist | 2D |
| 3D | No playlist | Playback of 3D playlist | 3D |
| 2D | No playlist | Set 2D display mode by application | 2D |
| 2D | 2D playlist | Set 2D display mode by application | 2D |
| 2D | 3D playlist | Set 2D display mode by application | 2D |
| 3D | No playlist | Set 2D display mode by application | 2D |
| 3D | 2D playlist | Set 2D display mode by application | (Note1) |
| 3D | 3D playlist | Set 2D display mode by application | 2D |
| 2D | No playlist | Set 3D display mode by application | 3D |
| 2D | 2D playlist | Set 3D display mode by application | 2D (Note1) |
| 2D | 3D playlist | Set 3D display mode by application | 3D |
| 3D | No playlist | Set 3D display mode by application | 3D |
| 3D | 2D playlist | Set 3D display mode by application | (Note1) |
| 3D | 3D playlist | Set 3D display mode by application | 3D |

Note1:Prohibit 2D playlist in 3D display mode

FIG. 32
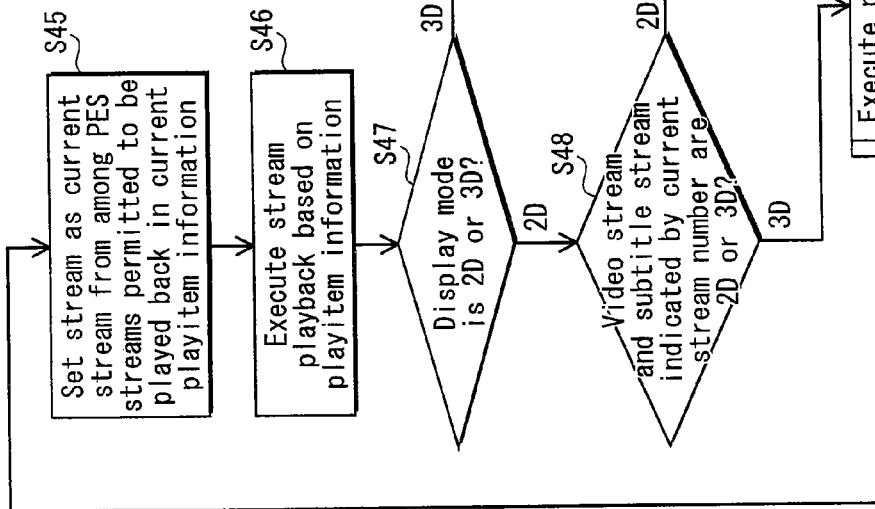
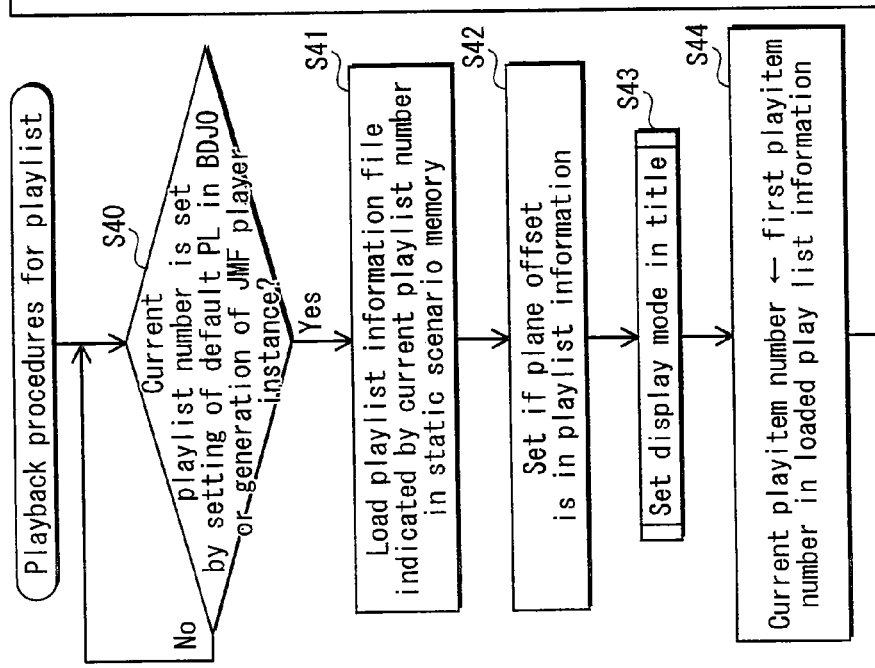

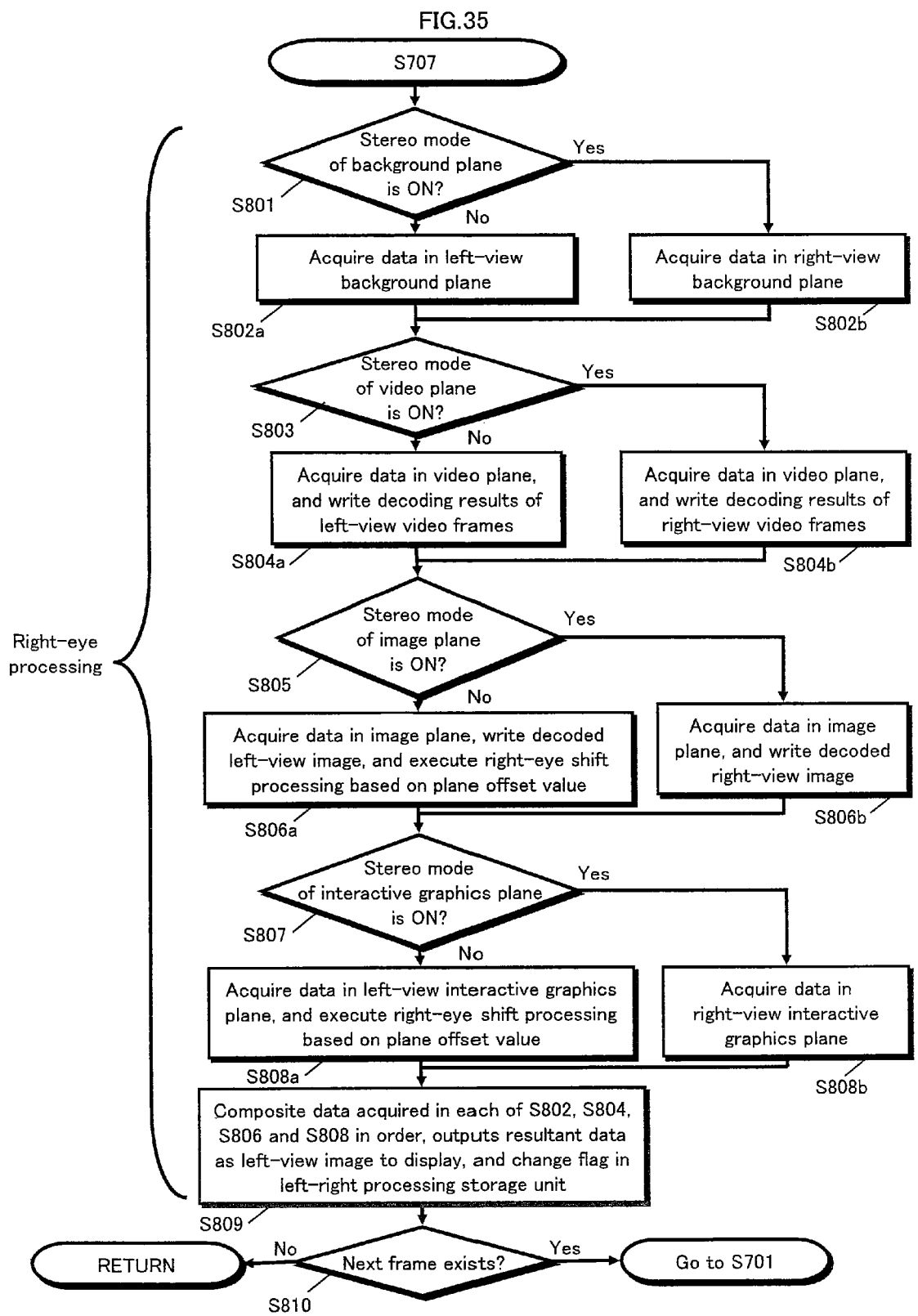

FIG. 39A
Memory element row on yth line in graphics plane

| (0,y) | (1,y) | (2,y) | ... | (F,y) | (F+1,y) | ... | (1919,y) |

FIG. 39B
Memory element row in line memory — Contents to be read to line buffer when offset is "F pixels", and shifting is performed in − direction

| (F+1,y) | (F+2,y) | (F+3,y) | ... | (1919,y) |

F pixels worth of empty space

Coordinates of each pixel on yth line → (0,y) (1,y) (2,y) ... (F,y)

FIG. 39C
Memory element row in line memory — Addition when offset is "F pixels"

| (F+1,y) | (F+2,y) | (F+3,y) | ... | (1919,y) | Pixel data showing transparent color | Pixel data showing transparent color | Pixel data showing transparent color | Pixel data showing transparent color |

F pixels worth of pixel data pieces showing transparent colors

Coordinates of each pixel on yth line → (0,y) (1,y) (2,y) ... (F,y)

FIG. 40A

Memory element row on yth line in graphics plane

| (0, y) | (1, y) | (2, y) | ... | (F, y) | (F+1, y) | ... | (1919, y) |
|---|---|---|---|---|---|---|---|

FIG. 40B

Memory element row in line memory — Contents to be read to line buffer when offset is "F pixels", and shifting is performed in + direction

| | | | | | (0, y) | (1, y) | (2, y) | ... | (1919−f, y) |
|---|---|---|---|---|---|---|---|---|---|
| | (1, y) | ... | (F, y) | | | | | | |

⎫ F pixels worth of empty space

Coordinates of each pixel on yth line → (0, y)

FIG. 40C

Memory element row in line memory — Addition when offset is "F pixels"

| Pixel data showing transparent color | Pixel data showing transparent color | ... | Pixel data showing transparent color | (0, y) | (1, y) | (2, y) | ... | (1919−f, y) |
|---|---|---|---|---|---|---|---|---|
| (1, y) | ... | (F, y) | | | | | | |

Coordinates of each pixel on yth line → (0, y)

PLAY BACK APPARATUS, PLAYBACK METHOD AND PROGRAM FOR PLAYING BACK 3D VIDEO

BACKGROUND OF THE INVENTION (1) Field of the Invention

The present invention belongs to a technical field of a graphics composition technique.

(2) Description of the Related Art

The graphics composition technique is a technique of compositing graphics such as subtitles or a GUI, to each frame of video which constructs a video stream, then displaying the result. As a technical trend of display device, displays that can display stereoscopic video as well as planar video are becoming popular. Various methods of stereoscopic viewing are adopted in the stereoscopic display devices, however, nearly all of the methods use the basic principle of displaying each of left eye and a right eye a different image to create stereoscopic effect, using binocular disparity.

In order to allow the viewers to view the stereoscopic video at the same frame rate as normal planar video, response performance twice as high as response performance needed for the normal planar video is necessary. This means, for example, that it is necessary to switch-among at least 120 frames per second in order to display video consisting of 60 frames per second.

Accordingly, the video stream to be displayed needs to be encoded at 120 frames per second. A stereoscopic effect may also be obtained without increasing the frame rate, by using a side-by-side method as described in a Non-Patent Document 1 or checker pattern method as described in Patent Document 2.

There is also, a technique known to generate stereoscopic images, that extracts information indicating the number of objects from a 2D video, then creating the number of layers corresponding to the number of objects so stereoscopic images can be generated by changing the depth of each of the layers as disclosed in a Patent Document 3.

PRIOR ART DOCUMENTS

Patent Documents

[Patent Document 1] International Publication No. 2005/119675 pamphlet
[Patent Document 2] US Patent Application Publication No. 2008-0036854
[Patent Document 3] US Patent Application Publication No. 2002-0118275

Non-Patent Document

[Non-Patent Document 1] FOUNDATIONS OF THE STEREOSCOPIC CINEMA. A STUDY IN DEPTH (by Lenny LIPTON)

SUMMARY OF THE INVENTION

The Problems to be Solved by the Invention

As the situation now stands, application of a method of allowing viewers to enjoy viewing video streams stereoscopically is mainly engaged at theaters and the like. However, it is expected that it will be common for the viewers to enjoy viewing the stereoscopic video streams with use of playback apparatuses for household use in the future.

In package media such as BD-ROMs and DVD-videos, subtitles are not pre-embedded as part of video like the movies. In package media, plurality of subtitle data corresponding to plurality of languages is recorded separately from a video stream. This is because it is necessary to composite appropriate subtitle data with a video in accordance with a language setting in a playback apparatus, and to display data obtained as a result of the composition.

Also, according to graphics for realizing the GUI, a plurality of pieces of graphics data is recorded separately from the video stream. This is also because it is necessary to composite appropriate graphics data with a video in accordance with a language setting in a playback apparatus, and to display data obtained as a result of the composition. In this case, it is desirable that both of data for a left view (left-view data) and data for a right view (right-view data) are prepared for each of graphics showing subtitles, and graphics showing the GUI. However, since BD-ROMs have limited capacity, it may not be possible to prepare both the left-view data and the right-view data for each of the video and the graphics.

In a case where only one of the left-view data or the right-view data can be prepared for the graphics, the graphics will appear to be flat while the video corresponding to the stereoscopic video stream can be viewed stereoscopically. Suppose that the planar graphics is composited with the stereoscopic video stream without the consideration of spacing caused by the stereoscopic effect of displaying separate left-view video and right-view video data. In such case, a flat graphics will appear within a stereoscopic video as a result of composition. As a result, the graphics will appear to be buried into the stereoscopic video, which in turn will cause displeasure to the viewers. This is caused by the eyes not being able to adjust to an unnatural stereoscopic composition not seen in real life, leading to decrease in realistic sensation.

The present invention has an objective to provide a playback apparatus that is capable of executing stereoscopic playback by performing composition of the video and the graphics so as to prevent viewers from feeling uncomfortable despite when only graphics for one eye, either graphics for left view (left-view graphics) or graphics for right view (right-view graphics), is recorded on a recording medium.

Means to Solve the Problems

In order to solve the above-stated problem, the present invention is a playback apparatus that executes stereoscopic playback, the playback apparatus comprising: a video decoder operable to decode a video stream to obtain video frames; a video plane that holds therein the video frames; a graphics plane that holds therein graphics data, the graphics data having a resolution of a predetermined number of horizontal and vertical pixels; a composition unit operable to composite the graphics data within the graphics plane with one of the video frames; and a shift engine operable to perform plane shifting of the graphics plane, wherein each of the video frames in the video plane is outputted as a right-view video frame or a left-view video frame, and the stated plane shifting of the graphics plane is defined as; prior to outputting the left-view video frame, shifting each of the pixels of the graphics data within the graphics plane in a right or a left direction, and prior to outputting the right-view video frame, shifting each of the pixels of the graphics data within the graphics plane in an opposite direction from left view, and then giving the resulted shifted graphics data within the graphics plane to the composition unit for the composition.

Effects of the Invention

By shifting the coordinates of each of the pixel data pieces held in the graphics plane (hereinafter, referred to as "plane shifting of the graphics plane), it will become possible to adjust the depth position of the graphics to be displayed. The stated depth position meaning how close or far the objects on the plane will appear to the user in accordance to the display depth. Therefore, even in a case where subtitles and GUI appear to be buried in the stereoscopic video because both of the right-view graphics (right-view interactive graphics) and the left-view graphics (left-view interactive graphics) are not provided in a recording medium, a more natural stereoscopic composition (graphics depth position is closer to the viewer than the video depth position) can be achieved. Since the depth position of the subtitles and GUI are changed by such an adjustment, it is not necessary to prepare both the left-view graphics and the right-view graphics and only prepare 2D graphics for displaying the subtitles and the GUI stereoscopically or adding the depths thereto. Therefore, even in a case where a BD-ROM whose capacity is limited is a target for the playback, it is possible to provide the user with preferable stereoscopic view.

Also for authoring purposes, it will become possible to re-use the graphics for 2D playback, thus will be able to skip the conversion process of stereoscopic graphics (create a second view), resulting in a reduction of labor cost for generating stereoscopic contents.

Even when the depths of the graphics showing the subtitles and GUI are not appropriate, it is possible to change the depth of the graphics to an appropriate depth in accordance with the depth of video to be outputted, by performing the above-stated shifting. Therefore, the graphics to which the depth is added appears to be natural, and there will be no difference in how the video and the graphics showing the subtitles and GUI appear stereoscopically. Therefore, stress caused to the naked eyes of the viewers is reduced.

Also, since it is not necessary to load the left-view graphics and the right-view graphics in a memory separately, the memory capacity of the playback apparatus will not be consumed even when an image obtained by compositing the video with the graphics is displayed stereoscopically.

With the above-stated structure, the stereoscopic video playback apparatus pertaining to the present invention can stereoscopically display the subtitles and the GUI on the video even if both of the left-view graphics and right-view graphics are not prepared.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 8 shows how data in a background plane, data in a video plane 6, data in an image plane 8 and data in an interactive graphics plane 10 are composited when stereo modes of all the planes are ON;

FIG. 12 shows an example of how the stereoscopic video appears when the viewer sees, through shutter glasses 500, an image that is outputted when the stereo mode of the video plane 6 is ON, and the stereo modes of other planes are OFF is viewed;

Each of FIG. 16A

FIG. 18A, FIG. 18B and FIG. 18C show processing procedures for shifting the coordinates of each pixel data piece held in the image plane 8;

FIG. 21 shows pixel data pieces in the graphics plane;

Each of FIG. 22A and FIG. 22B shows what is held in the graphics plane after the plane shift engine 19 shifts the coordinates of each of the pixel data pieces;

FIG. 25 shows, in a table, changes in display modes when a title is changed;

FIG. 26 shows switching between display modes when a playlist being played back is changed in each title;

FIG. 32 shows a flowchart showing main procedures for playing back a playlist;

FIG. 35 shows a flowchart showing right-view processing for a 3D stream in the 3D display mode;

FIG. 39A, FIG. 38B and FIG. 38C show processes for executing a shifting of each line data in the right direction;

FIG. 40A, FIG. 40B and FIG. 40C show processes for executing shifting of coordinates of each pixel data piece in each line data in the plane in the left direction;

DESCRIPTION OF PREFERRED EMBODIMENT

The following describes the embodiments of a recording medium and a playback apparatus 200 having the above-stated Means to Solve the Problems with reference to the drawings.

Figure 1:
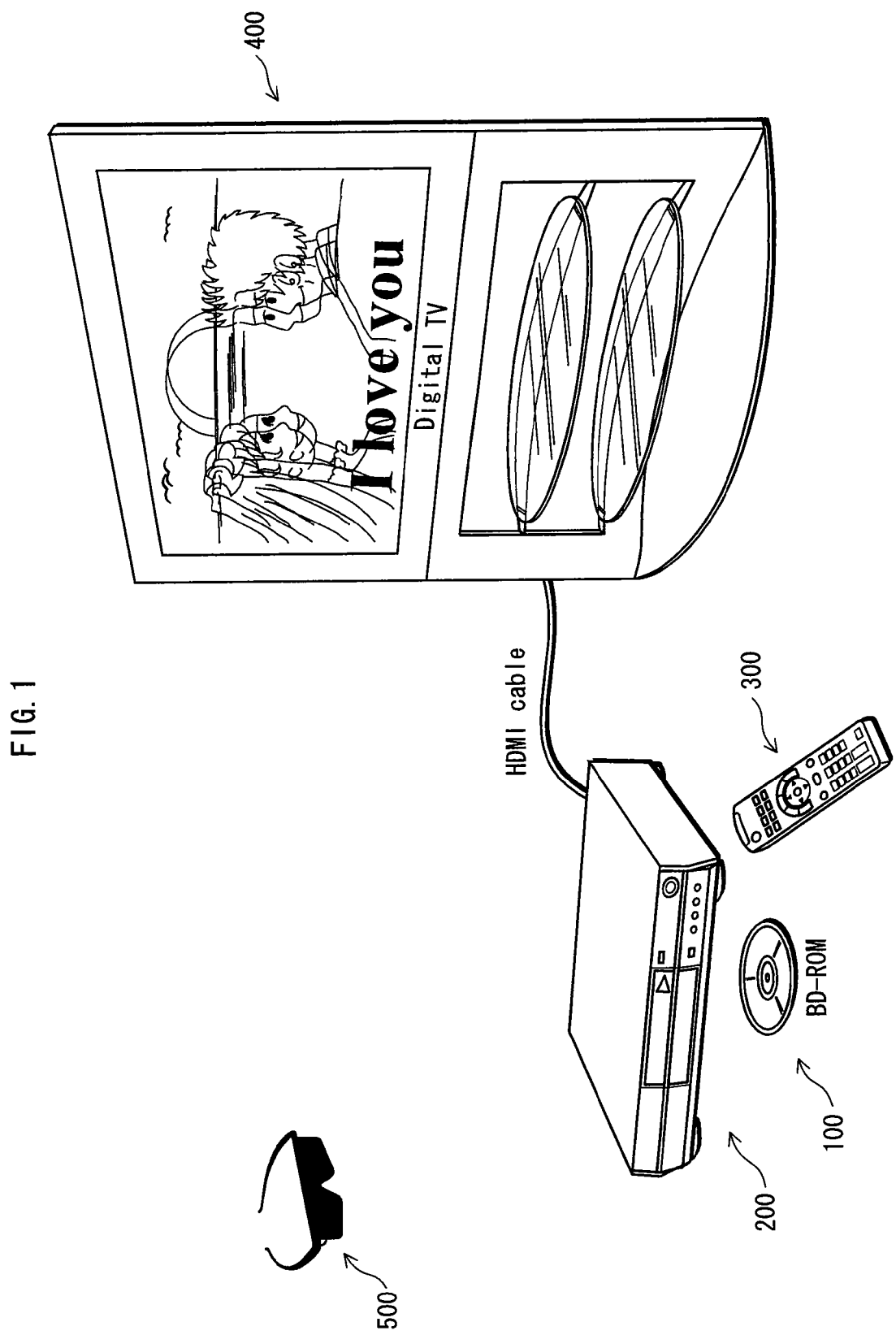
FIG. 1 shows a usage pattern of a recording medium and a playback apparatus 200.

FIG. 1 shows a usage pattern of the recording medium and the playback apparatus 200. As shown in FIG. 1, a BD-ROM 100 (taken as an example of recording medium) and a playback apparatus 200 compose a home theater system together with a remote control 300, TV 400 and liquid crystal shutter glasses 500, and are used by a user.

The BD-ROM 100 provides the above-stated home theater system with a movie, for example.

The playback apparatus 200 is connected to the TV 400, and plays back the BD-ROM 100.

The remote control 300 is a device that receives an operation for the hierarchized GUI from the user. In order to receive such an operation, the remote control 100 includes: a menu key for calling menus composing the GUI; an arrow key for moving a focus of the GUI parts composing each menu; a decision key for performing determined operation on the GUI parts composing each menu; a return key for returning to higher order hierarchized menus; and a numerical key.

The TV 400 provides the user with a dialogical operational environment by displaying the playback picture of the movie, a menu and the like.

The liquid crystal shutter glasses 500 are composed of crystal liquid shutters and a control unit, and realize stereoscopic view with use of binocular disparity of the viewer's eyes. Lenses having a feature that the transmittance of light is changed by changing applied voltage are used for the crystal liquid shutters of the liquid crystal shutter glasses 500. The control unit of the liquid crystal shutter glasses 500 receives a SYNC signal for switching between a right-view image and a left-eye image that are transmitted from the playback apparatus 200, and switches between a first state and a second state in accordance with this SYNC signal.

In the first state, the control unit adjusts the applied voltage such that light does not transmit through a liquid crystal lens corresponding to the right view, and adjust the applied voltage such that light transmits through a liquid crystal lens corresponding to the left view. In such a state, only the left-view image is viewed.

In the second state, the control unit adjusts the applied voltage such that the liquid crystal lens corresponding to the right view transmits light, and adjusts the applied voltage such that the liquid crystal lens corresponding to the left view does not transmit light. In such a state, the crystal liquid shutters provide view of the right-view image.

Generally, the right-view image and left-view image look a little different due to differences between angles. With use of such a difference, the user can recognize an image as a stereoscopic image. Thus, the user confuses a planar display with a stereoscopic display by synchronizing timing of switching between the above-stated first state and second state with timing of switching between the right-view image and the left-view image. Next, a description is given of a time interval in displaying right-view video and left-view video.

Specifically, there is a difference between the right-view image and the left-view image that corresponds to binocular disparity of the user in a planar image. By displaying theses images while switching the images at a short time interval, the images appear as if the images are displayed stereoscopically.

The short time interval may be a time period just enough to confuse the user on planar images with stereoscopic images when the switching and the displaying are performed as stated in the above.

This concludes the description of the home theater system.

Figure 2:
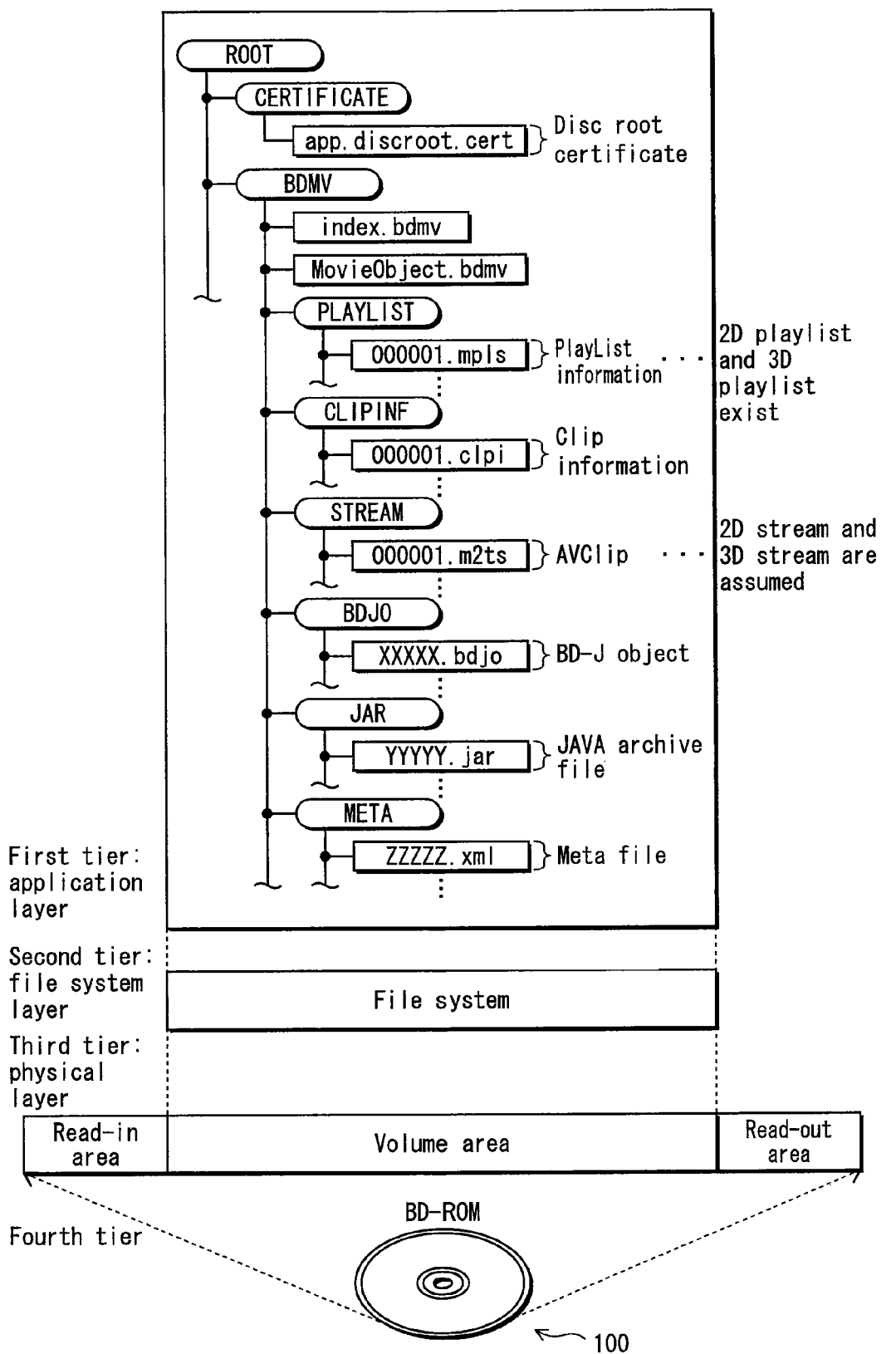
FIG. 2 shows an internal structure of a BD-ROM 100.

The following describes a recording medium to be played back by the playback apparatus 200. The playback apparatus 200 plays back the BD-ROM 100. FIG. 2 shows the internal structure of the BD-ROM 100.

The BD-ROM is shown in a fourth tier from the top in the present figure, and a track on the BD-ROM is shown in a third tier. Although the track is usually formed in a spiral manner from an inner circumference to an outer circumference, the track is drawn in a laterally-expanded manner in the present figure. This track consists of a read-in area, a volume area and a read-out area. Also, in the read-in area exists a special area called BCA (Burst Cutting Area) that can be read only by a drive. Since this area cannot be read by an application, this area is often used in copyright protection technology.

The volume area in the present figure has a layer model having a physical layer, a file system layer and an application layer. Application data such as image data starting with file system information (volume) is stored in the volume area. The file system is UDF, ISO9660 or the like. In the file system, it is possible to read logic data recorded in the same manner as a normal PC, with use of a directory or a file structure. Also, a file name or a directory name consisting of 255 words can be read. A top tier of FIG. 2 shows an application layer format (application format) of the BD-ROM expressed using a directory structure. As shown in the first tier, in the BD-ROM, a CERTIFICATE directory and a BDMV directory exists below the Root directory.

Below the CERTIFICATE directory, a file of a root certificate (app.discroot.certificate) of a disc exists. This app.discroot.certificate is a digital certificate used in a process that checks whether an application has been tampered, or identifies the application (hereinafter, signature verification) when executing a program of a JAVA™ application that performs dynamic scenario control using a JAVA™ virtual machine.

The BDMV directory is a directory in which data such as AV content and management information used in the BD-ROM are recorded. Six directories called "PLAYLIST directory", "CLIPINF directory", "STREAM directory", "BDJO directory", "JAR directory" and "META directory" exist below the BDMV directory. Also, two types of files (i.e. INDEX.BDMV and MovieObject.bdmv) are arrayed.

The STREAM directory is a directory storing a file which is a so-called transport stream body. A file (000001.m2ts) to which an extension "m2ts" is given exists in the STREAM directory.

A file (000001.mpls) to which an extension "mpls" is given exists in the PLAYLIST directory.

A file (000001.clpi) to which an extension "clpi" is given exists in the CLIPINF directory.

A file (XXXXX.bdjo) to which an extension "bdjo" is given exists in the BDJO directory.

A file (YYYYY.jar) to which an extension "jar" is given exists in the JAR directory.

An XML file (ZZZZZ.xml) exists in the META directory.

The following describes these files.

Firstly, a description is given of the file to which the extension "m2ts" is given. The file to which the extension "m2ts" is given is a digital AV stream in the MPEG-TS (Transport Stream) method, and is acquired by multiplexing a video stream, one or more audio streams, a graphics stream, a text subtitle stream and the like. The video stream represents moving part of the movie, and the audio stream represents audio part of the movie. In the case of the 3D stream, both of left-eye data and right-eye data may be included in m2ts, or m2ts may be prepared separately for each of the left-eye data and the right-eye data. It is preferable to use a codec (e.g. MPEG-4 AVC MVC) in which a left-view stream and a right-view stream refer to one another in order to save disc capacity used for streams. Video streams compressed and encoded with use of such a codec are called MVC video streams.

There are 2 types of MVC video streams, base view video stream and enhanced view video stream. The base view video stream is a video stream composing either the left view or the right view video that realizes planar view display. Meanwhile, the "enhanced view video stream" is the video stream that is used with the base view to construct stereoscopic video, composing the left or right view video that is not composed in the base view video stream. Picture data pieces composing the enhanced view video stream are compressed and encoded based on frame correlativity with picture data pieces composing the base view stream.

The file to which the extension "mpls" is given is a file storing PlayList (PL) information. The PL information defines a playlist referring to the AVClip.

In the present embodiment, it is possible to determine whether streams to be played back include a 3D video stream, based on a structural format of the PlayList (PL) stored on the BD-ROM.

The PlayList information includes MainPath information, Subpath information and PlayListMark information.

1) The MainPath information defines a logic playback section by defining at least one pair of a time point (In_Time) and a time point (Out_Time) on a playback time axis of the AV stream. The MainPath information has a stream number table (STN_table) that stipulates which elementary streams that have been multiplexed into AV stream are permitted to be played back and are not permitted to be played back.

2) The PlayListMark information shows specification of a time point corresponding to a chapter in a part of the AV stream specified by the pair of the In_Time information and the Out_Time information.

3) The Subpath information is composed of at least one piece of SubPlayItem information. The SubPlayItem information includes information on specification of an elementary stream to be played back in synchronization with the AV stream, and includes a pair of In_Time information and Out_Time information on the playback time axis of the elementary stream. The Java™ application for controlling playback instructs a Java™ virtual machine to generate a JMF (Java Media Framework) player instance that plays back this PlayList information. This starts the playback of the AV stream.

The JMF player instance is actual data generated on a heap memory of the virtual machine based on the JMF player class.

Hereinafter, a stream including only a stream for 2D playback is referred to as a "2D stream", and a stream including both a 2D and 3D streams is referred to as a "3D stream".

Furthermore, according to a term definition, a 2D playlist is a playlist including only a stream for the 2D playback while a 3D playlist includes a stream for 3D viewing in addition to the 2D stream.

The file to which the extension "clpi" is given is Clip information which is in one to one correspondence with AVclip information. Since the Clip information is management information, the Clip information has an EP_map showing an encoding format of the stream in the AVClip, a frame rate, a bit rate, information on resolution and the like, and a starting point of GOPs. The Clip information and PL information are classified as "static scenario".

The following describes the file to which the extension "BD-J object" is given. The file to which the extension "BD-J object" is given is a file storing a BD-J object. The BD-J object is information that defines a title by association an AVClip string defined by the PlayList information with an application.

The entity of the Java™ application corresponds to a Java™ archive file (YYYYY.jar) stored in the JAR directory under the BDMV directory in FIG. 2.

The application is a Java™ application, and is composed of one or more xlet programs loaded in the heap area (also called "work memory") of the virtual machine. The application is composed of the xlet program loaded in the work memory and data.

In the meta file (ZZZZZ.xml) included in the META directory is stored various information pieces relating to the movie in the disc. Examples of information pieces stored in the meta file are a name of the disc and an image of the disc, information on who has created the disc, and a title name for each title. This concludes the description of the BD-RO 100. The meta file is not a prerequisite, and some BD-ROMs do not include this meta file. This concludes the description of the BD-ROM.

Figure 3:
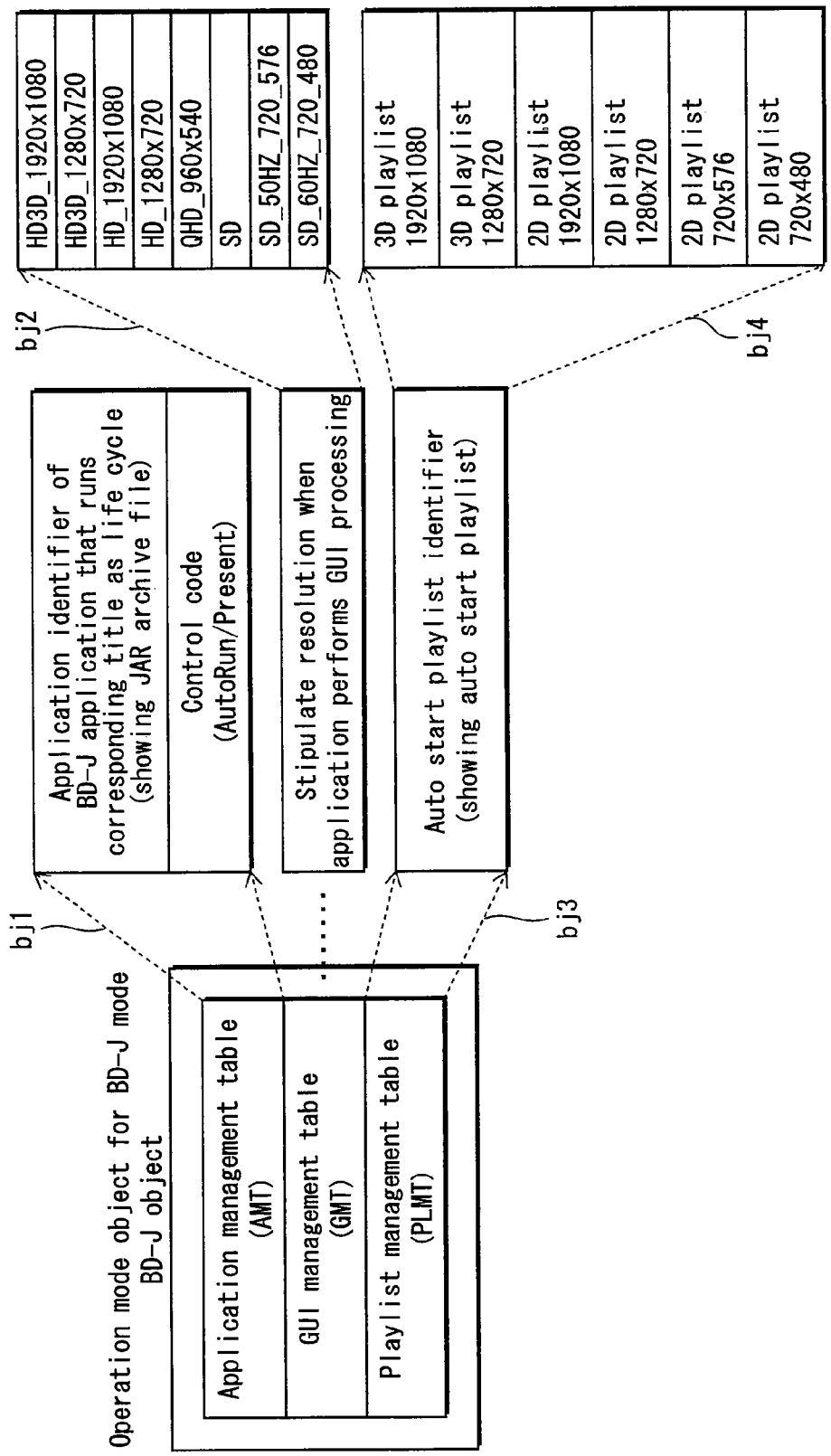
FIG. 3 shows an internal structure of a BD-J object.

The following describes the BD-J object. FIG. 3 shows the internal structure of the BD-J object. As shown in FIG. 3, the BD-J object is composed of an "application management table", a "GUI management table" and a "playlist management table".

The following describes these elements.

The "application management table" is a table for causing the playback apparatus 200 to perform application signaling that runs the title as a life cycle. A lead line bj1 shows the internal structure of the application management table in closeup. As shown in this lead line, the application management table includes an "application identifier" and a "control code" that specify an application to be operated when a title corresponding to the BD-J object becomes a current title. When the control code is set to AutoRun, the control code shows that this application is automatically started after the application is loaded on the heap memory. When the control code is set to Present, the control code waits for a call from another application, and shows whether the application should be operated after the application is loaded on the heap memory.

The "GUI management table" is a table used for GUI related operations by the application. More specifically, resolution, font data used, masking information when GUI for executing the menu call, or a title call is instructed by the user, is included. A lead line bj2 shows the internal structure of the GUI management table in closeup. As shown by this lead line bj2, the GUI management table may be set to one of HD3D_

1920×1080, HD3D_1280×720, HD_1920×1080, HD_1280×720, QHD960×540, SD, SD_50 HZ_720_576 and SD_60 HZ_720_480.

A lead line bj3 shows the internal structure of the playlist management table in closeup. The playlist management table includes information on specification of the playlist to be operated by default when a title corresponding to the BD-J object becomes a current title. A lead line bj4 shows the internal structure of a auto start playlist in closeup. As shown by the lead line bj4, 3D playlist 1920*1080, 3D playlist 1280*720, 2D playlist 1920*1080, 2D playlist1 1280*720, 2D playlist 720*576 and 2D playlist 720*480 may be specified as information specifying the auto start playlist.

Figure 4:
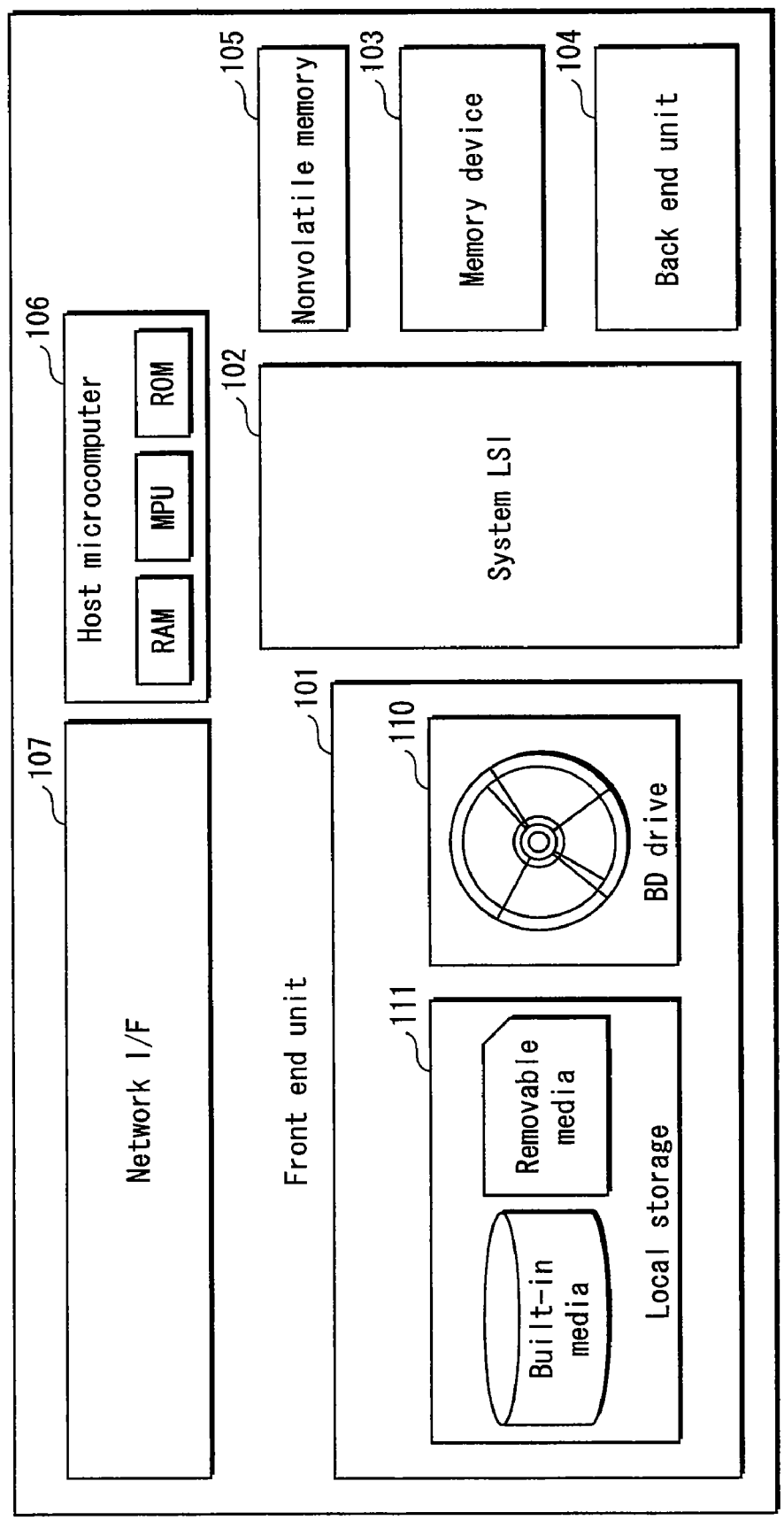
FIG. 4 shows an internal structure of the playback apparatus 200.

FIG. 4 shows the internal structure of the playback apparatus 200. A front end unit 101, a system LSI 102, a memory device 103, a back end unit 104, a nonvolatile memory 105, a host microcomputer 106 and a network I/F 107 mainly compose a playback apparatus 200 in FIG. 4.

The front end unit 101 is a data input source. In a figure described in the following, the front end unit 101 includes a BD drive 110 and a local storage 111, for example.

The system LSI 102 is composed of logic elements, and is a core part of the playback apparatus 200. This system LSI includes therein at least a demultiplexer 4, video decoders 5a and 5b, image decoders 7a and 7b, an audio decoder 9, a playback state/setting register (PSR: Player Status/Setting Register) set 12, a playback control engine 14, a composition unit 15, a plane shift engine 19 and an offset setting unit 20.

The memory device 103 is composed of arrays of memory devices such as an SDRAM.

The back end unit 104 is a connection interface that connects internal parts of the playback apparatus 200 with other devices.

The nonvolatile memory 105 is a readable and writable recording medium, and is a medium that can hold recorded contents without needing power source supply. The nonvolatile memory 105 is used for backup of information on a display mode stored in a display mode storage unit 24 (described in the following). A flash memory, an FeRAM or the like may be used as this nonvolatile memory 105.

The host microcomputer 106 is a core part of the playback apparatus 200, and is composed of an MPU, a ROM and a RAM. The host microcomputer 106 includes a BD-J platform 22 and a command interpreter 25 from among the elements specifically described in the following.

The network interface 107 is for performing communication with an external device outside the playback apparatus 200, and is capable of accessing a server accessible via the Web, and accessing a server connected by a local network. For example, the network interface 107 is used for downloading BD-ROM additional contents publicized on the web. The BD-ROM additional content is content that is not stored in an original BD-ROM, examples of which are additional sub audio, subtitles, special features and an application. It is possible to control the network interface 107 from the BD-J platform, and to download, in the local storage 111, the additional content publicized on the web.

As stated in the above, the front end unit 101 includes the BD drive 110 and the local storage 111, for example.

The BD drive 110 includes, for example, a semiconductor laser (not shown), collimator lenses (not shown), a beam splitter (not shown), an objective lens (not shown), a condenser lens (not shown), an optical head (not shown) including a light detector (not shown). Light beam outputted from the semiconductor laser is collected on a information side of the optical disc through the collimator lenses, the beam splitter and the objective lens. The collected light beam is reflected and diffracted on the optical disc, and then collected by the light detector through the objective lenses, the beam splitter and the condenser lenses. The generated signal corresponds to data read from the BD-ROM in accordance with the amount of light collected on the light detector.

The local storage 111 includes a built-in media and a removable media, and is used for storing the downloaded additional contents and data used by the application. A storage area for the additional contents is provided for each BD-ROM, and an area that can be used for storing data is provided for each application. Also, merge management information, which is a merge rule regarding how the downloaded additional contents are merged with the data on the BD-ROM, is also stored in the built-in media and the removable media.

The built-in media is a writable recording medium such as a hard disk drive and a memory built in the playback apparatus 200.

The removable medium is a portable recording medium, for example, and is preferably a portable semiconductor memory card such as an SD card.

A description is given taking a case where the removable media is a semiconductor memory card as an example. The playback apparatus 200 is provided with a slot (not shown) into which the removable media is inserted, and an interface (e.g. memory card I/F) for reading the removable area inserted into the slot. When the semiconductor memory is inserted into the slot, the removable media and the playback apparatus 200 are electrically connected to each other, and it is possible to convert data recorded in the semiconductor memory into an electrical signal and read the electrical signal with use of the interface (e.g. memory card I/F).

Figure 5:
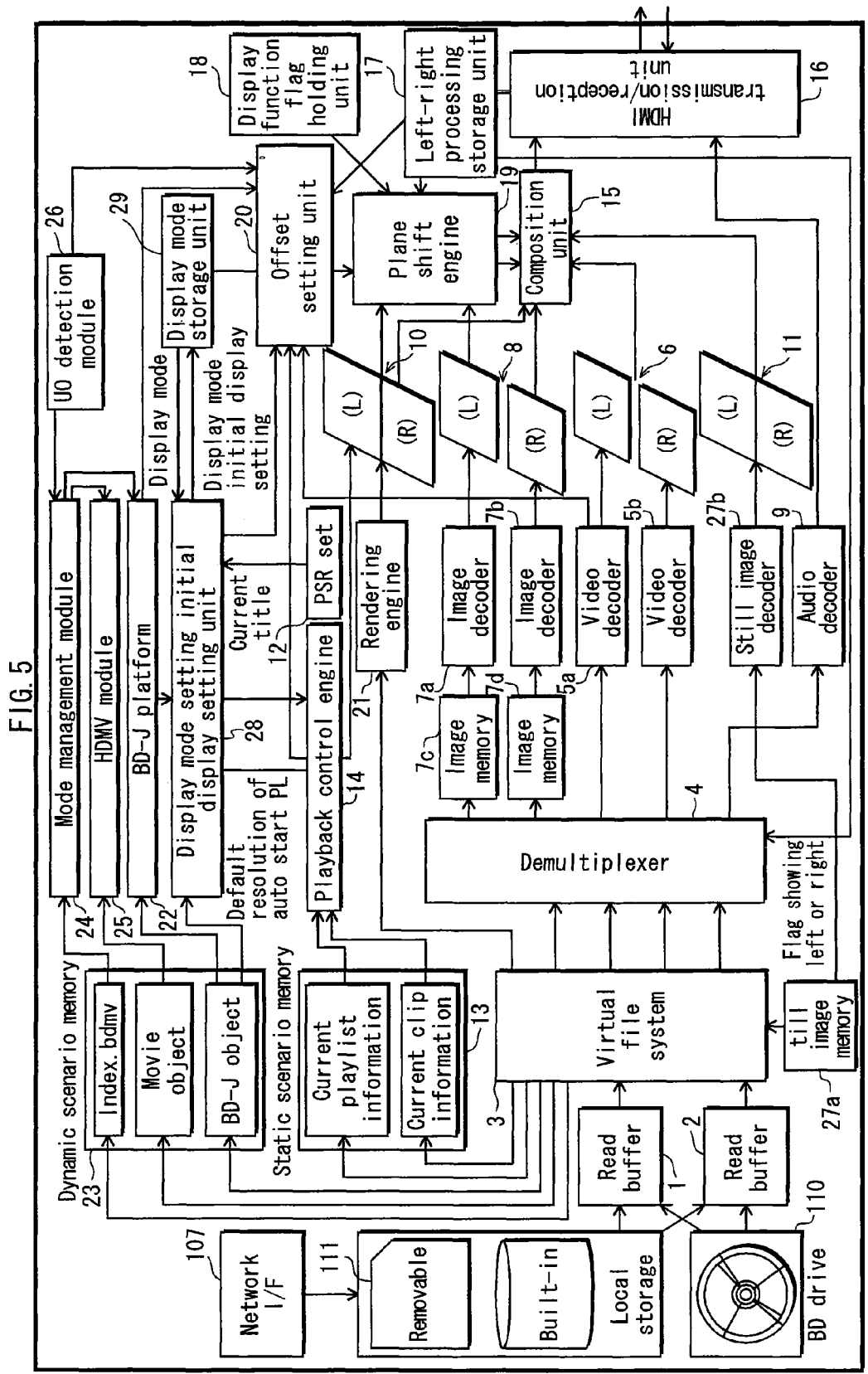
FIG. 5 shows detailed structures of a front end unit 101, a system LSI, a nonvolatile memory 105, a memory device 13, a back end unit and a host microcomputer 106 in detail.

The elements in the front end unit 101, the system LSI, the nonvolatile memory 105, the memory device 13, the back end unit and the host microcomputer 106 are further described. FIG. 5 shows the structure of the front end unit 101, the system LSI, the nonvolatile memory 105, the memory device 13, the back end unit and the host microcomputer 106 in detail. As shown in FIG. 5, the front end unit 101, the system LSI, the nonvolatile memory 105, the memory device 13, the back end unit and the host microcomputer 106 include a read buffers 1 and 2, a virtual file system 3, a demultiplexer 4, the video decoders 5a and 5b, a video plane 6, image decoders 7a and 7b, image memories 7c and 7d, an image plane 8, an audio decoder 9, an interactive graphics plane 10, a background plane 11, the playback state/setting register (PSR) set 12, a static scenario memory 13, the playback control engine 14, the composition unit 15, an HDMI transmission/reception unit 16, a left-right processing storage unit 17, a display function flag holding unit 18, a plane shift engine 19, the offset setting unit 20, the BD-J platform 22, a dynamic scenario memory 23, a mode management module 24, an HDMV module 25, a UO detection module 26, a still image memory 27a, a still image decoder 27b, a display mode setting initial display setting unit 28 and a display mode storage unit 29.

The read buffer 1 temporarily stores source packets composing extents that compose the base view stream read from the BD drive 110. The read buffer 1 transfers the source packets to the demultiplexer 4 after adjusting the transfer speed, and has a size "RB1" as stated in the above.

The read buffer 2 stores source packets composing extents that compose the enhanced view stream read from the BD drive 110. The read buffer 2 transfers the source packets to the demultiplexer after adjusting the transfer speed, and has a size "RB2" as stated in the above.

The virtual file system 3 configures a virtual BD-ROM (virtual package) in which the additional contents stored in the local storage are merged with the contents on the loaded BD-ROM based on the merge management information downloaded in the local storage 111 together with the additional contents.

The virtual package and the original BD-ROM can be referred to from a command interpreter which is a main operational part in the HDMV mode, and the BD-J platform which is a main operational part in the BD-J mode. The playback apparatus 200 performs the playback control with use of the data on the BD-ROM and the data on the local storage during the playback of the virtual package.

The demultiplexer 4 is composed of a source packet depacketizer and a PID filter. Receiving an instruction from a packet identifier corresponding to a stream to be played back (the stream is included in the structured virtual package (data on the loaded BD-ROM and the local storage corresponding to the loaded BD-ROM), the demultiplexer 4 executes packet filtering based on the packet identifier. In executing the packet filtering, the demultiplexer 4 extracts one of the left-view video stream and the right-view video stream that corresponds to a display method flag based on the flag in the left-right processing storage unit 31, and the demultiplexer 4 transfers the video stream to the video decoder 5a or the video decoder 5b.

When a stream separated from the stream to be played back is a subtitle stream, the demultiplexer 4 writes the separated subtitle stream in to the image memory. When the subtitle streams (a left-view subtitle stream, and a right-view subtitle stream) are included in the stream, the demultiplexer 4 writes the left-view subtitle stream in the image memory 7c, and writes the right-view subtitle stream in the image memory 7d.

When the 2D subtitle stream (subtitle stream used for the planar display) is included in the stream, the demultiplexer 4 writes the 2D subtitle stream in the image memory 7c.

The video decoder 5a decodes a TS packet outputted from the demultiplexer 4, and writes a compressed picture in a left-eye plane 6 (expressed as a code (L) in the video plane 6 in FIG. 5).

The video decoder 5b decodes the enhanced view video stream outputted from the demultiplexer 4, decodes the TS packet, and writes the uncompressed picture in a right view video plane 6 (expressed as a code (R) in the video plane 6 in FIG. 5).

The right-view video plane 6 is a plane memory that can store picture data having a resolution such as 1920*2160 (1280*1440). The video plane 6 has a left-eye plane (expressed as the code (L) in the video plane 6 in FIG. 5) having an area capable of storing data with resolution such as 1920*1080 (1280*720), and a right-eye plane (expressed as the code (R) in the video plane 6 in FIG. 5) having an area capable of storing data with resolution such as 1920*1080 (1280*720).

When the display mode of the video plane is in 3D display mode, and the stereo mode is ON, the video decoder 5a decodes the left-view video stream, and writes the decoded left-view video stream in the left-eye plane (expressed as the code (L) in the video plane 6 in FIG. 5). The video decoder 5b decodes the right-view video stream, and writes the decoded right-view video stream in the right-eye plane (expressed as the code (R) in the video plane 6 in FIG. 5).

When the display mode of the video plane is a 3D display mode, and the stereo mode is OFF, the video decoder 5a decodes the left-view video stream, for example, and writes the decoded left-view video stream in the left-eye plane (expressed as the code (L) in the video plane 6 in FIG. 5) and in the right-eye plane (expressed as the code (R) in the video plane 6 in FIG. 5).

When the display mode of the video plane is a 2D display mode, the demultiplexer 4 transmits the 2D video stream to the video decoder 5a, and the video decoder 5a writes the decoded 2D video data held in the left-eye plane (expressed as the code (L) in the video plane 6 in FIG. 5).

Although an examples are shown for cases where each of the left-eye plane and the right-eye plane included in the video plane 6 shown in FIG. 5 is a physically separated memory, the structure of the video plane 6 is not limited to this. Therefore, areas for the left-eye plane and the right-eye plane may be provided together as one memory. In such case, the video data is written in each of the corresponding areas (left and right).

Each of the image decoders 7a and 7b decodes TS packets composing the subtitle stream that is outputted from the demultiplexer 4 and written in the image memories 7c and 7d, and writes the uncompressed graphics subtitles in the graphics plane 8a. The "subtitle streams" decoded from the image decoders 7a and 7b are data pieces each showing subtitles compressed by a run-length coding, and is defined by pixel codes showing a Y value, a Cr value, a Cb value and an a value and a run lengths of the pixel codes.

The image plane 8 is a graphics plane capable of storing graphics data (e.g. subtitle data) obtained by for example, decoding the subtitle stream with a resolution of 1920*1080 (1280×720). The image plane 8 has a left-eye plane (expressed as a code (L) in the image plane 8 in FIG. 5) having an area capable of storing data having a resolution of 1920*1080 (1280*720), for example, and a right-eye plane (expressed as a code (R) in the image plane 8 in FIG. 5) having an area capable of storing data having a resolution of 1920*1080 (1280*720), for example.

When the display mode of the plane with subtitle data is in 3D display mode, and the stereo mode is ON, the image decoder 7a decodes the left-view subtitle stream stored in the image memory 7c, and writes the decoded subtitle stream in the left-eye plane (expressed as a code (L) in the image plane 8 in FIG. 5). The image decoder 7b decodes the right-view subtitle stream stored in the image memory 7d, and writes the decoded right-view subtitle stream in the right-eye plane (expressed as a code (R) in the image plane 8 in FIG. 5).

When the display mode of the plane with subtitle data is a 3D display mode, and the stereo mode is OFF, the image decoder 7a decodes the left-view subtitle stream stored in the image memory 7c, and writes the decoded left-view subtitle stream in the left-eye plane (expressed as a code (L) in the image plane 8 in FIG. 5) and in the right-eye plane (expressed as a code (R) in the image plane 8 in FIG. 5).

When the display mode of the plane with subtitle data is a 2D display mode, the demultiplexer 4 stores the 2D subtitle stream in the image memory 7c, and the image decoder 7a decodes the 2D subtitle stream stored in the image memory 7c, and writes the left-eye video plane (expressed as a code (L) in the image plane 8 in FIG. 5).

Although an examples are shown for cases where each of the left-eye plane and the right-eye plane included in the image plane 8 shown in FIG. 5 is a physically separated memory, the structure of the image plane 8 is not limited to this. Therefore, areas for the left-eye plane and the right-eye plane may be provided together as one memory. In such case, the corresponding graphics data is written in each of the corresponding areas (left and right).

The audio decoder 9 decodes audio frames outputted from the demultiplexer 4, and outputs the uncompressed audio data.

The interactive graphics plane 10 is a graphics plane having a storage area capable of storing graphics data written by the BD-J application using the rendering engine 21 with resolutions such as 1920*2160 (1280*1440). The interactive graphics plane 10 has, for an example, a left-eye plane (expressed as a code (L) in the interactive graphics plane 10 in FIG. 5) having an area capable of storing data having a resolution of 1920*1080 (1280*720), and a right-eye plane (expressed as a code (R) in the interactive graphics plane 10 in FIG. 5) having an area capable of storing data having a resolution of 1920*1080 (1280*720).

When the display mode of the interactive graphics plane is in 3D display mode, and the stereo mode is ON, it is indicated that the BD-J application includes a program that writes an interactive graphics that is viewable by the left eye (left-eye interactive graphics) and an interactive graphics that is viewable by the right eye and is different from the left-eye interactive graphics (right-eye interactive graphics).

The left-eye interactive graphics and the right-eye interactive graphics written by this rendering program can be seen from different angles so as to allow the viewer to see stereoscopic graphics.

When the left-eye interactive graphics and the right-eye interactive graphics are displayed, the BD-J application writes the left-view interactive graphics in the left-eye plane (to which a code (L) is given in the interactive graphics plane 10 in FIG. 5) with use of the rendering engine 21, and writes the right-view interactive graphics in the right-eye plane (to which a code (R) is given in the interactive graphics plane 10 in FIG. 5).

When the display mode of the interactive graphics plane is in 3D display mode, and the stereo mode is OFF, the BD-J application writes the left-view interactive graphics in the each of the planes to which the code (L) and the code (R) are respectively given, with use of the rendering engine 21.

When the display mode of the interactive graphics plane is in 2D display mode, the BD-J application writes the 2D interactive graphics in the interactive graphics plane 10 (more specifically, the plane to which the code (L) is given in the interactive graphics plane 10) with use of the rendering engine 21.

Although examples are shown for cases where a left-eye area (to which the code (L) is given) and a right-eye area (to which the code (R) is given) of the interactive graphics plane 10 shown in FIG. 5 are provided in one plane memory, the structure of the interactive graphics plane 10 plane is not limited to this. Therefore, the left-eye area (to which the code (L) is given) and the right-eye area (to which the code (R) is given) of the interactive graphics plane 10 may be physically separated from one another.

The "graphics data" held in the interactive graphics plane 10 is graphics whose pixels each is defined by an R value, a G value, a B value, and an α value. The graphics written in the interactive graphics plane 10 is an image or a widget mainly used for composing the GUI.

Although the image data and the graphics data are different in terms of structure, they are collectively expressed as graphics data. There are two types of the graphics plane (i.e. the image plane 8 and interactive graphics plane 10). Hereafter, when the term "graphics plane" is used, it referrers to both or one of the image plane 8 and the interactive graphics plane 10.

The still image memory 27a stores still image data that is extracted from the structured virtual package and is to be a background image.

The background plane 11 is a plane memory capable of storing the still image data to be a background image having a resolution such as 1920*2160 (1280*1440). Specifically, the background plane 11 has a left-eye plane (expressed as a code (L) in the background plane 11 in FIG. 5) having an area capable of storing data having a resolution of 1920*1080 (1280*720), and a right-eye plane (expressed as a code (R) in the background plane 11 in FIG. 5) having an area capable of storing data having a resolution of 1920*1080 (1280*720).

When the display mode of the background plane is in 3D display mode, and the stereo mode is ON, the still image decoder 27a decodes left-view still image data and right-view still image data that are stored in the still image memory 27a. Then the image decoder 27a writes the left-view still image data and the right-view still image data held in the left-eye plane (to which a code (L) is given in the background plane 11 shown in FIG. 5) and the right-view plane (to which a code (R) is given in the background plane 11 shown in FIG. 5), respectively.

When the display mode of the background plane is in 3D display mode, and the stereo mode is OFF, the background plane 11 decodes the left-view still image data from among the 3D background images stored in the still image memory 27a (the left-view still image data and the right-view still image data), and writes the decoded left-view image data held in the left-eye plane (to which a code (L) is given in the background plane 11 shown in FIG. 5) and in the right-eye plane (to which a code (R) is given in the background plane 11 shown in FIG. 5).

When the display mode of the background image is a 2D display mode, the still image decoder 27b decodes the 2D still image data stored in the still image decoder 27a, and writes the decoded 2D still image data held in the left-eye plane (to which a code (L) is given in the background plane 11 shown in FIG. 5).

Although examples are shown for cases where the left-eye plane (to which the code (L) is given) and a right-eye plane (to which the code (R) is given) of the background plane 11 shown in FIG. 5 are provided in one plane memory, the structure of the background plane 11 is not limited to this. Therefore, the left-eye plane (to which the code (L) is given) and the right-eye plane (to which the code (R) is given) of the background plane 11 may be physically separated from one another.

Note that although it is disclosed that each of the video plane 6, the image plane 8, the interactive graphics plane 10 and the background plane 11 as shown in FIG. 5 is provided with a storage area for storing the left-eye data and a storage area for storing the right-eye data, the structures of these planes are not limited to this. Therefore, each of the planes may have only one memory area that is alternatively used as a left-eye area and a right-eye area.

The PSR set 12 is a collection of registers including a playback state register storing therein information on playback states of playlists, a playback setting register storing configuration information showing a configuration in the playback apparatus 200, and a general register capable of storing arbitrary information used by the contents. Each of the playback states of the playlists shows which of the AV data pieces in each kind of AV data information pieces that are written in the playlist are used, and at which position (time point) of the playlist the playback is performed.

When the state of each of the playlists changes, the playback control engine 14 stores information on what has been changed in the PSR set 12. Also, according to an instruction from the application executed by the command interpreter which is a main operational part in the HDMV mode or the main operational part in the BD-J mode, the playback control engine 14 is capable of storing a value specified by the application, and transferring the stored value to the application.

The static scenario memory 13 is a memory for storing current PlayList information or a current clip information. The current PlayList information is a current processing target from among a plurality of pieces of PlayList information accessible from the BD-ROM, a built-in media drive or a removable media drive. The current clip information is a current processing target from among a plurality of pieces of clip information accessible from the BD-ROM, a built-in media drive or a removable media drive.

The playback control engine 14 executes an AV playback function and a playback function of the playlist in response to a function call from the command interpreter which is the main operational part in the HDMV mode and the Java platform which is the main operational part in the BD-J function. The AV playback function is a set of functions used in DVD players and CD players, and includes playback start, playback stop, pause, release of pause, release of freeze frame function, fast forwarding at a playback speed specified by an immediate value, fast rewinding at a playback speed specified by an immediate value, audio conversion, sub image conversion, and angle conversion. The playlist playback function is to perform playback start or playback stop from among the above-stated AV playback functions according to the current PlayList information composing current playlists, and current clip information.

When a disc is inserted into the medium, a playlist and an AV stream that are playback processing targets by the playback control engine 12 are a auto start playlist (AutoStartPlaylist) and a default start stream respectively that are written in the current scenario on the BD-ROM. The playback of the AV stream starts due to a user operation (e.g. playback button) or automatically done by event triggered by the terminal (i.e. such as resident application).

The composition unit 15 composites data held in the interactive graphics plane 10, data held in the image plane 8, data held in the video plane 6 and data held in the background plane 11.

Each of the interactive graphics plane 10, the image plane 8, the video plane 6 and the background plane 11 has a separate layer structure. Data held in each of the planes is composited (overlaid) in order of the background plane 11, the video plane 6, the image plane 8, then the interactive graphics plane 10. That is, even in the case where the planar graphics is composited with the stereoscopic video, the composition unit 15 composites video held in the video plane 6 with the background image held in the background plane 11, then composites the subtitles held in the image plane 8, then at last composites the graphics held in the interactive graphics plane 10. The composited image is displayed as a result. If done otherwise, graphics part may be hidden by the video, and thus will look unnatural.

The composition unit 15 also includes a scalar function. When the composition unit 15 composites shifted data pieces in the planes, the composition unit 15 is capable of performing scaling to make the image appear to be smaller or larger.

The purpose of performing the scaling is described in the following. In the real world, close objects appear to be larger, and distant objects appear to be smaller. However, just shifting the above-stated image data makes the object appear to be close to or distant from the viewer with its size unchanged. In such case, the viewer possibly may feel uncomfortable. The scaling is performed for the purpose of reducing such a sense of discomfort. One example, would be to in order to display the image closer to the viewer with a large shift amount, the subtitles held in the image plane 8 and the image held in the interactive graphics plane 10 can be enlarged at the timing of scaling.

The HDMI transmission/reception unit 16 includes an interface that complies with the HDMI standard (HDMI: High Definition Multimedia Interface). The HDMI transmission/reception unit 16 performs transmission and reception such that the playback apparatus 200 and a device (in this example, a TV 400) that performs the HDMI connection with the playback apparatus 200 comply with the HDMI standard. The picture data stored in the video and audio data decoded from the uncompressed audio data by the audio decoder 9 are transmitted to the TV 400 via the HDMI transmission/reception unit 16. The TV 400 holds information such as, whether the TV 400 is capable of displaying data stereoscopically, information regarding-resolutions at which the planar display can be performed, and information regarding resolutions at which the stereoscopic display can be performed. When the playback apparatus 200 gives a request via the HDMI transmission/reception unit 16, the TV 400 gives the playback apparatus 200 necessary information (e.g. information regarding whether the TV 400 is capable of displaying data stereoscopically, information regarding resolutions at which the planar display can be performed, and information regarding resolutions at which the stereoscopic display can be performed) requested by the TV 400. Thus, the playback apparatus 200 is capable of obtaining, from the TV 400, the information regarding whether the TV 400 is capable of displaying data stereoscopically via the HDMI transmission/reception unit 16.

The left-right processing storage unit 17 stores information showing whether the current output processing is for left-view video or right-view video. A flag in the left-right processing storage unit 17 shows whether or not data to be outputted to a display device (TV in FIG. 1) connected to the playback apparatus 200 shown in FIG. 1 is the left-view video or the right-view video. While the left-view video is outputted, the flag in the left-right processing storage unit 17 is set as the left-view output. Also, while the right-view video is outputted, the flag in the left-right processing storage unit 17 is set as the right-view output.

The display function flag holding unit 18 stores a 3D display function flag showing whether the playback apparatus 200 is capable of performing the 3D display or not.

The plane shift engine 19 shifts coordinates of each of pixel data pieces held in the image plane 8 and/or coordinates of each of the pixel data pieces in the interactive graphics plane 10 in a predetermined direction (e.g. in a horizontal direction on a display screen) based on the flag in the left-right processing storage unit 31 and depth information on the data held in the graphics plane. That is, even if the objects of the graphics such as subtitles and the GUI used for data held in the image plane 8 and the data held in the interactive graphics plane 10 are not materials for the stereoscopic viewing, it is possible to obtain an effect that the objects are displayed in a position closer to the viewer than a position of the display screen. When the viewer wants only the graphics to have a stereoscopic effect with video displayed as 2 dimension, the composition unit 15 uses the left-view video for both the left view and the right view instead of using the set of the left-view video and the right-view video, and then composites the shifted data held in the image plane 8 and the shifted data held in the interactive graphics plane 10 with the video.

The shifting targets do not have to be both the data held in the image plane 8 and the data held in the interactive graphics plane 10. Shifting target can be done for only one of the planes, either the data held in the interactive graphics plane 10 or the data held in the image plane 8.

The plane shift engine 19 includes a storage area for storing a "plane offset" (offset value) showing a direction in which data is shifted, along with distance by which the data is shifted, for performing the shifting. For example, when the playback apparatus 200 includes a setup function that can set a plane offset value, the plane shift engine 19 stores a value set using the setup function. The playback apparatus 200 may have two offset values, one for the image plane 8, and the other for the interactive graphics plane 10, and chooses one of the offset values for use according to a shifting target. When the playback apparatus 200 does not have the setup function, "0" may be specified as a default (in this case, graphics such as the subtitles and the GUI are displayed in the position of the display screen, and there is no effect that an object pops out from the display screen).

The rendering engine 21 includes base software (e.g. Java 2D, OPEN-GL), and writes graphics and a character string in the interactive graphics plane 10 in accordance with the instruction from the BD-J platform 22 in the BD-J mode. Also, in the HDMV mode, the rendering engine 21 writes graphics data (e.g. graphics data corresponding to an input button) extracted from the graphics stream other than a stream corresponding to the subtitles (subtitle stream), and writes the extracted graphics data held in the interactive graphics plane 10.

The BD-J platform 22 is a Java platform which is a main operational part in the BD-J mode. The BD-J platform 22 is fully provided with the Java2Micro_Edition (J2ME) Personal Basis Profile (PBP 1.0) and Globally Executable MHP specification (GEM1.0.2) for package media targets. The BD-J platform 22 reads byte codes from a class file in the JAR archive file, and stores the heap memory to start the BD-J application. Then, the BD-J platform 22 converts byte codes composing the BD-J application and byte codes composing a system application into native codes, and causes the MPU to execute the native codes.

The dynamic scenario memory 23 stores current dynamic scenario, and is used for processing by the HDMV module which is the main operational part in the HDMV mode, and the Java platform which is the main operational part in the BD-J mode. The current dynamic scenario is a current execution target which is one of Index.bdmv, the BD-J object and the movie object recorded in the BD-ROM, the built-in media, or the removable media.

The display mode management module 24 stores Index.bdmv read from the BD-ROM, the built-in media, or the removable media, and performs mode management and branching control. The mode management by the mode management module 24 is to perform allocation of the dynamic scenario to the module (i.e. to cause one of the BD-J platform 22 and the HDMV module 25 to execute the dynamic scenario).

The HDMV module 25 is a DVD virtual player to be a main operational part in the HDMV mode, and is a main execution part. This module includes a command interpreter, and executes control of the HDMV mode by reading and executing the navigation commands composing the movie object. The navigation commands are written by a syntax similar to a syntax for the DVD-Video. Therefore, the playback control like the DVD-Video can be realized by executing these navigation commands.

The UO detection module 26 receives the user operation on the GUI. The user operation received by the GUI includes title selection determining which of the titles recorded in the BD-ROM is selected, subtitle selection and audio selection. In particular, one of the user operations unique to the stereoscopic playback is to receive the depth of stereoscopic video. For example, there are three levels of the depth such as distant, usual and close, or levels of the depth may be expressed by the numerical values such as how many centimeter or how many millimeter.

The still image memory 27*a* stores still image data read from the BD-ROM (or configured virtual package).

The still image decoder 27*b* decodes still image data read from the read buffer 27*a*, and writes the uncompressed background image data held in the background plane 11.

The display mode storage unit 29 stores information on a display mode and information on a stereo mode. When the 3D display function flag of the playback apparatus 200 shows that the playback apparatus 200 is capable of displaying 3D video, the display mode which is a terminal setting stored in the display mode storage unit 29 may be switched to one of a 2D mode and a 3D mode. Hereinafter, a state of the display mode shown as "3D" is referred to as a "3D display mode", and a state of the display mode shown as "2D" is referred to as a "2D display mode".

When the playback apparatus 200 is in the 3D playback mode, the stereo modes of the planes are either ON or OFF. The difference between ON and OFF of the stereo modes affects compositing methods for the planes.

"Stereo mode ON" is a 3D display mode in which composition is performed such that the playback apparatus 200 displays the left-view and the right-view that look different.

"Stereo mode OFF" is a 3D display mode in which composition is performed such that the playback apparatus 200 displays the left-view and the right-view that look the same. That is, when viewed by both of the eyes, the picture does not look stereoscopic (planar). However, when the data held in the graphics plane 8 is shifted in the horizontal direction by the plane offset, the plane graphics data (subtitle data) that is held in the graphics plane 8 is to be displayed can be displayed in a position closer to the viewer than a position of the display screen, or in a position more distant from the viewer than a position of the display screen. The same effect can be obtained when offsets of video data held in the video plane 6, interactive graphics data held in the interactive graphics plane 10, and background image data held in the background plane 11 are adjusted when the "stereo mode is in the OFF state".

As described in the above, there are two modes, "Stereo mode ON" and "Stereo mode OFF" in the "3D display mode". When the playback apparatus 200 is in the "Stereo mode ON" state in the 3D display mode, the left-view data and the right-view data (e.g. an image viewed by the left eye and the image viewed by the right eye can be seen from different angles) are held in the left-eye plane and the right-view plane, respectively, and displayed in accordance with the SYNC signal. This makes it possible to display the stereoscopic image.

Also, when the playback apparatus 200 is in the "Stereo mode OFF" state in the 3D display mode, one of the left-view data and the right-view data (the left-view data held in the present embodiment) is held in each of the left-eye plane and the right-eye plane, and the offsets of the stored data pieces are adjusted. This makes it possible to display the planar image in a position closer to or more distant from the viewer than the position of the display screen.

In the present embodiment, the "Stereo mode ON" and the "stereo mode OFF" can be set for each plane (i.e. the video plane 6, the graphics plane 8, the interactive graphics plane 10 and the background plane 11).

The "2D display mode" is a normal display that displays the image in a position corresponding to the position of the display screen. In such case, a decoder and a plane used in a default setting is predetermined, and the composited image is displayed with use of the decoder and the plane.

For example, when the playback apparatus 200 is in the "2D display mode", the composition unit 15 composites: the 2D video data written by the video decoder 5a in the left-eye video plane (expressed as the code (L) in the video plane 6 in FIG. 5); the 2D graphics data (subtitle data) written by the image decoder 7a in the left-eye plane (expressed as the code (L) in the image plane 8 in FIG. 5); the 2D interactive graphics written by the BD-J application in the left-eye plane (expressed as the code (L) in the interactive graphics plane 10 in FIG. 5) using the rendering engine 21; and the still image data written by the still image decoder 27b in the left-eye plane (expressed as the code (L) in the background plane 11 in FIG. 5).

At this time, the composition unit 15 performs the composition in the order of the 2D still image data, the 2D video data, the 2D graphics data (subtitle data) and the 2D interactive graphics data in order from the data from the bottom. The composition may be performed without compositing the 2D still image data when the video data is displayed on the whole screen. The flag in the display mode storage unit 29 showing whether the playback apparatus 200 is in the 2D display mode or the 3D display mode may also be stored in the playback state register 12, or may be stored in both the display mode storage unit 29 and the playback state register 12.

The display mode setting initial display setting unit 28, sets the display mode and the resolutions based on the BD-J object in the current title provided with the BD-J platform unit.

This concludes a description of the internal structure of the playback apparatus 200. The following describes switching between the 2D display mode and the 3D display mode in the present embodiment in detail.

Figure 6:
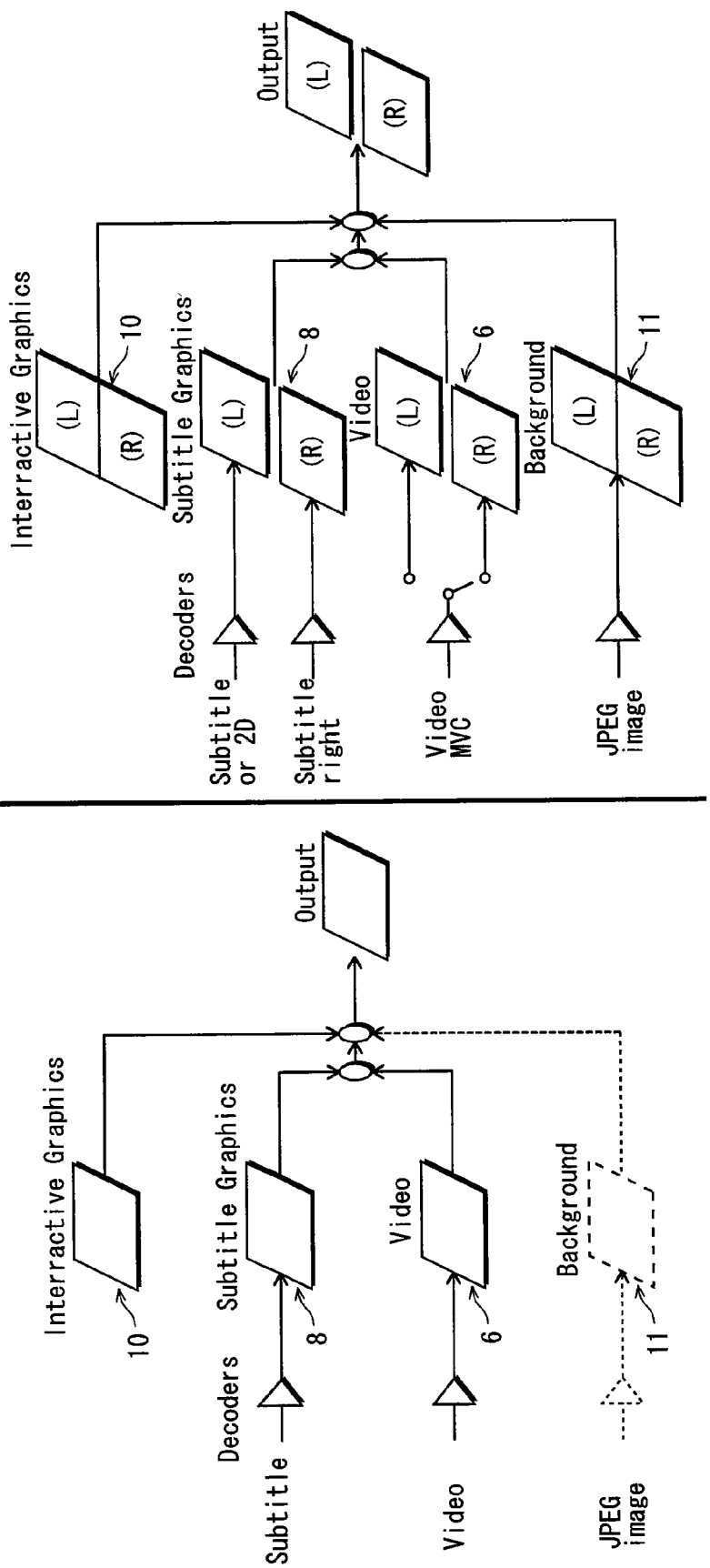
FIG. 6 shows switching between a 2D display mode and a 3D display mode.

FIG. 6 shows switching between the 2D display mode and the 3D display mode. On the left side of FIG. 6, an output model in the 2D display mode is shown. In the plane structure on the left side of FIG. 6, only one each of the video plane 6, the image plane 8 ("Subtitle" in FIG. 6), the interactive graphics plane 10, the background plane 11 and an output is prepared.

Therefore, the same data is used for the left view and the right view in the 2D display mode. As a result, the same data is outputted.

On the right side of FIG. 6, an output model in the 3D display mode is shown. When the playback apparatus 200 is in the 3D display mode, the video plane 6, the image plane 8 ("Subtitle" in FIG. 6) and the interactive graphics plane 10 are prepared for each of the left view and the right view. The picture data and the graphics data to be played back are held in each of the video plane 6, the image plane 8 ("Subtitle" in FIG. 6), the interactive graphics plane 10 and the background plane 11 for the left eye and the right eye.

Therefore, the left-view output and the right-view output are performed separately in the 3D display mode. A different image can be provided for the left eye and the right eye. As a result, it is possible to obtain a 3D effect that the stereoscopic object in the screen appears to pop out closer to the viewer due to the binocular disparity.

(Specification of the Stereoscopic Effect)

Figure 7:
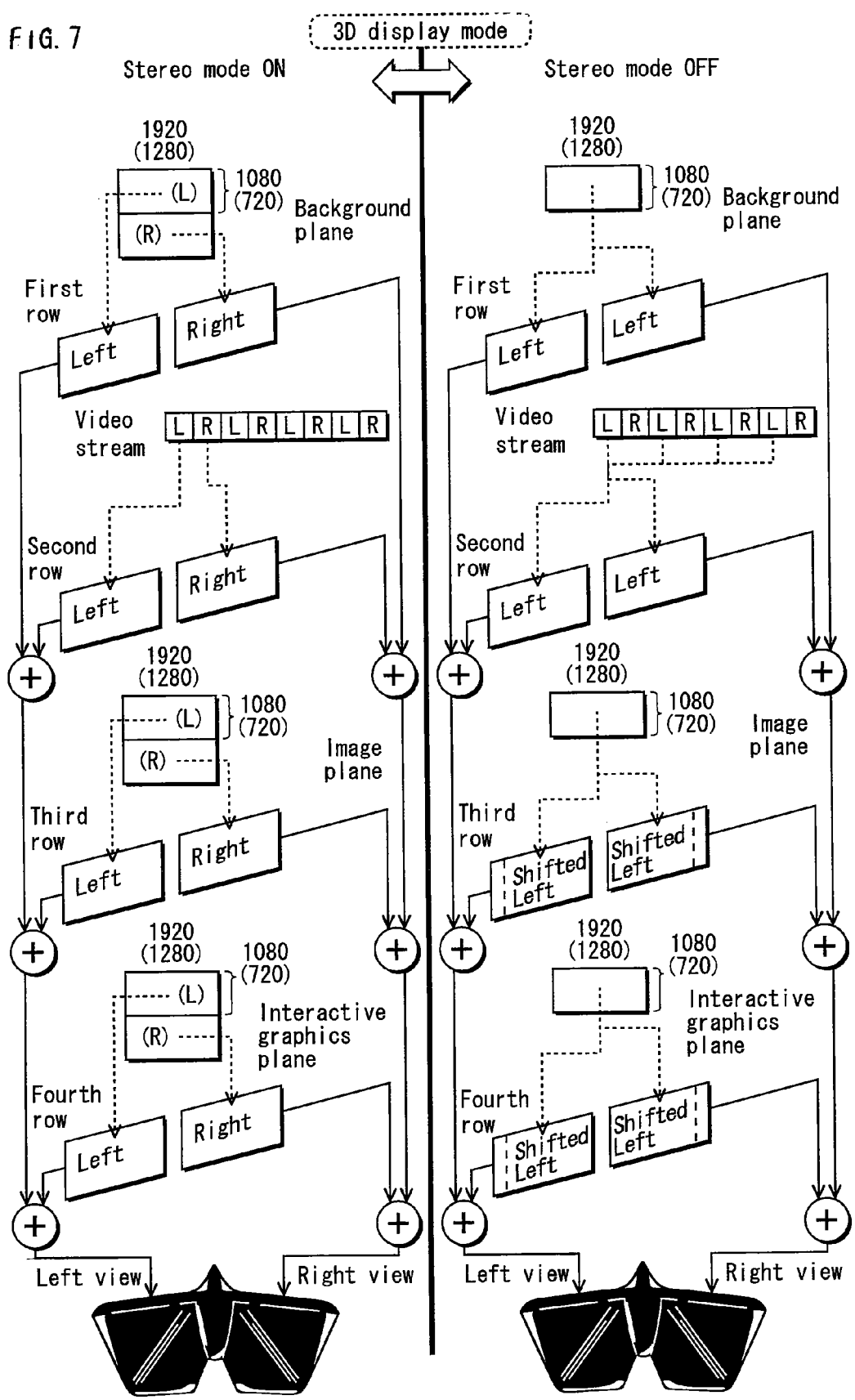
FIG. 7 shows an example of composition processing when a stereo mode of each plane is ON, and an example of composition processing when a stereo mode of each plane is OFF.

FIG. 7 shows one example of composition processing when stereo modes of all the planes are ON, and when stereo modes of all the planes are OFF, in the 3D display mode.

Although FIG. 7 shows an example of a case where the stereo modes of the planes are the same, ON/OFF of the stereo mode may be changed for each of the planes.

On the left side of FIG. 7, the plane structure when the stereo modes of all the planes are ON is shown. On the right side of FIG. 7, the plane structure when the stereo modes of all the planes are ON.

The first row shows the background plane 11 and the outputted data before the composition.

The second row shows the video stream and the outputted data before the composition.

The third row shows the image plane 8 and the outputted data before the composition.

The fourth row shows the interactive graphics plane 10 and the outputted data before the composition.

When the stereo mode is ON, a left-eye background plane which is expressed as an area to which (L) is given is used for writing the left-view background data, and a right-eye background plane which is expressed as an area to which (R) is given is used for writing the right-view background data. Each of the background data pieces is composited with the corresponding left-eye or right-view picture. When the stereo mode of the background plane 11 is OFF, the left-view background data is written, by the application, in each of the areas to which (L) and (R) are given respectively in the background plane 11. Therefore, the right-view background data does not affect the display.

When the stereo mode is ON, picture data of the left-eye video in the video stream is held in the left-view video plane. Also, picture data of right-eye video in the video stream is held in the right-view video plane. When the video plane 6 is in the OFF state of the stereo mode, the picture data of the left-eye video is held in both the left-view video plane and the right-view video plane.

When the stereo mode is ON, in the image plane 8, left-view image data is written in a left-eye image plane expressed as the area to which (L) is given, and right-view image data is written in a right-eye image plane expressed as the area to which (R) is given. Each of the image data pieces is composited with the corresponding left-eye or right-view picture.

When the image plane 8 is in the OFF state of the stereo mode, the subtitle graphics corresponding to the right-view image data does not affect the display. Also, when the stereo mode is OFF, the content in the image plane 8 is a content shifted in the right or left direction ("Shifted Left" in FIG. 7).

When the stereo mode is ON, in the interactive graphics plane 10, left-view interactive graphics is written in a left-view interactive graphics plane expressed as an area to which (L) is given, and right-view interactive graphics is written in a right-view interactive graphics plane expressed as an area to which (R) is given. Each of the interactive graphics data pieces is composited with the corresponding left-eye or right-view picture.

When the interactive graphics plane 10 is in the OFF state of the stereo mode, the right-view interactive graphics by the application does not affect the display. Also, when the stereo mode is OFF, the content in the interactive graphics plane 10 is a content that is shifted in the right or left direction ("Shifted Left" in FIG. 7).

Figure 8:
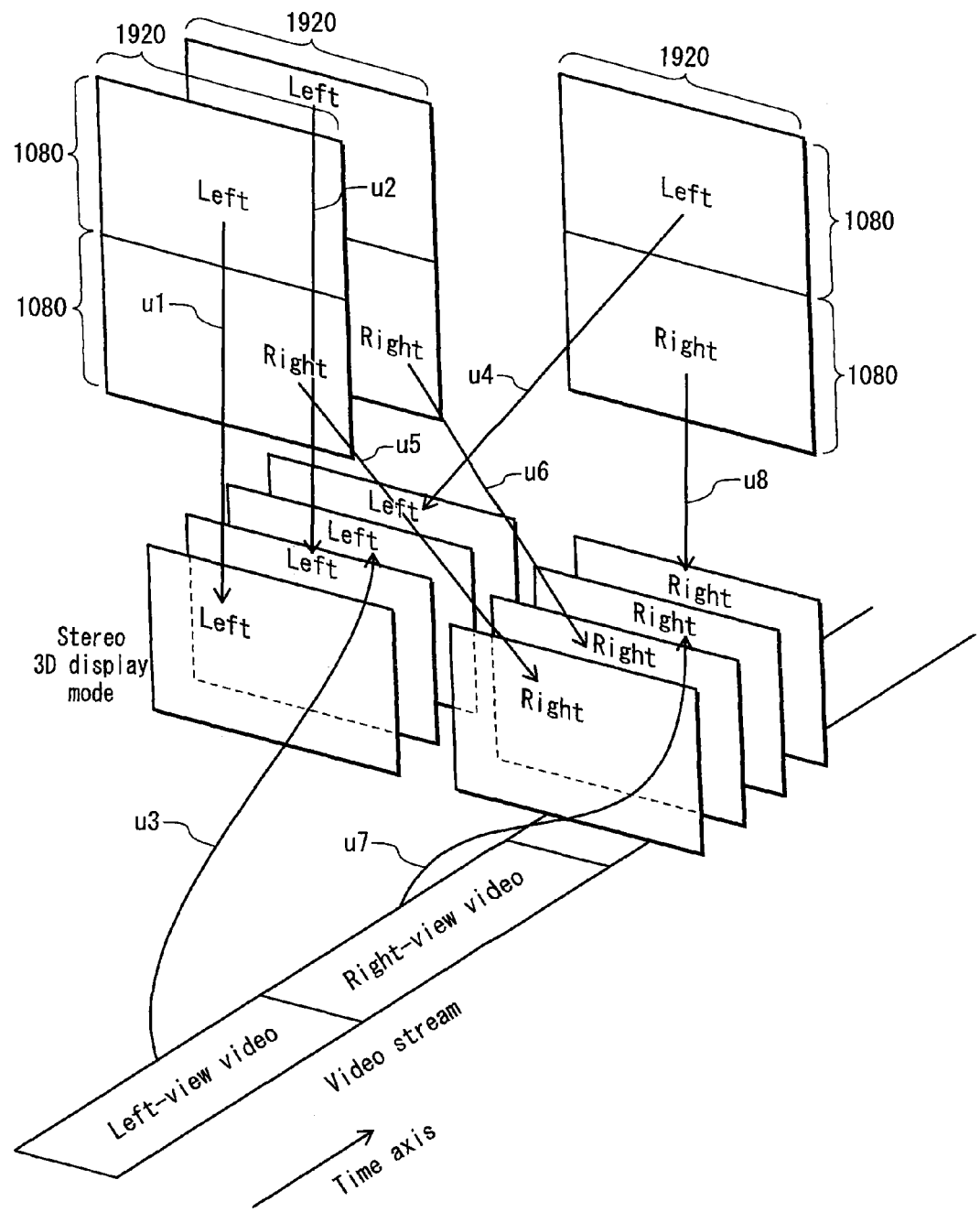

FIG. 8 shows how the data held in the background plane 11, the data held in the video plane 6, the data held in the image plane 8 and the data held in the interactive graphics plane 10 are composited with one another when the stereo modes of all the planes are ON. In the stereo mode, it can be seen that left-view background data u4, left-view video u3 read from the video stream, left-view graphics u2 in the image plane 8 and left-view graphics u1 in the interactive graphics plane 10 are composited as the left-view in this order.

Also, it can be seen that right-view background data u8, right-view video u7 read from the video stream, right-view graphics u6 in the image plane 8 and right-view graphics u5 in the interactive graphics plane 10 are composited as the right view in this order.

Figure 9:
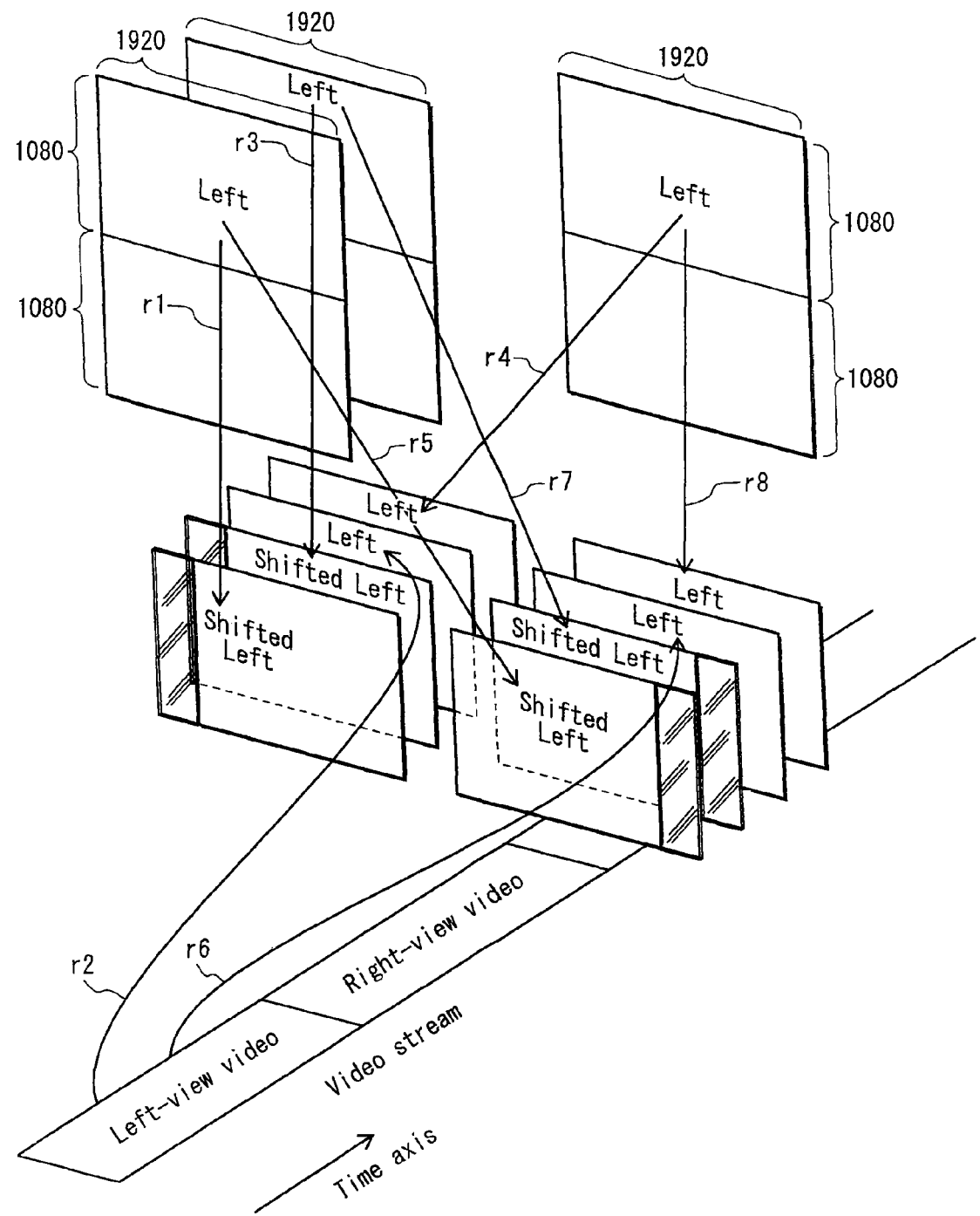
FIG. 9 shows how data in a background plane, data in a video plane 6 and data in an interactive graphics plane 10 are composited when stereo modes of all the planes are OFF.

FIG. 9 shows how the data held in the background plane 11, the data held in the video plane 6, the data held in the image plane 8 and the data held in the interactive graphics plane 10 are composited with one another when the stereo modes of all the planes are OFF. When the stereo modes are OFF, it can be seen that left-view background data r4, left-view video r2 read from the video stream, Shifted Left graphics r3 which is left-view graphics in the image plane 8 that has been shifted in a predetermined direction (the right direction in FIG. 8) and Shifted Left graphics r1 which is left-view graphics in the interactive graphics plane 10 that has been shifted in a predetermined direction (the right direction in FIG. 9) are composited as the right view in this order.

Also, it can be seen that right-view background data r8, left-view video r6 read from the video stream, Shifted Left graphics r7 which is the left-view graphics in the image plane 8 that has been shifted in a direction opposite to the predetermined direction (the left direction in FIG. 8) and Shifted Left graphics r5 that is the left-view graphics in the interactive graphics plane 10 that has been shifted in a direction opposite to the predetermined direction (the left direction in FIG. 8) are composited as the right view in this order.

In FIG. 7 to FIG. 9, offsets of the background data and the video were not adjusted (i.e. an offset is 0, more specifically, the image is displayed in the position of the display screen) strictly for the purpose of simplifying the above-stated description. Therefore, the setting of the offsets is not limited to the above-stated descriptions, and the offsets may be adjusted such that the video is positioned in a position more distant from the viewer than a position of the graphics image (subtitles), and the background data is in a position more distant from the viewer than a position of the background data.

The following describes switching between the stereo modes in the present embodiment.

Figure 10:
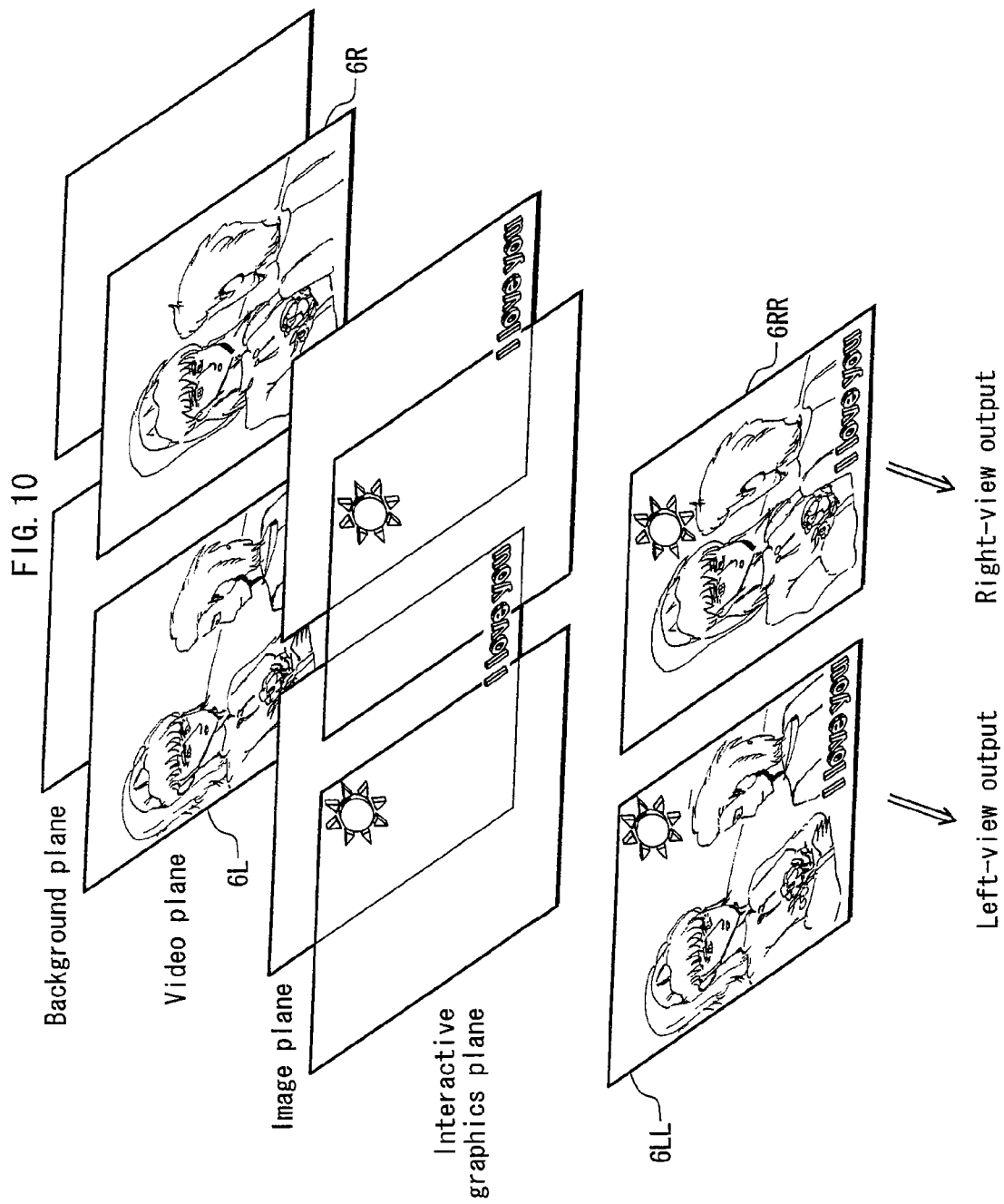
FIG. 10 shows a composition result for each plane.

FIG. 10 shows the composition result for each of the planes.

Each of 6L and 6R are examples of composition results for the video plane 6. It can be seen from a difference in direction in which a woman faces that images in a left-view stream and images a right-view stream are taken from different angles. Note that a difference in directions in which a man and the woman face and a difference in positions of the man and woman are schematic, and show neither accurate directions in which the man and woman face nor accurate positions of the man and woman for realizing the stereoscopic display.

Subtitles "I love you" in the image plane 8 is an image obtained by decoding the subtitle data by the image decoder.

A GUI part in a form of the sun in the interactive graphics plane 10 is written in the interactive graphics plane 10 by the BD-J application.

6LL is outputted left-view image after the composition, and 6RR is outputted right-view image after the composition. It can be seen that the subtitles "I love you" is shifted in the right direction and composited in the left-view image of 6LL. Also, the subtitle "I love you" is shifted in the left direction in the right-view image of 6RR.

Figure 11:
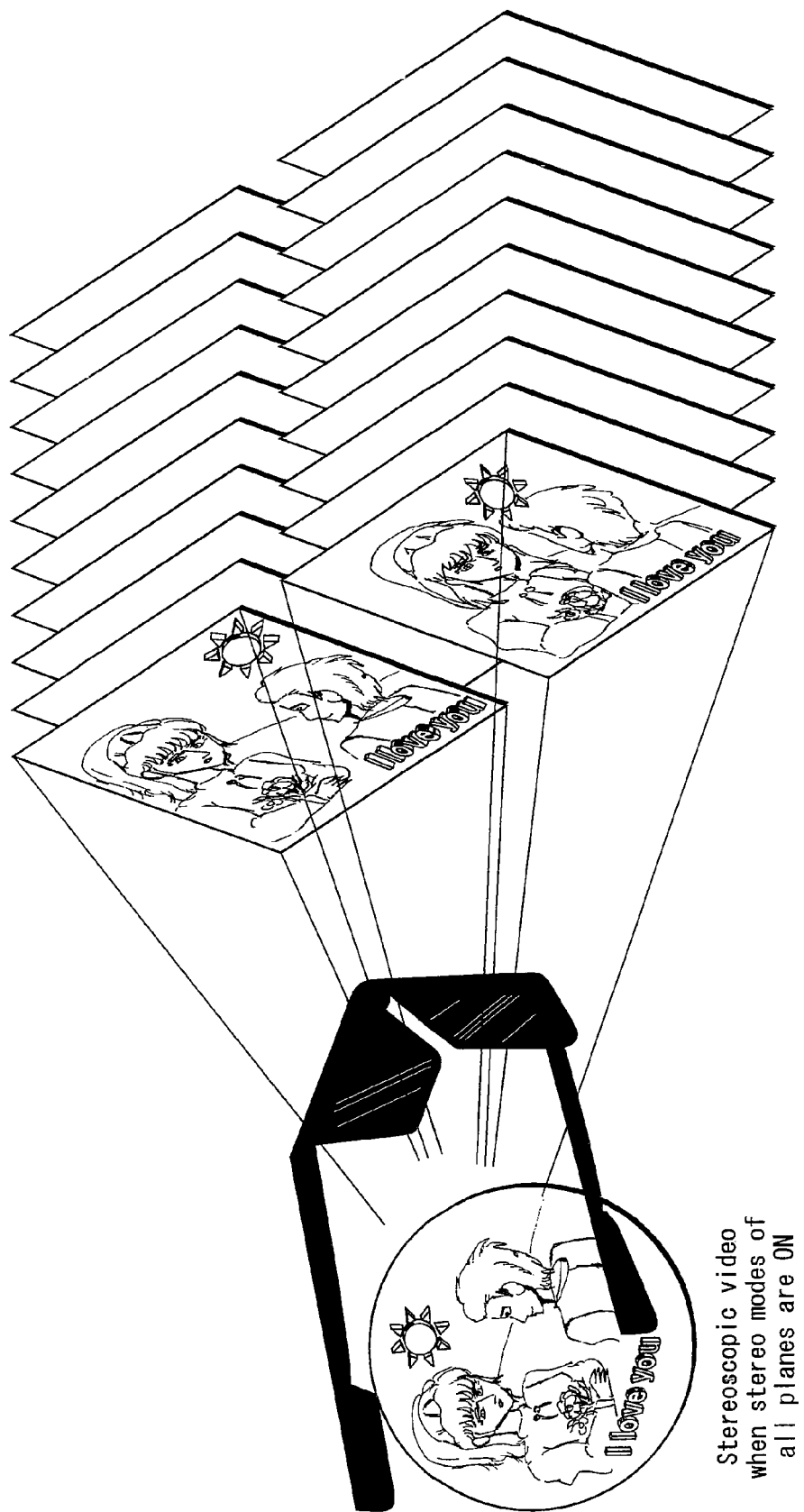
FIG. 11 shows an example where an image that is outputted when the stereo modes of all the planes are ON is viewed on a 3D display.

FIG. 11 shows one example of a case where an image output when the stereo modes of all of the planes are ON is displayed on the 3D display.

A right-view image and a left-view image are filtered through the shutter glasses 500, for example, appear differently from each other to corresponding eyes. Observe that the subtitles "I love you" and the GUI part in the form of the sun are different in each of the right an left images in addition to the fact that the images of the video stream are made stereoscopic by compositing the left-eye and the right-eye images. Thus, it can be seen that the depths of the video, the subtitles and the GUI are maintained naturally by turning the stereo mode ON when both the right-eye and left-eye contents are prepared in advance.

FIG. 12 shows an example of stereoscopic video that appears in a case where the viewer sees, through the shutter glasses 500, an image outputted when the stereo modes of the all the planes except for the video plane 6 are OFF. The stereo mode of the graphics plane needs to be OFF for discs that do not hold stereoscopic subtitles and GUIs (separate images for both the left and right eye). The reason that a disc may not contain stereoscopic subtitle/GUI may be that 1.) The disc does not have sufficient capacity to hold data for both eyes, or 2.) The content on the disc was created for 2D viewing and stereoscopic data is not available. Since the stereo mode of the video plane 6 is ON in FIG. 12, it can be seen that images in the left-view stream and images in the right-view stream are taken from different angles. Meanwhile, the stereo modes of the image plane 8 and the interactive graphics plane 10 are OFF, and the subtitles and the GUI that are shifted in the right and left directions are composited with the video in the video plane 6. Therefore, since the subtitles and GUI can be displayed closer to the viewer than the stereoscopic video even if only subtitles and GUI for only one eye exists. This lessens the fatigue or stress caused to the eyes of the viewer.

(Control for Realizing the Stereoscopic Effect)

The following describes a direction in which the data held in the graphics plane is shifted for realizing the stereoscopic effects.

Directions to which the plane shift engine 19 shifts the data held in the graphics plane depends on whether the data held in the graphics plane should stereoscopically appear in a position distant from the viewer than a position of the screen or should stereoscopically appear to pop out from the screen. In the present embodiment, it is presumed that the left-view images are shifted in the right direction (i.e. the data stereoscopically appears to pop out from the screen).

A difference between coordinates of each pixel data piece shifted in the right direction and coordinates of each pixel data piece shifted in the left direction is called a "shift amount". Thus, the shift amount is calculated in a way that the outputted result controls the depth of the image plane 8 or the data held in the interactive graphics plane 10. Here, the depth value shows how close to or distant from the viewer data held in each plane is displayed. The shift amount also can be calculated with use of one of parameters that can be adopted as the binocular disparity between both of the eyes at a time of executing the stereoscopic playback.

The parameter for shifting the pixel data pieces in the graphics plane in the right and left directions by the above-stated shift amount is called "plane offset". While the shift amount is a scalar amount, the plane offset is a vector having a positive or negative value. The plane offset indicates the direction, left direction or right direction, and the amount of shifting to be shifted in pixels from the current position. In the following description, the shifting is executed according to the plane offset. The plane offsets can be represented as the actual shift amount in pixels (with positive and negative value) or it can be represented as a value that can be used to calculate the actual shift amount in pixels.

The following describes the meanings of the positive and negative signs of the plane offset.

The plane offset of the graphics plane shows by how many pixels the coordinates of each of the pixel data pieces held in the right-view graphics plane and the coordinates of each of the pixel data pieces held in the left-view graphics plane are shifted.

When the viewer wants to obtain an effect that the video in the graphics plane pops out from the screen, the plane shift engine 19 shifts the data held in the left-view graphics plane in the right direction by the shift amount shown by the plane offset before the composition of data pieces in the planes. Then the plane shift engine 19 shifts the data held in the right-view graphics plane in the left direction by the shift amount shown by the plane offset. In the present embodiment, an effect that the images pops out from the screen can be obtained when the sign of the plane offset is a "positive sign".

When the viewer wants to obtain an effect that the images are displayed in a position distant from the viewer than the position of the screen, the plane shift engine 19 shifts the data held in the left-view graphics plane in the left direction by the shift amount shown by the plane offset before the composition of data pieces in the planes. Then the plane shift engine 19 shifts the data held in the right-view graphics plane in the right direction by the shift amount shown by the plane offset. In the present embodiment, an effect that the images are displayed in the position distant from the viewer than the position of the screen can be obtained when the sign of the plane offset is a "negative sign".

When the plane offset is "0", the plane shift engine 19 does not perform the shifting, which means that the plane shift engine 19 intentionally omits the shifting.

Figure 13A:
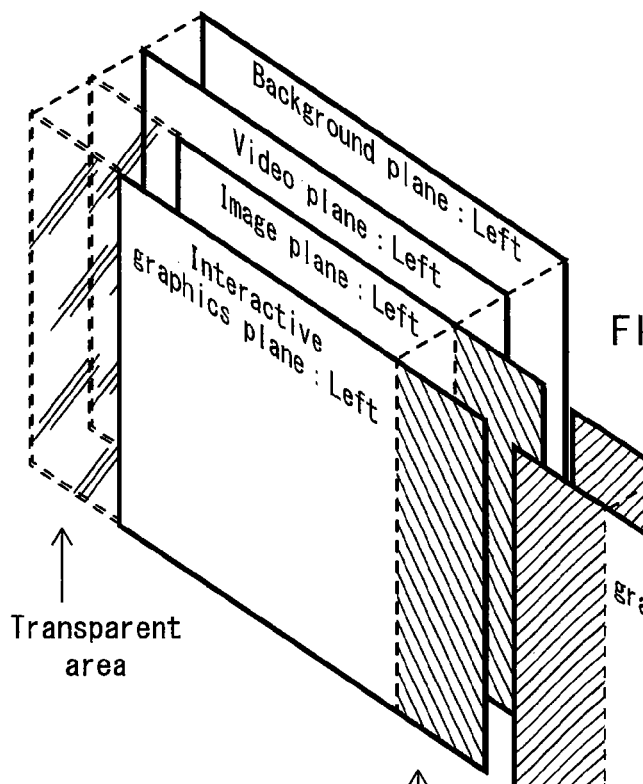
FIG. 13A and FIG. 13B show an image in a left-view graphics plane shifted in a right direction, and an image in a right-view graphics plane shifted in a left direction, respectively.
Figure 13B:
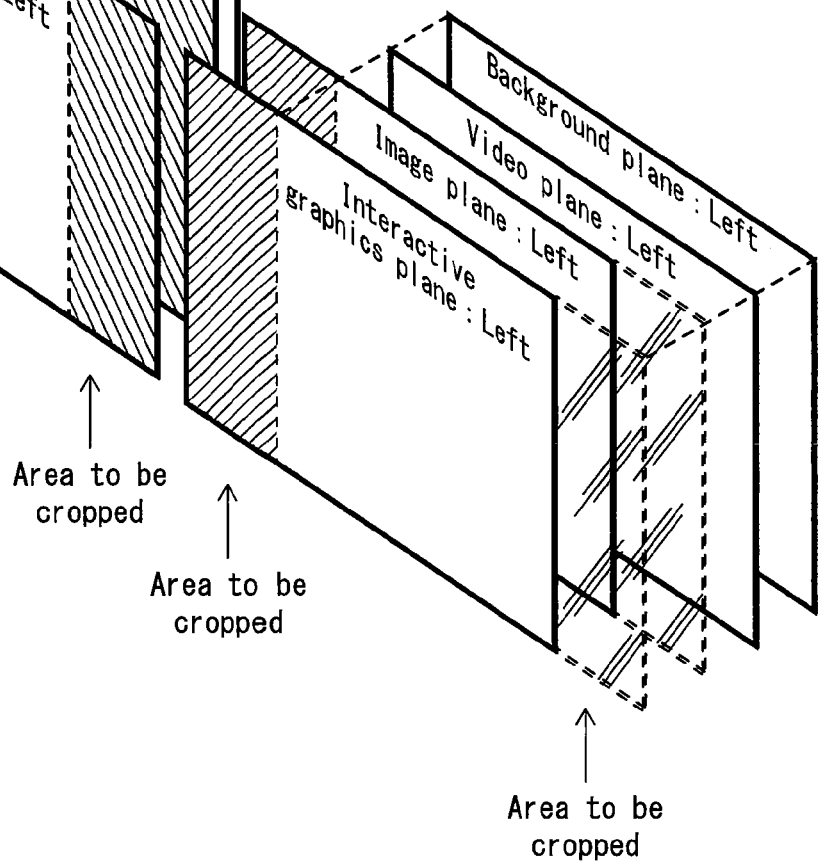

FIG. 13A and FIG. 13B show Shifted Left graphics plane that are shifted in the right direction, and Shifted Left graphics plane that are shifted in the left direction, respectively.

As shown in FIG. 13A, as a result of shifting the image plane 8 to the right direction, a transparent area at the left end exists, and an end portion of the image plane is cropped. Similarly, there is a transparent area at the left end of the interactive graphics plane 10 that is shifted in the right direction, and an end portion of the interactive graphics plane is cropped.

As shown in FIG. 13B, as a result of shifting the image plane 8 to the left direction, a transparent area at the right end exists, and the left end portion of the image plane is cropped. Similarly, there is a transparent area at the right end portion of the interactive graphics plane 10 that is shifted in the left direction, and the left end portion of the interactive graphics plane is cropped.

Figure 14A:
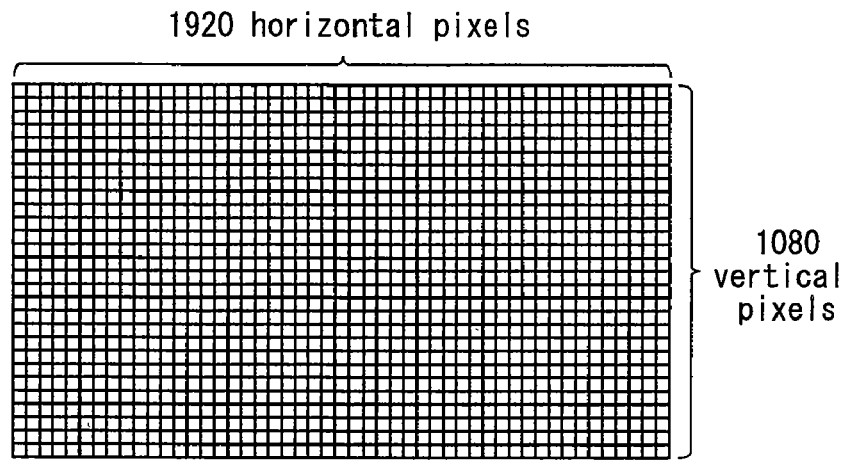
FIG. 14A and FIG. 14B show an internal structure of the image plane 8.
Figure 14B:
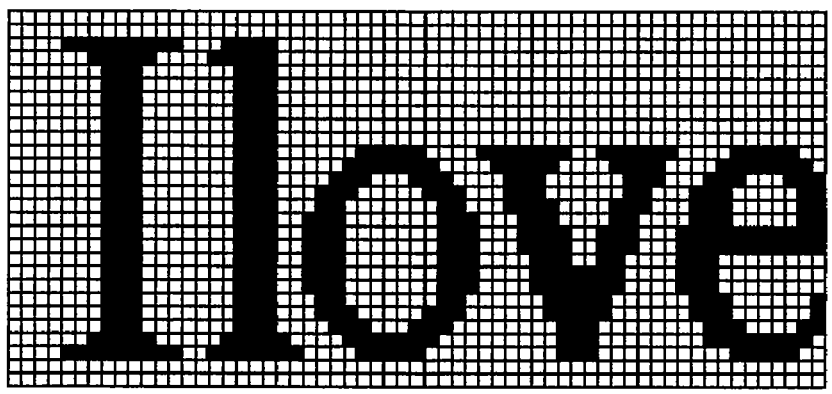

Each of FIG. 14A and FIG. 14B shows the internal structure of the image plane 8. When the resolution is set to 1920*1080, the image plane 8 is composed of 8 bit-length memory elements, and has a size of 1920(horizontal)*1080 (vertical) as shown in FIG. 14A. This means that the image plane 8 has a resolution of 1920*1080, and has a memory allocation capable of storing an 8-bit pixel code for each pixel. The 8-bit pixel codes stored in the memory elements are converted into Y, CR and Cb values by color conversion using the color look-up table. The correspondence relationship among the pixel codes and the Y, CR and Cb values is defined by a pallet definition segment in the subtitle data.

FIG. 14B shows pixel data pieces held in the image plane 8. As shown in FIG. 14B, the graphics data held in the image plane 8 is composed of pixel data pieces that compose a foreground area (part composing the subtitles "I love you") and pixel data pieces that compose a background area. Pixel codes showing transparent colors are stored in the memory elements corresponding to the background area. In this area, the video in the video plane 6 can be seen through when the graphics data held in the image plane 8 is composited with the video in the video plane 6. Meanwhile, pixel codes showing colors except for the transparent color (non-transparent color) are stored in the memory elements corresponding to the foreground area. The subtitles are written by the y, Cr, Cb and a values each showing the non-transparent color. In the area corresponding to transparent pixels, the content in the background graphics plane 10 and the content in the video plane 6 can be seen through when the composition unit 15 composites the graphics data held in the image plane 8 with the data held in the background graphics plane 11 and the video in the video plane 6. The transparent area contributes to realizing the composition.

Figure 15A:
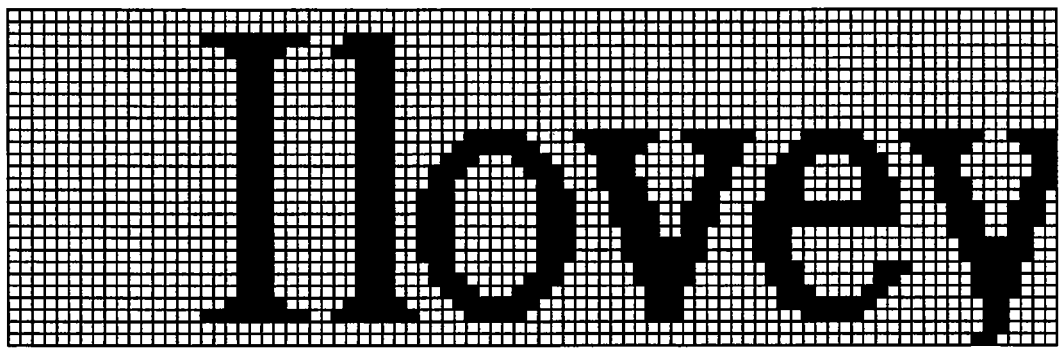
FIG. 15A, FIG. 15B and FIG. 15C show pixel data pieces in a foreground area and pixel data pieces in a background area after a plane shift engine 19 shifts coordinates of each pixel data piece in the right direction, and shifts the coordinates of each pixel data piece in the left direction.
Figure 15B:
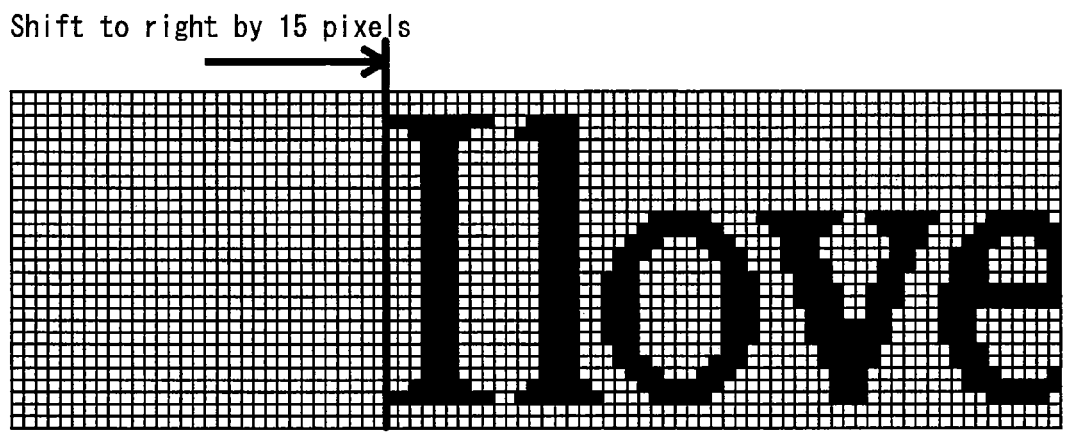
Figure 15C:
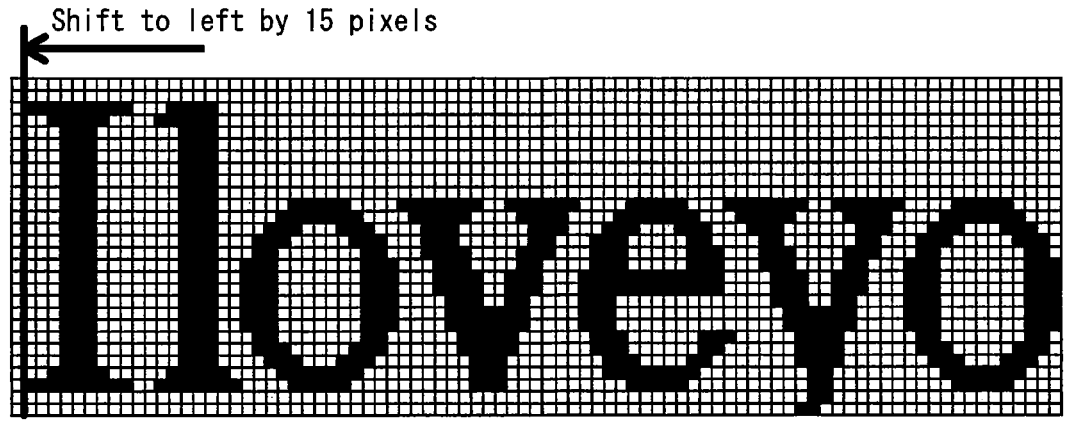

FIG. 15A, FIG. 15B and FIG. 15C show the pixel data pieces composing the foreground area and the pixel data pieces composing the background area after the shifting in the right direction or the shifting in the left direction have been performed. FIG. 15A shows the pixel data pieces before the shifting, and FIG. 15B shows the pixel data pieces after the shifting in the right direction is performed. It can be seen that a word "y" in the subtitles "I love you" disappears from the screen after the shifting when the shift amount is 15 pixels. FIG. 15C shows pixel data pieces after the shifting in the left direction is performed. It can be seen that "o" in the subtitles "you" succeeding the subtitles "I love" appears when the shift amount is 15 pixels.

This concludes the description of the internal structure of the image plane 8, and the description of the arrangements of pixel data pieces before and after the plane shift engine 19 performs the shifting in the image plane 8. The following describes the internal structure of the interactive graphics plane 10, and the arrangements of pixel data pieces held in the internal structure of the interactive graphics plane 10 before and after the shifting.

Figure 16A:
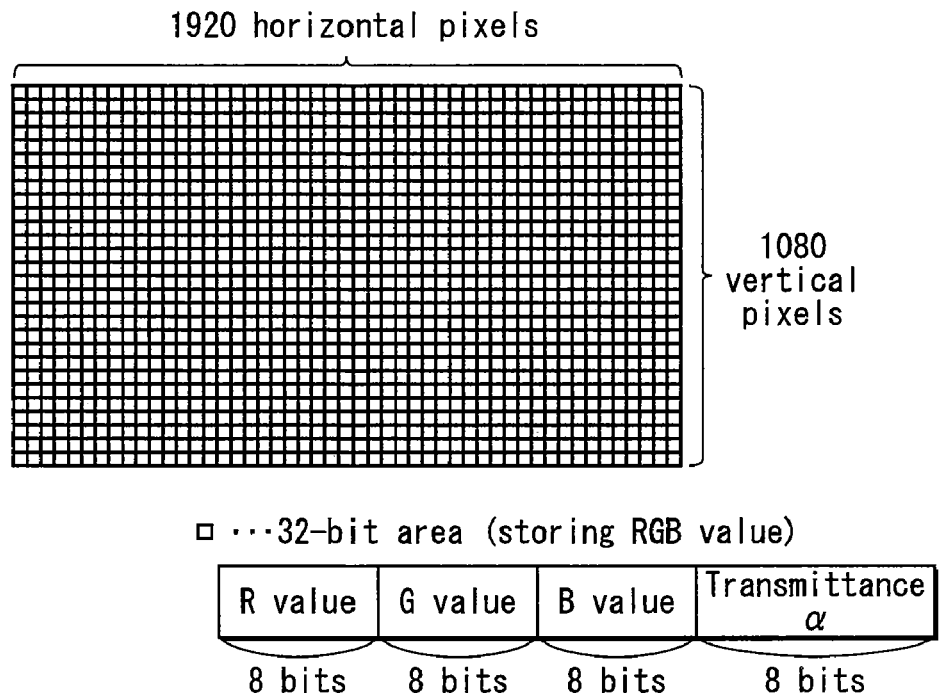
FIG. 16B shows an internal structure of the interactive graphics plane 10.
Figure 16B:
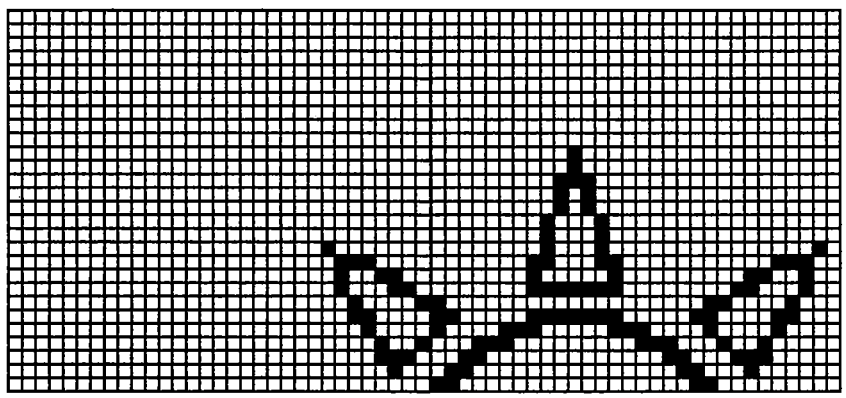

Each of FIG. 16A and FIG. 16B shows the internal structure of the interactive graphics plane 10. When the resolution is set to 1920*1080, the interactive graphics plane 10 is composed of 32 bit-length memory elements, and has a size of 1920*1080 as shown in FIG. 16A. This means that the interactive graphics plane 10 has a resolution of 1920*1080, and has a memory allocation capable of storing a 32-bit R, G, B and α values per pixel. The 32-bit R, G, B and a values are composed of an 8-bit R value, an 8-bit G value, an 8-bit B value and an 8-bit transparency α, respectively.

FIG. 16B shows pixel data held in the interactive graphics plane 10. As shown in FIG. 16B, the graphics held in the interactive graphics plane 10 is composed of pixel data corresponding to the foreground area shown by triangles expressing a corona of the sun, and other pixels are transparent, meaning where corona of sun is not shown, the background area will be shown. Memory elements corresponding to the background area store R, G, B and a values showing transparent colors. In this area, the video in the video plane 6 can be seen through when the graphics data held in the interactive graphics plane 10 is composited with the data held in the video plane 6. Meanwhile, memory elements corresponding to the foreground area store R, G, B and α values showing the non-transparent colors. The graphics are written with use of these R, G, B and α values showing the non-transparent colors.

The graphics data held in the background graphics plane 10, the video in the video plane 6 and the graphics data held in the image plane 8 can be seen through when the foreground plane has a transparent pixel and the composition unit 15 composites these data pieces in the respective planes. The transparent area contributes to realizing the composition.

This concludes the description of the pixel data pieces composing the foreground area and the pixel data pieces composing the background area after the shifting in the right direction and the shifting in the left direction have been performed.

Figure 17A:
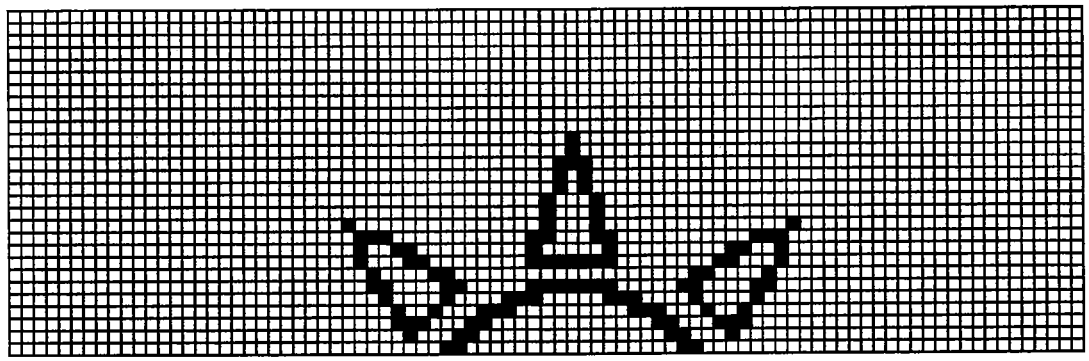
FIG. 17A, FIG. 17B and FIG. 17C show pixel data pieces in a foreground area and pixel data pieces in a background area after the plane shift engine 19 shifts the coordinates of each pixel data piece in the right direction, and shifts the coordinates of each pixel data piece in the left direction.
Figure 17B:
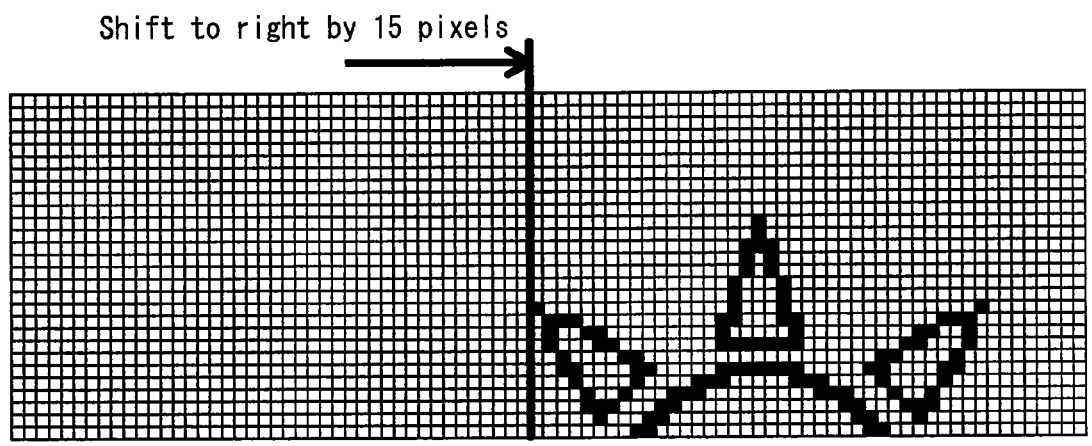
Figure 17C:
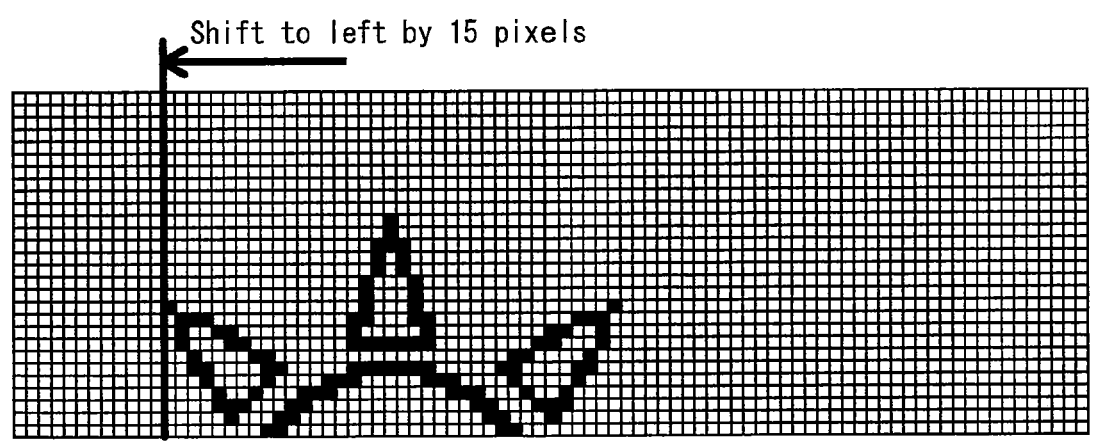

FIG. 17A, FIG. 17B and FIG. 17C show the pixel data composing the foreground area and the pixel data composing the background area after the shifting in the right direction and the shifting in the left direction have been performed. FIG. 17A shows pixel data before the shifting is performed, and FIG. 17B shows pixel data after the shifting in the right direction has been performed. In this case, it can be seen that triangles showing a corona of the sun are shifted in the right direction. FIG. 17C shows pixel data after the shifting in the left direction is performed. It can be seen that the triangles showing the corona of the sun are shifted in the left direction.

FIG. 18A FIG. 18B and FIG. 18C show the procedure for plane shifting process of image plane 8.

FIG. 18A shows image plane that have been shifted in the left direction and image plane that have been shifted in the right direction.

FIG. 18B shows the shifting process of image plane to the right direction. As shown in FIG. 18B, horizontal shifting of image plane to the right direction takes the following steps (1-1), (1-2) and (1-3). (1-1) The plane shift engine 19 crops a right end area of the image plane 8. (1-2) The plane shift engine 19 shifts coordinates of each of the pixel data in the image plane 8 horizontally to the right direction by a shift amount shown by the plane offset. (1-3) The plane shift engine 19 adds a transparent area at the left end of the image plane 8.

FIG. 18C shows the shifting process of image plane to the left direction. As shown in FIG. 18C, horizontal shifting of image plane to the left direction takes the following steps (2-1), (2-2) and (2-3). (2-1) The plane shift engine 19 crops a left end area of the image plane 8. (2-2) The plane shift engine 19 shifts the coordinates of the pixel data in the image plane 8 horizontally to the left direction by a shift amount shown by the plane offset. (2-3) The plane shift engine 19 adds a transparent area at the right end of the graphics data held in the image plane 8.

Next, meanings of the positive and negative signs of plane offsets are described.

When the playback apparatus 200 is in the 3D display mode and the stereo mode of the image plane 8 is OFF, the playback apparatus 200 perform the composition after performing the following processing in the planes based on the shift amount shown by the plane offsets.

When the positive sign of the plane offset is set, the plane shift engine 19 shifts coordinates of each of the pixel data in the left-view image plane 8 in the right direction by the shift amount indicated by the plane offset. Then, the plane shift engine 19 shifts coordinates of each of the pixel data in the right-view image plane 8 in the left direction by the shift amount indicated by the plane offset.

When the negative sign of the plane offset is set, the plane shift engine 19 shifts coordinates of each of the pixel data in the left-view image plane 8 in the left direction by the shift amount indicated by the plane offset before the composition of the data in the respective planes. Then, the plane shift engine 19 shifts coordinates of each of the pixel data pieces in the right-view image plane 8 in the right direction by the shift amount indicated by the plane offset.

Figure 19B:
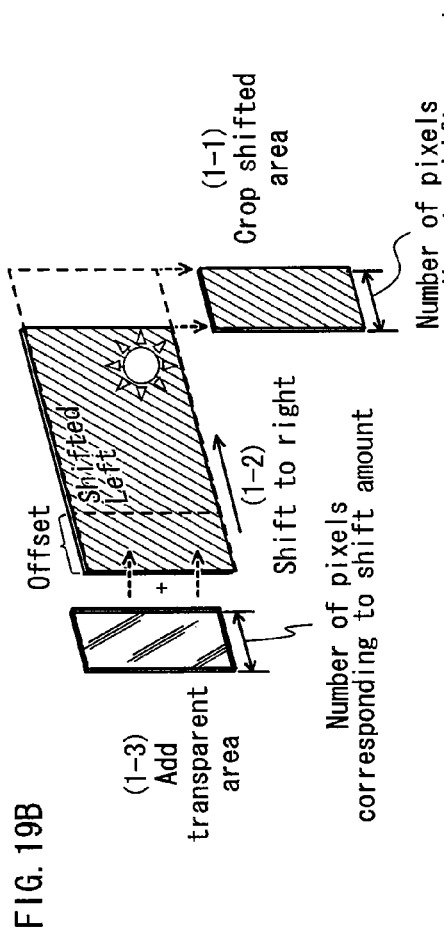
FIG. 19A, FIG. 19B and FIG. 19C show processing procedures for shifting the coordinates of each pixel data piece held in the interactive graphics plane 10.
Figure 19C:
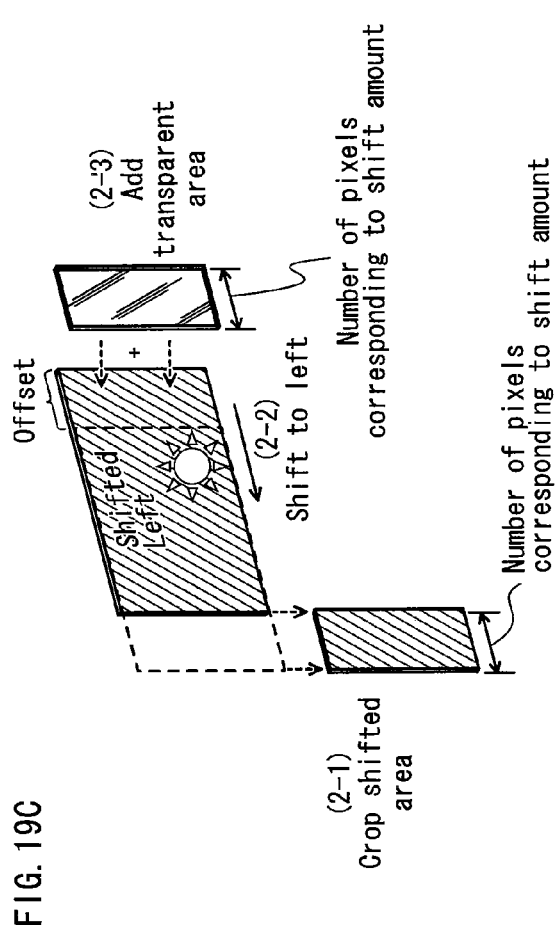

FIG. 19 A, FIG. 19B and FIG. 19C show the procedure for shifting the interactive graphics plane 10.

Figure 19A:
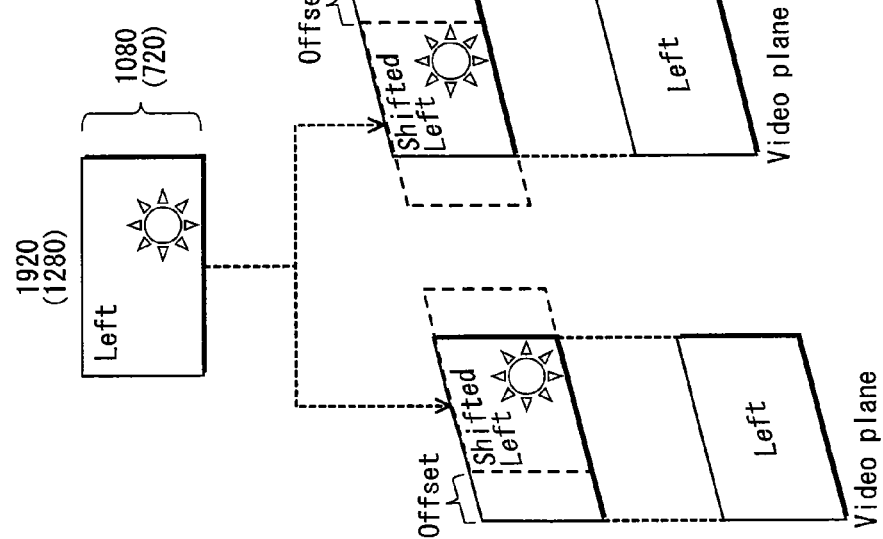

FIG. 19A shows the interactive graphics plane that have been shifted in the left direction and the interactive graphics plane that have been shifted in the right direction.

FIG. 19B shows the shifting process of interactive graphics plane to the right direction. As shown in FIG. 19B, horizontal shifting of interactive graphics plane to the right direction takes the following steps (1-1), (1-2) and (1-3). (1-1) The plane shift engine 19 crops a right end area of the interactive graphics plane 10. (1-2) The plane shift engine 19 shifts the coordinates of the pixel data in the interactive graphics plane 10 horizontally to the right direction by a shift amount indicated by the plane offset. (1-3) The plane shift engine 19 adds a transparent area at the right end of the interactive graphics plane 10.

FIG. 19C shows the shifting process of interactive graphics plane to the left direction. As shown in FIG. 19C, horizontal shifting of interactive graphics plane to the left direction takes the following steps (2-1), (2-2) and (2-3). (2-1) The plane shift engine 19 crops a left end area of the interactive graphics plane 10.

(2-2) The plane shift engine 19 shifts the coordinates of each of the pixel data pieces in the interactive graphics plane 10 horizontally in the left direction by a shift amount indicated by the plane offset. (2-3) The plane shift engine 19 adds a transparent area at the left end of the interactive graphics plane 10.

The following describes the size of the right end area and left end area of the graphics data to be cropped, and the size of the areas to be added at the right end and left end of the graphics data, in the interactive graphics plane 10, at the time of shifting the coordinates of each of the pixel data pieces in the respective planes. The plane offset used for the above-stated shifting is a value that responds to the binocular disparity between the right eye and the left eye. This means that each of: the number of horizontal pixels composing the right end area to be cropped; the number of horizontal pixels composing the left end area of the graphics data to be cropped in the graphics plane; and the number of horizontal pixels composing the transparent area to be added at each of the right and left ends of the graphics data held in the graphics plane need to be the number of pixels corresponding to the plane offset.

Therefore, the number of horizontal pixels composing the right end area to be cropped and the number of horizontal pixels composing the left end area to be cropped in the graphics plane is the number of pixels corresponding to the shift amount indicated by the plane offset. Also, the number of vertical pixels composing the transparent areas is the number of pixels corresponding to the height of the graphics plane.

Similarly, the number of horizontal pixels composing the transparent areas to be added at each of the right and end ends of the graphics image held in the graphics plane is the number of pixels corresponding to the shift amount indicated by the plane offset. The number of vertical pixels composing the transparent areas is the number of pixels corresponding to the height of the graphics plane.

This concludes the description of the process of shifting the image plane 8 and the interactive graphics plane 10. The following describes the meanings of the positive and negative signs of the plane offset.

When the playback apparatus 200 is in the 3D playback mode, and the stereo mode of the interactive graphics plane 10 is OFF, the playback apparatus 200 performs the composition after performing the following process in the planes based on the plane offset.

When the positive sign of the plane offset is set, the plane shift engine 19 shifts the left-view graphics plane in the right direction by the shift amount shown by the plane offset. And, the plane shift engine 19 shifts the right-view graphics plane by the shift amount shown by the plane offset.

When the negative sign of the plane offset is set, the plane shift engine 19 shifts the left-view graphics plane in the left direction by the shift amount shown by the plane offset. And, the plane shift engine 19 shifts the right-view graphics plane in the right direction by the shift amount shown by the plane offset.

Figure 20B:
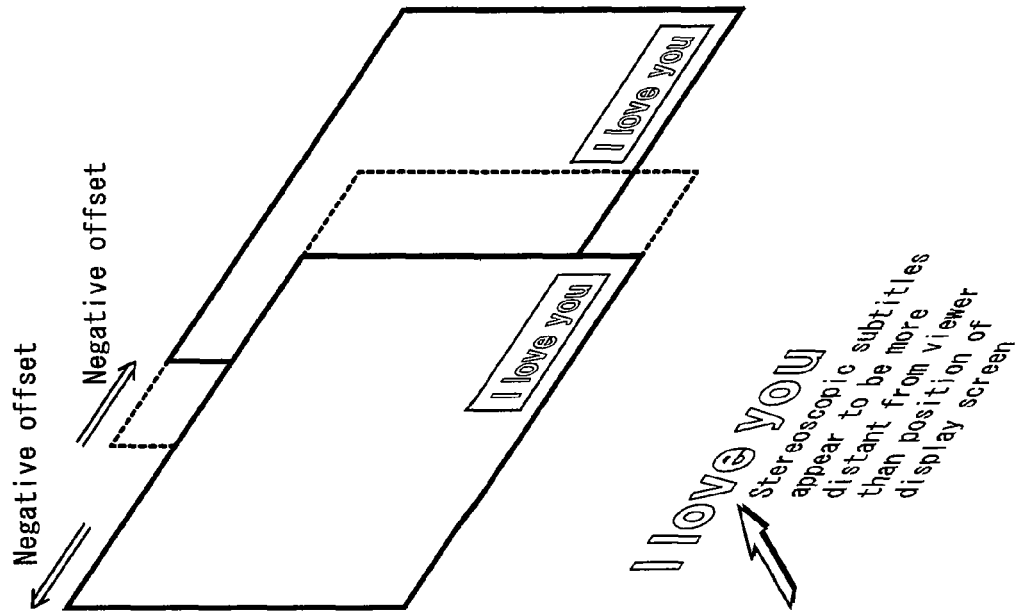
FIG. 20A and FIG. 20B show how depth of subtitles changes by a negative offset and a positive offset.
Figure 20A:
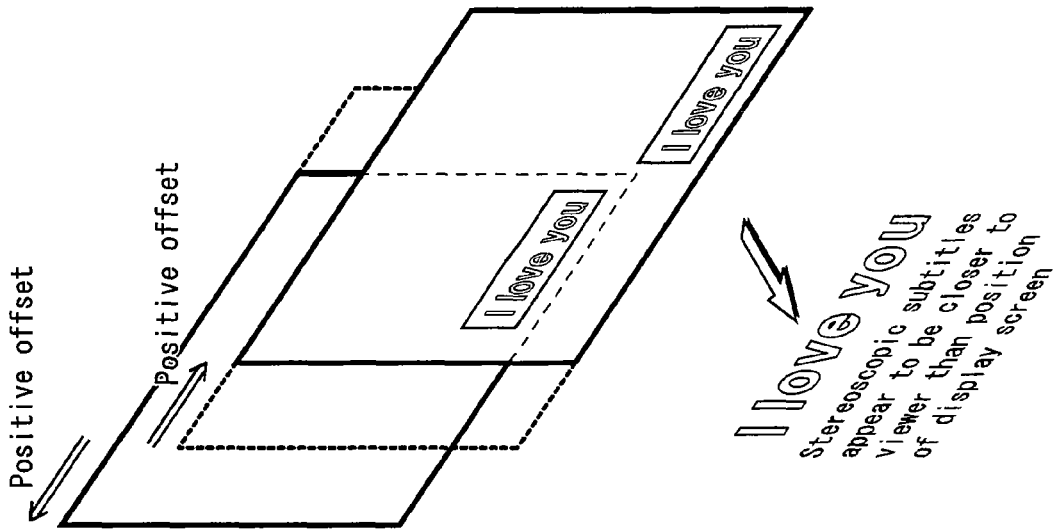

FIG. 20A and FIG. 20B show how the pop-out level of the subtitles (level of how far the subtitles pop out from the display screen) changes according to the value of the plane offset.

An image depicting the graphics data that is closer to the viewer in each of FIG. 20A and FIG. 20B is a graphics image for the right view (right-view graphics image) after shifting. An image depicting the graphics data that is distant from the viewer in each of FIG. 20A and FIG. 20B is a graphics image for the left view (left-view graphics image) after shifting.

FIG. 20A shows a case where the sign of the plane offset is positive (the plane shift engine 19 shifts left-view graphics image in the right direction, and shifts the right-view graphics image in the left direction). When the sign of the plane offset is positive, subtitles to be composited with the left-view video appears to be in a position more to the right than the subtitles to be composited with the right-view video. That is, since a point of convergence (focus position) is closer to the viewer than the position of the screen, the subtitles also appear to be closer to the viewer than the position of the screen.

FIG. 20B shows a case where the sign of the plane offset is negative. When the sign of the plane offset id negative, subtitles to be composited with the right-view video appears to be in a position more to the left than the subtitles to be composited with the right-view video. That is, since a point of convergence (focus position) is more distant from the viewer than the position of the screen, the subtitles also appear to be distant from the viewer than the position of the screen.

This concludes the description of the method for displaying the subtitles in a position closer to the viewer than the position of the display screen or in a position more distant from the viewer than the position of the display screen by switching between the positive offset and the negative offset.

Figure 31A:
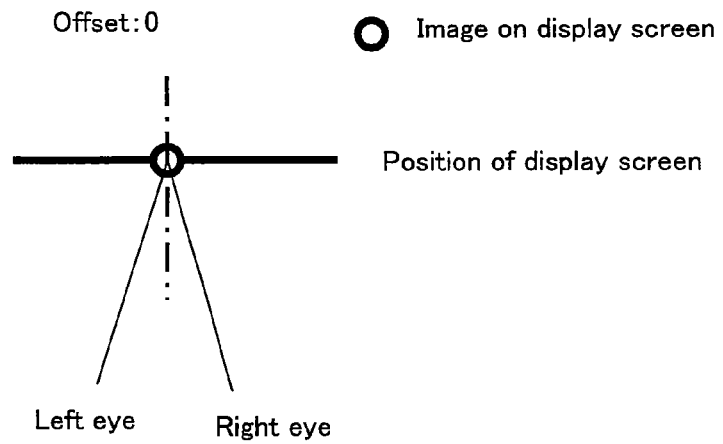
FIG. 31A, FIG. 31B and FIG. 31C describe principles of how a planer image appears to be in a position closer to a viewer than a position of a display screen.
Figure 31B:
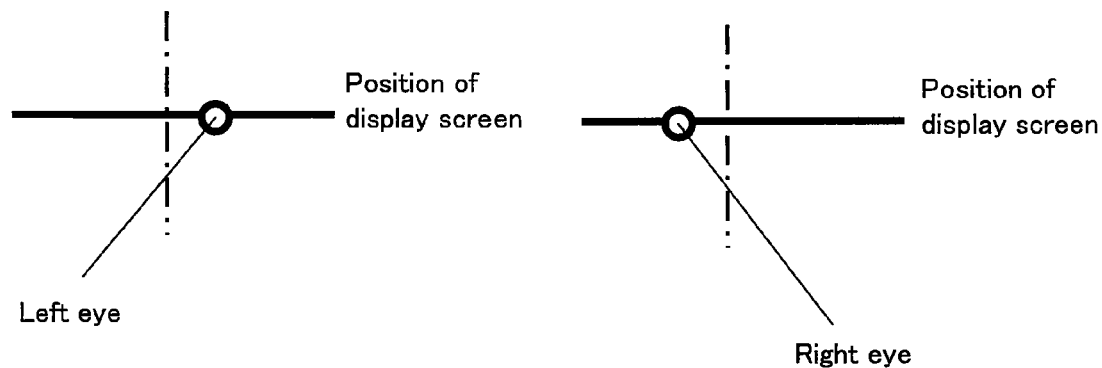
Figure 31C:
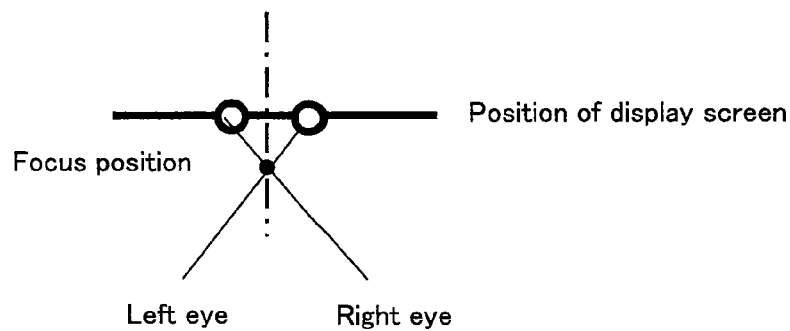

FIG. 31A, FIG. 31B and FIG. 31C describe the principles of how the image appear to be closer to the viewer than the display screen when the sign of the plane offset is positive (the plane shift engine 19 shifts the left-view graphics image in the right direction, and shifts the right-view graphics image in the left direction).

In each of FIG. 31A, FIG. 31B and FIG. 31C, a circle is an image displayed on the display screen.

Firstly, since the image seen by the right eye and the image seen by the left eye are in the same position when there is no offset, the focus position at which both of the eyes see the image is on the display position (FIG. 31A).

Meanwhile, when the playback apparatus 200 is in the 3D display mode, and the stereo mode is OFF, the image seen by the left eye should appear in a position more to the right compared to the case where the offset is "0". At this time, the right eye should be covered by the crystal liquid shutter glasses so that the right eye cannot see anything. The image seen by the right eye, on the other hand, should be in a position more to the left compared to the case where the offset is "0". At this time, the left eye should be covered by the crystal liquid shutter glasses so that the left eye cannot see anything (FIG. 31B).

We focus on the image with use of both of the eyes to recognize the image in the focus position. Accordingly, when switching between a state in which the left eye sees the image and a state in which the right eye sees the image is performed by the crystal liquid shutter glasses at a short time interval, both of our eyes try to focus on the image in a position closer to us than the position of the display screen. As a result, we have an illusion as if the image is in the focus position closer to us than the position of the display screen (FIG. 31C).

Figure 42A:
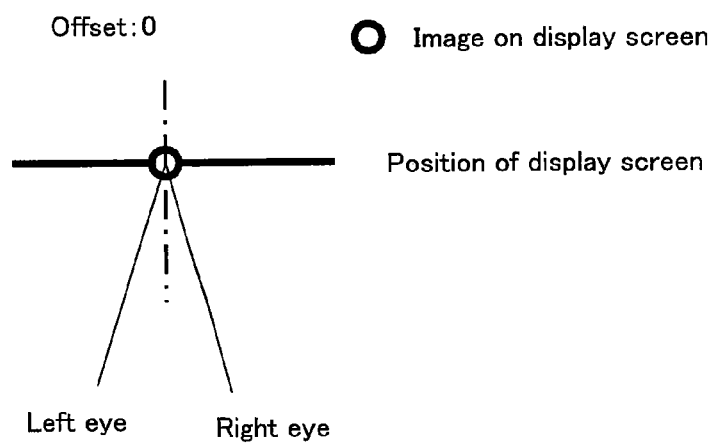
FIG. 42A, FIG. 42B and FIG. 42C describe principles of how a planar image appears to be in a position more distant from the viewer than a position of the display screen.
Figure 42B:
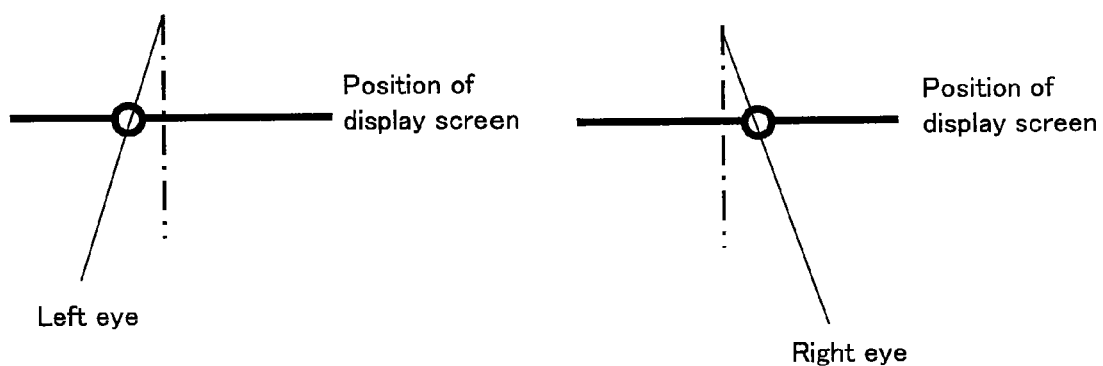
Figure 42C:
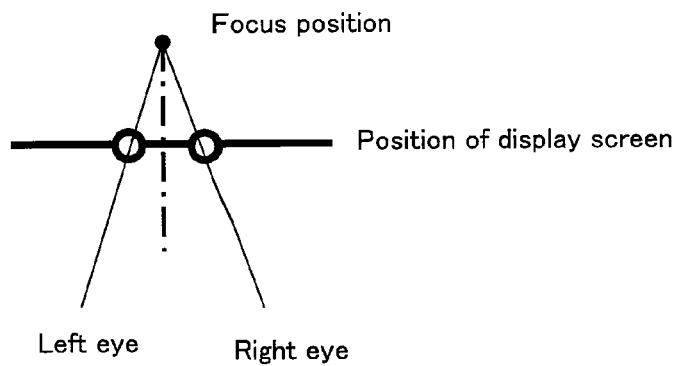

FIG. 42A, FIG. 42B and FIG. 42C describe the principles of how the image appears to be distant from the viewer than the display screen when the sign of the plane offset is negative (the plane shift engine 19 shifts the left-view graphics image in the left direction, and shifts the right-view graphics image in the right direction).

In each of FIG. 42A, FIG. 42B and FIG. 42C, a circle is an image displayed on the display screen. Firstly, since the image seen by the right eye and the image seen by the left eye are in the same position when there is no offset, the focus position at which both of the eyes see the image is the position of display screen (FIG. 42A).

Meanwhile, when the playback apparatus 200 is in the 3D display mode, and the stereo mode is OFF, the image seen by the left eye should appear in a position more to the left compared to the case where the offset is "0". At this time, the right eye should be covered by the crystal liquid shutter glasses so that the right eye cannot see anything. The image seen by the right eye, on the other hand, should be in a position more to the right compared to the case where the offset is "0". At this time, the left eye should be covered by the crystal liquid shutter glasses so that the left eye cannot see anything (FIG. 42B).

When switching between a state in which the left eye sees the image and a state in which the right eye sees the image is performed by the crystal liquid shutter glasses at a short time interval, both of our eyes try to focus on the image in a position more distant from us than the position of the display screen. As a result, we have an illusion as if the image is in the focus position more distant from us than the position of the display screen (FIG. 42C).

This concludes the description of the graphics image written in the graphics plane. However, it is needless to say that the same concept of the above-stated offset may be applied to the interactive graphics plane 10, the video plane 6 and the background plane 11.

(Shifting of the Coordinates of the Pixel Data in the Respective Memory Elements in the Graphics Plane)

The following describes how the plane shift engine 19 shifts coordinates of the pixel data in the memory elements in the graphics plane due to the above-stated shifting. The graphics data is composed of pixel data pieces, and has a resolution 1920*1080 or 1280*720, for example.

FIG. 21 shows the pixel data pieces held in the graphics plane. In FIG. 21, squared frames are memory elements having 32 or 8 bit word length. Hexadecimal numerical values such as 0001, 0002, 0003, 0004, 07A5, 07A6, 07A7, 07A8, 07A9, 07AA and 07AB are addresses serially allocated to these memory elements in the memory space of the MPU. Also, each of the numerical values such as (0, 0), (1, 0), (2, 0), (3, 0), (1916, 0), (1917, 0), (1918, 0) and (1919, 0) in the respective memory elements shows coordinates of which pixel data is stored in a corresponding memory element.

The pixel data in a pair of coordinates (0, 0) is stored in the memory element whose address is 0001. The pixel data whose coordinates are (1, 0) is stored in a memory element whose address is 0002. The pixel data whose coordinates are (1918, 0) is stored in a memory element whose address is 07A7. The pixel data whose coordinates are (0, 1) is stored in a memory element whose address is 07A9. That is, it can be seen that graphics data is stored such that a plurality of lines composing the graphics are composed of memory elements having serially-arranged addresses thus, these pixel data pieces may be read in a burst mode by sequentially performing the DMA transfer on the memory elements to which the serial addresses are given.

Each of FIG. 22A and FIG. 22B shows what is held in the graphics plane after the shifting has been performed.

FIG. 22A shows the graphics plane after the coordinates of each of the pixel data pieces have been shifted in the right direction with the plane offset being 3. Since the plane offset is "3", the pixel data whose coordinates are (0, 0) in a graphics plane coordinate system is stored in a memory element whose address is 0004, pixel data whose coordinates are (1, 0) in the graphics plane coordinate system is stored in a memory element whose address is 0005, and pixel data whose coordinates are (2, 0) in the graphics plane coordinate system is stored in a storage element whose address is 0006.

Also, it can be seen that pixel data whose coordinates are (0, 1) in the graphics plane coordinate system is stored in a memory element whose address is 07AC, pixel data whose coordinates are (1, 1) in the graphics plane coordinate system is stored in a memory element whose address is 07AD, and pixel data whose coordinates are (2, 1) in the graphics plane coordinate system is stored in a memory element whose address is 07AE.

FIG. 22B shows the graphics plane after the plane shift engine 19 has shifted the coordinates of the pixel data pieces in the left direction with the plane offset being 3. Since the plane offset is "3", it can be seen that pixel data whose coordinates are (3, 0) in the graphics plane coordinate system is stored in a memory element whose address is 0001, pixel data whose coordinates are (4, 0) in the graphics plane coordinate system is stored in a memory element whose address is 0002, and pixel data whose coordinates are (5, 0) in the graphics plane coordinate system is stored in a memory element whose address is 0003.

Also, it can be seen that pixel data whose coordinates are (3, 1) in the graphics plane coordinate system is stored in a memory element whose address is 07A9, pixel data whose coordinates are (4, 1) in the graphics plane coordinate system is stored in a memory element whose address is 07AA, and pixel data whose coordinates are (5, 1) in the graphics plane coordinate system is stored in a memory element whose address is 07AB.

As described in the above, it can be seen that, in the graphics plane after the shifting has been performed, the coordinates of each of the pixel data in the graphics plane are shifted to the right or left from the original coordinates of each of the pixel data pieces by the number of pixels shown by the plane offset.

In order to realize the shifting in the graphics plane, the plane shift engine 19 needs to shift the coordinates of each of the pixel data composing the graphics data by an amount indicated in a predetermined address, an address of a memory element on which each of the pixel data pieces composing the graphics data is positioned. It is needless to say that the plane shift engine 19 can realize the shifting in the graphics plane without changing the address of the memory element on which each of the pixel data pieces is arranged, by performing processing that corresponds to the above-stated processing.

This concludes the description of what is held in the graphics plane after the plane shift engine 19 has performed the shifting.

Figure 23:
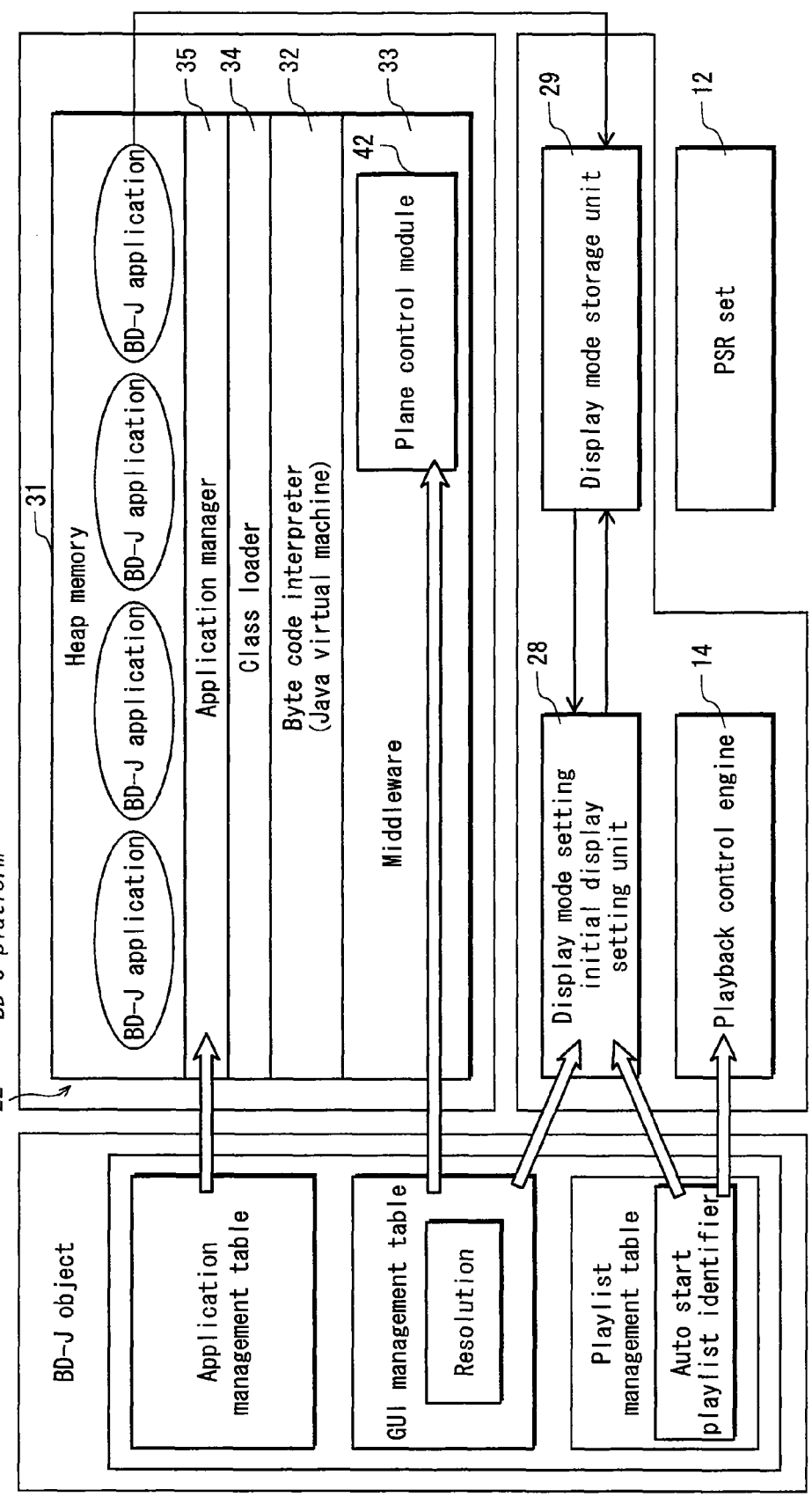
FIG. 23 shows an internal structure of a BD-J platform unit.

FIG. 23 shows an internal structure of the BD-J platform unit. As shown in FIG. 23, the BD-J platform is composed of a heap memory 31, a byte code interpreter 32, a middleware 33, a class loader 34 and an application manager 35.

The heap memory 31 is a stack area on which the byte code of the system application, the byte code of the BD-J application, a system parameter used by the system application and an application parameter used by the BD-J application are arranged.

The byte code interpreter 32 converts the byte codes composing the BD-J application stored in the heap memory 31 and byte codes composing the system application into native codes, and causes the MPU to execute the converted codes.

The middleware 33 is an operating system for the embedded software, and is composed of a kernel and a device driver. The kernel provides the BD-J application with functions specific to the playback apparatus 200 in accordance with calls of the application programming interface (API) from the BD-J application. Also, the kernel realizes hardware control such as starting an interrupt handler unit by an interrupt signal.

The class loader 34 is one of the system applications, and loads the BD-J application by reading the byte codes from the class files that exist in the JAR archive file, and storing the byte codes in the heap memory 31.

The application manager 35 is one of the system applications, and performs the application signaling of the BD-J application such as starting the BD-J application or ending the BD-J application, based on the application management table in the BD-J object.

This concludes the description of the internal structure of the BD-J platform unit.

In the above-stated layer model, the display mode setting initial display setting unit 28 is in the lower layer of the platform unit, which sets a display mode and a resolution based on the BD-J object in the current title used by the BD-J platform unit.

(Internal Structure of the Display Mode Storage Unit 29)

The display mode storage unit 29 can be referred to from the above-stated layer model. Therefore, the display mode storage unit 29 can be referred to from the layer model via the API, and includes information showing a setting and a state of each of the background graphics plane 11, the video plane 6, the image plane 8 and the interactive graphics plane 10. The following describes the structure of the display mode storage unit 29, referring to FIG. 24.

Figure 24:
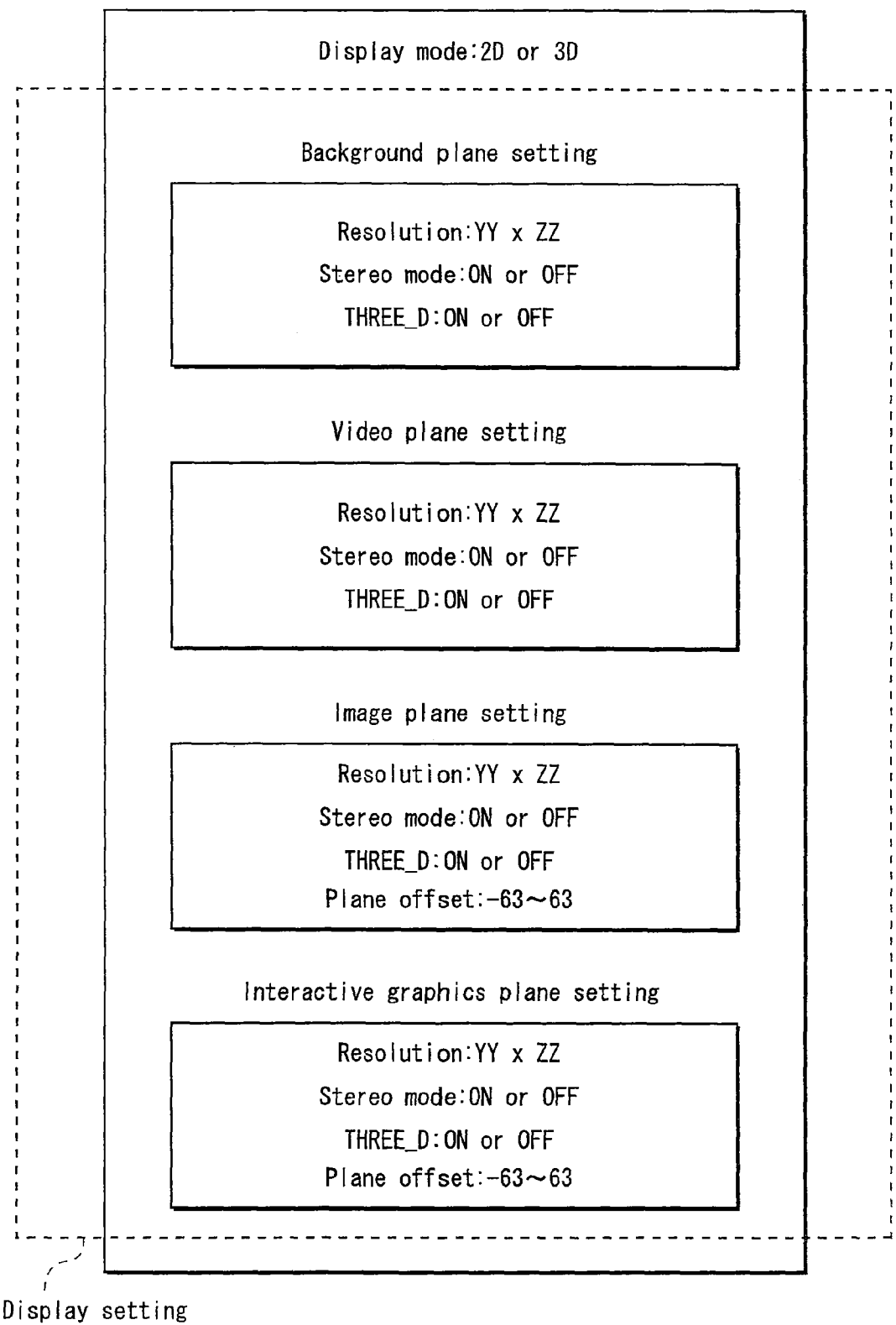
FIG. 24 shows what is stored in a display mode storage unit 29.

FIG. 24 shows what is stored in the display mode storage unit 29.

In FIG. 24, the display mode storage unit 29 stores information on the setting of the background plane 11, information on the setting of the video plane 6, information on the setting of the image plane 8, information on the setting of the interactive graphics plane 10, and information on the state of the display mode showing whether the playback apparatus 200 is in the 2D mode or the 3D mode. "Resolution (:YY×ZZ in FIG. 24)" and a stereo mode (:ON or OFF in FIG. 24) and a setting of THREE_D (:ON or OFF in FIG. 24) are stored as setting items of each plane. Besides the above-stated setting items, the plane offset may be set in a range of "−63" to "+63" in the setting of the image plane 8 and the setting of the interactive graphics plane 10.

The following describes the resolution supported by the display mode storage unit 29.

When the playback apparatus 200 is in the 2D display mode, the display mode storage unit 29 supports a resolution of 1920*1080 pixels, a resolution of 1280*720 pixels, a resolution of 720*576 pixels, and a resolution of a 720*480 pixels for the background plane 11, the video plane 6, the image plane 8 and the interactive graphics plane 10, as the initial display setting. When the playback apparatus 200 is in the 3D display mode, the display mode storage unit 29 may support a resolution of 1920*2160 pixels or a resolution of 1280*1440 pixels for each of the background plane 11, the image plane 8 and the interactive graphics plane 10 in addition to the resolution of the 2D display mode. In such case, an aspect ratio of 1920*2160 pixels or an aspect ratio of 1280*1440 pixels will be an aspect ratio of (16/18), and an upper half of each plane is used as an area for the left eye, and a lower half of each plane is used as an area for the right eye.

This concludes the description of what is stored in the display mode storage unit 29.

The following describes the case where the THREE_D setting of each plane changes.

Firstly, it is necessary to change a setting of each plane in the display mode storage unit 29 as condition when the display mode is switched. For example, when the display mode is set to the 2D display mode, the THREE_D setting of each plane needs to be OFF. Also, when the display mode is set to the 3D display mode, the THREE_D setting of each plane needs to be ON.

The following describes a case where a stereo mode and a plane offset are reset.

When the playback apparatus 200 falls in the 2D display mode as a result of the title selection, the stereo mode of each of the background plane 11, the video plane 6, the image plane 8 and the interactive graphics plane 10 is switched to OFF, and the shift amount of each of the image plane 8 and the interactive graphics plane 10 shown by the offset is set to "0".

When the display mode cannot be determined before the title selection, the display mode before starting the title is the 2D display mode.

The following describes what causes the switching between the display modes to be performed.

The display mode in the display mode storage unit 29 is possibly switched in one of two: a case where the playlist is switched, and a case where the BD-J application expressly gives an instruction for the switching by a method call.

The following describes patterns of switching between the display modes caused by playback of the playlist.

The following describes the pattern in which the display mode is changed by the playback of the playlist. When the 2D playlist is played back in the 3D display mode, the playback apparatus 200 automatically switches the display mode in the display mode storage unit 29 to the 2D display mode. When the display mode is switched, an event is generated asynchronously to the event listener registered in the BD-J application.

The display mode is not switched even if the playback of the playlist is stopped. That is, the display mode always remains in the current state even after the playback of the playlist is stopped.

The following describes the initial display setting by the display mode setting initial display setting unit 28.

The initial display setting is a value set "at the time of starting the title" of the display setting such as a resolution stored in the display mode storage unit 29.

The following describes what affects the initial display setting.

When the 3D display function flag shows that the playback apparatus 200 is capable of displaying 3D graphics, the initial display setting is not determined based on only the auto start playlist (playlist) of the 2D playback apparatus or the default setting described in the BD-J object. The determination of the initial display setting is also affected by the 3D display mode before the title selection.

The following describes criteria for determining the initial display setting. The initial display setting is determined based on the default start playlist.

When there is a auto start playlist, the playback apparatus 200 sets a resolution for the 2D graphics corresponding to a resolution of the video of the auto start playlist after automatically switching the display mode to the 2D display mode when the playback apparatus 200 is in the 3D display mode, and the playlist is a 2D playlist.

When there is the auto start playlist, and the auto start playlist does not affect the display mode, the playback apparatus 200 selects the initial display setting of a resolution corresponding to a resolution of a video from among resolutions supported by the display mode before the title selection, and sets the resolution.

The following describes a case where the resolution and the plane offset do not change.

When there is the auto start playlist, and the playback apparatus 200 switches to 3D display mode as a result of the title selection, stereo mode values (described in the following) of the background plane 11, the video plane 6, the image plane 8 and the interactive graphics plane 10 do not change, and the plane offset for each of these planes does not change, either.

The following describes the criteria for determining the setting when there is no auto start playlist.

When there is no auto start playlist, the initial display setting is always determined based on a value of the default resolution that is written in the BD-J object and corresponds to the selected title. In this case, the determination of the initial display setting is not affected by the display mode before starting the title.

The following describes a case where the stereo mode and the plane offset are reset.

When the title is selected in which the auto start playlist does not exist, the stereo mode of each of the image plane 8 and the interactive graphics plane 10 is ON if the display mode is the 3D display mode, and the stereo mode of each of the background plane 11 and the video plane 6 is OFF.

Furthermore, when the display mode is switched from the 3D display mode to the 2D display mode, a stereo mode of each plane is set to OFF, and the shift amount shown by the plane offset is set to "0".

(Switching Between Display Modes when a Title is Changed)

As described in the above, there are information on resolutions and specification of the auto start playlist for each of the BD-J objects corresponding to the titles. Therefore, when a title is changed, the corresponding BD-J object is also changed. Thus, the content of the display mode set in the display mode storage unit 29 also changes accordingly. The following describes how the display mode changes when the title is changed, with use of FIG. 25.

FIG. 25 shows, in a table, changes in the display modes when the title is changed. The table in FIG. 25 shows the correspondence among the display mode before selecting the current title, type of auto start playlist for the title to be selected, default resolution written in the BD-J object, the display modes of the current title, and the initial display settings.

The default playlists and the default resolutions are in the exclusive relationship. If the auto start playlist exits in the title (i.e. the title is valid), the display mode responds to the resolution stipulated in the auto start playlist. If the auto start playlist does not exist in the title (i.e. the title is invalid), the display mode responds to the resolution stipulated in the auto start playlist.

The upper part CR1 of the table shows the display mode setting when the auto start playlist exists in the title (i.e. the title is valid), and the lower part CR2 of the table shows the display mode setting when the auto start playlist does not exist in the title (i.e. the title is invalid).

According to the contents written in the upper part of the table, when the immediately preceding display mode is a 3D display mode, and the auto start playlist is a 3D playlist, the display mode is set as the 3D output. In other cases, the display mode is set as the 2D output.

According to the contents written in the lower part of the table, when the immediately preceding display mode is a 2D display mode or a 3D display mode, and the default-resolution is HD3D_1920*1080, or HD3D_1280*720, the display mode is set as the 3D output.

(Change in Display Modes in a Title)

A title is not always composed of one playlist such as auto start playlist. The title is composed of a plurality of playlists in some cases. When the title is composed of a plurality of playlists, the setting of the display mode in the display mode storage unit 29 is switched when the playback of the playlist is changed. The following describes how the display mode changes when the playlist changes in a title.

FIG. 26 shows the switching between the display modes when the playlist being played back is changed in the title. The table in FIG. 26 shows the correspondence among the current status, the action to be taken and the final display mode. In this table, rows with the hatched lines each show a case where the final display mode is determined to be a 3D display mode. Each of the other rows shows a case where the display mode is a 2D display mode.

When the current display mode is a 3D display mode, and there is no playlist being played back (e.g. when only the interactive graphics is displayed or the interactive graphics and the background data are composited and displayed), or processing to be performed is playback of the 3D playlist, the display mode is set as the 3D display mode.

When the current display mode is a 3D display mode, and there is no playlist being played back (e.g. when only the interactive graphics is displayed or the interactive graphics and the background data are composited and displayed), or the display mode of the processing to be performed is set as the 3D display mode by the BD-J application, the display mode is set to be the 3D display mode.

When the current display mode is a 2D or 3D display mode, and there is no playlist being played back, or the playlist is a 3D playlist, the display mode is set as the 3D display mode if the display mode by the BD-J application of the processing to be performed is the 3D display mode.

This concludes the description of switching between the display modes when the playlist being played back is changed in the titles.

The following describes the components of the middleware. In FIG. 23, the middleware 33 includes a plane control module 42.

If the BD-J application sets the stereo mode of the background plane 11 in the display mode storage unit 29 to ON, the composition unit 15 performs composition such that the data held in the background plane 11 that is written for the left eye is used for the left view, and the data held in the background plane 11 that is written for the right eye is used for the right view. When the stereo mode of the background plane 11 is set to OFF, the data held in the background plane 11 for the right eye and the left eye should be the same. In case a vertically long area is used as the background plane 11, the upper half of the area is used for the left view, and the lower half of the area is used for the right view. Note that when the stereo mode of the background plane 11 is set to OFF in such a case, the writing performed in the lower half of the area by the application does not affect the display.

The method for specifying the stereoscopic effect of the image plane 8 and the interactive graphics plane 10 is performed by stereo mode properties in the image plane 8 setting and the interactive graphics plane 10 setting. When the stereo mode is set to ON by the stereo mode property, the composition unit 15 performs the composition such that the data held in the image plane 8 and the data held in the interactive graphics plane 10 that have been written for the left eye are used for the left view, and the data held in the image plane 8 and the data held in the interactive graphics plane 10 that have been written for the right eye are used for the right view, as with the background plane 11. When the stereo mode is set to OFF, each of the data held in the image plane 8 for the left eye and the right eye; and the data held in the interactive graphics plane 10 for the left eye and the right eye should be the same. In case a vertically long area that combins left-view and right-view is used for the image plane 8 and/or the interactive graphics plane 10, the composition unit 15 performs the composition such that the upper half of the area is used for the left view, and the lower half of the area is used for the right view. Note that when the stereo mode of the image plane 8 and the stereo mode of the interactive graphics plane 10 are set to OFF in such a case, the writing performed in the lower part of the area by the application does not affect the display.

The plane control module 42 is composed of libraries for the plane control, and realizes the plane control by the API call from the platform unit.

(API Used for the Setting of the Display Mode Storage Unit 29)

The display mode storage unit 29 described in the above exists in a position closer to the physical layer in the software layer model of the playback apparatus 200. Therefore, the contents in the display mode storage unit 29 can be changed through the application programming interface. The following describes the setting of the display mode storage unit 29 by instructions from the application, with reference to FIG. 27A and FIG. 27B. The following describes the application programming interface provided to the application by the plane control module 42.

Figure 27A:
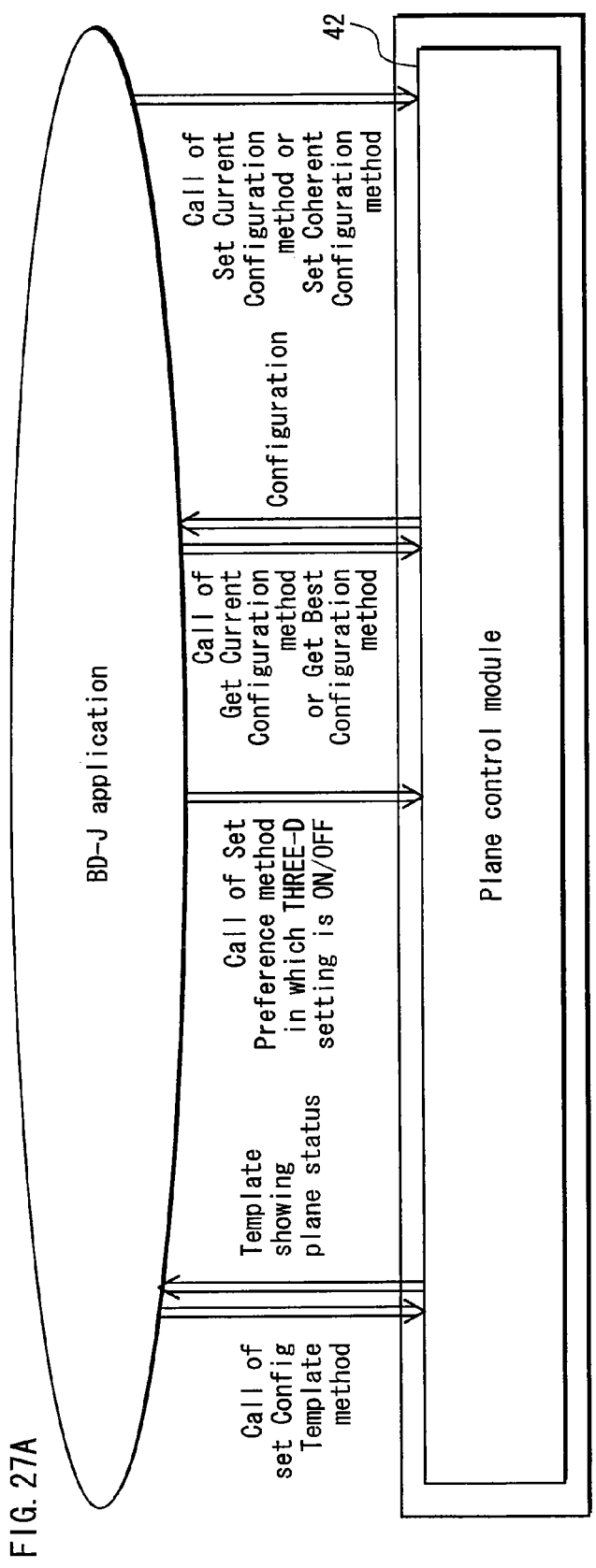
FIG. 27A and FIG. 27B show API used for setting by the display mode storage unit 29.
Figure 27B:
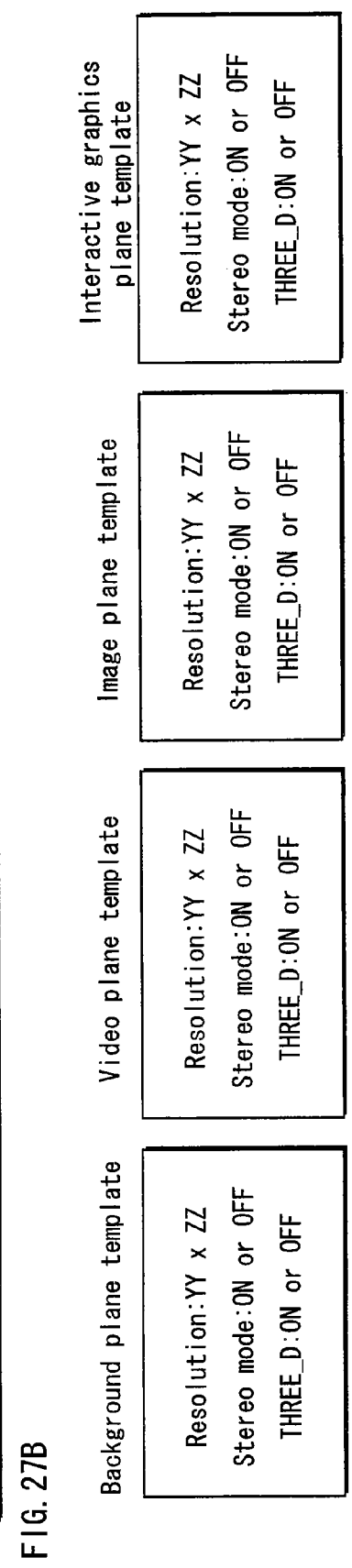

FIG. 27A and FIG. 27B shows the API used for setting in the display mode storage unit 29.

FIG. 27A shows five methods used for the plane setting. That is, a getConfigTemplate, a setPreference method, a get-BestConfiguration method, a getCurrentConfiguration method, a setCoherentConfiguration method, and a setConfiguration method.

The following describes the acquisition of the plane status.

The BD-J application specifies, for example, a plane to acquire as an argument, and call the getConfigTemplate method to acquire a template expressing the status of the plane as the argument. FIG. 27B shows four templates that can be acquired by the method. These four templates show the background plane 11 setting, the video plane 6 setting, the image plane 8 setting, the interactive graphics plane 10 setting, respectively.

Although the present embodiment shows the structure in which the plane offset cannot be set in the background plane 11 setting and the video plane 6 setting, a structure in which the plane offset can be set is possible. In order to simplify the description, the following describes a structure in which the plane offset cannot be set in the background plane 11 setting and the video plane 6 setting.

The following describes a THREE_D setting first.

The BD-J application acquires information on a parameter that can be set from the acquired template, specifies, as an argument, a parameter that can be set if necessary, and call the setPreference method to set the parameter that has been set as the argument. For example, when the parameter can be set as THREE_D setting, the BD-J application specifies the parameter as the argument, and calls the setPreference method to set the THREE_D setting to ON or OFF. Also, the result of whether or not the application has succeeded in the setting.

When the BD-J application acquires the current display setting, the gefCurrentConfiguration is used. The getCurrentConfiguration is an API that causes the BD-J application to acquire the display setting of each plane (the background plane 11, the video plane 6, the image plane 8, the interactive graphics plane 10) such as display mode and the stereo mode that are currently set in the display mode storage unit 29.

Also, the getBestConfiguration method gives the BD-J application the best setting information of each plane (the background plane 11, the video plane 6, the image plane 8 and the interactive graphics plane 10) in the playback apparatus 200.

Also, when the setCoherentConfigurations method is called from the BD-J application, individual plane setting can be specified at once (the background plane 11, the video plane 6, the image plane 8 and the interactive graphics plane 10).

For example, when THREE_D setting of each plane (the background plane 11, the video plane 6, the image plane 8 and the interactive graphics plane 10) is ON, the BD-J application specifies information for setting the THREE_D setting ON as the argument, and calls the setCoherentConfiguration method to set the THREE_D setting of each plane (the background plane 11, the video plane 6, the image plane 8 and the interactive graphics plane 10) ON.

Also, when the BD-J application specifies the resolution as the argument, and calls the setCoherentConfiguration method, the resolution of each plane (the background plane 11, the video plane 6, the image plane 8 and the interactive graphics plane 10) can be the same.

Although a description is given of a structure in which the BD-J application specifies the THREE_D setting and the resolution as arguments, and calls the setCoherentConfigurations method, the BD-J application may specify a plurality of parameters as arguments at once, and call the setCoherentConfigurations method.

While the setCoherentConfigurations method can set the setting of each plane at once, the setConfiguration method can change the setting of the planes specified as the arguments.

The following describes the configuration setting.

If the BD-J application specifies the configuration as the argument with use of the template changed by the setPreference method, and calls the setConfiguration method, or calls the setCohetentConfigurations method, the configuration is reflected in the display mode storage unit 29.

The following describes in what case the display mode changes.

When the BD-J application changes the display mode, the setConfiguration method is used. However, as a restriction, the BD-J application is not allowed to switch the display mode during the playback of the 2D playlist.

The following describes in what case switching between the displays modes fail.

The request for switching between the display modes by the BD-J application fails in the following case.

1. In a case where some of the THREE_D settings of each plane set at the time of calling the setCoherentConfiguration method is ON and some are OFF.

2. In a case where the BD-J application attempts to set the display setting of the THREE_D setting to ON during the playback of the 2D playlist.

3. In a case during when the THREE_D setting is OFF the stereo mode gets specified to turn ON.

In the above-stated cases 1 to 3, the getBestConfiguration method fails.

Furthermore, the following structure may be possible. The BD-J application makes a display mode switching request for the 3D display mode, and acquires, from the display device connected to the playback apparatus 200, information showing whether the display device is capable of display the 3D graphics. When the information indicates that the display device is not capable of displaying the 3D graphics, the display device replies to the BD-J application that it is not possible to responds to the request (i.e. processing for executing the request fails).

This concludes the description of the API used for settings in the display mode storage unit 29.

(Setting of the Plane Offset)

The shifting amount used when the plane shift engine 19 performs the shifting, needs to be calculated to pixel value prior to shifting process. It is desirable to adopt a plane offset for the stereoscopic viewing embedded in the MVC (Multi View Codec) video stream as a parameter for calculating the shift amount. However, the parameter for calculating the shift amount is not limited to this, and it may be preferable that the parameter is provided to the plane shift engine 19 through various information elements that the content provider provides to the playback apparatus 200 through the BD-ROM, depending on the use case.

Figure 28:
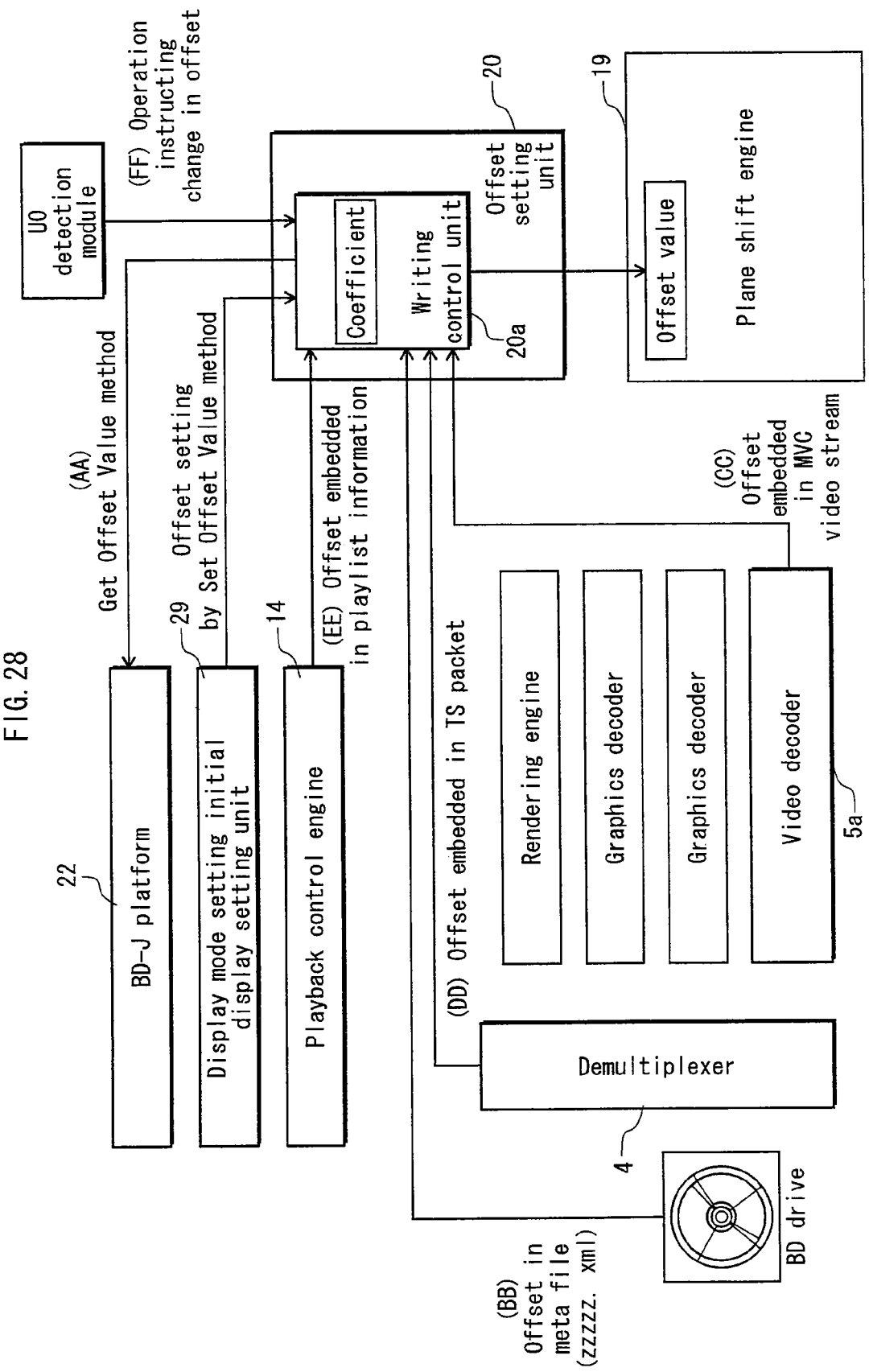
FIG. 28 shows an internal structure of an offset setting unit.

The following describes the processing for setting the plane offset with reference to FIG. 28.

FIG. 28 shows the structure of a part relating to the setting of the plane offset. A writing control unit in the offset setting unit 20 has a function of updating the plane shift value used by the plane shift engine 19 for the shifting in each plane. The following (AA) to (FF) are processing for writing the plane offset values for the plane shift engine 19 by the writing control unit in the offset setting unit 20.

(AA) The writing control unit can update the plane offset in the plane setting in the display mode storage unit 29 by the method call of the setOffsetValue by the BD-J application.

The above-stated offset can be obtained by the BD-J application in the getOffsetValue method.

When the BD-J application calls the API; and the plane offset is embedded in the BD-J application, the flexibility is high, but the ability to change offset in real-time according to depth of the video is difficult. When the plane shift engine 19 refers to the offset specified by the BD-J application, the writing control unit in the offset setting unit 20 writes the offset value in the display mode storage unit 29 to the plane offset value in the plane shift engine 19. The plane shift engine 19 automatically shifts the plane in the horizontal direction based on the plane offset values at the time of the composition.

The following describes timing of the setting.

At any time after the application has been started, the started application can call the API that changes the depth of data held in each of the image plane 8 and the interactive graphics plane 10. This is whether the video is stopped or not. In either case (video is played or not at the time of API call), it is possible to ensure that the shift amount for the right view is in synchronization with the shift amount for the left view, by controlling timing of setting the plane offset value (from the display mode storage unit 29) in the plane shift engine 19.

Specifically, the writing control unit does not update the plane offset value in the plane shift engine 19 at timing that the BD-J application calls the setOffset( ). It is checked whether or not the writing control unit has updated the plane offset in the display mode storage unit 29 at a time when one frame worth of the left-view and one frame worth of the right-view data have been outputted. In accordance with the update, the writing control unit updates the offset value of the plane shift engine 19. Thus, it is possible to ensure that the shift amount for the right-view is in synchronization with the shift amount for the left view. When the shift amount for the right view is not in synchronization with the shift amount for the left view, the display appears in a way that is not intended by the content creator, which results in providing the unpleasant outputted video to the viewer.

(BB) When the BD-ROM is loaded, or when virtual package is constructed, the writing control unit updates the plane offset value in the plane shift engine 19 read from the meta file (ZZZZZ.xml) stored in the META directory specified by the BD-ROM or the virtual package.

(CC) When reading and decoding of the MVC video stream starts, the writing control unit updates, to the plane offset value in the plane shift engine 19, the plane offset embedded in a header area of each of the PES packets that compose the MVC video stream. Desirably, when output of one frame worth of the left-view data and one frame worth of the right-view data has completed, the writing control unit updates the offset corresponding to the next frame to be processed to a plane offset value in the plane shift engine 19.

In case the plane offset is embedded in the MVC video stream, since offset can be set for each video frame, the plane offset can be shifted dynamically but the cost of authoring can become a burden.

(DD) When the reading and decoding of the transport stream starts, the writing control unit updates the plane offset embedded in the header area of the transport stream to the plane offset value in the plane shift engine 19. Desirably, when output of one frame worth of the left-view data and one frame worth of the right-view data has completed, the writing control unit updates the offset corresponding to the frame being processed as a plane offset value in the plane shift engine 19.

In a case where the plane offset value is embedded in the stream, the offset value may be shifted dynamically with the video. Therefore, the real time property is high, but the cost of authoring can become a burden.

(EE) When the current playlist is determined, and the playlist information is loaded, the plane offset of the playlist information is set to a plane offset value in the plane shift engine 19. When the playlist information is used for determining the offset, flexibility is high at the time of authoring. However, compared to the case where the offset is embedded in the stream, it is not possible to shorten the time interval from a time point at which an offset is set to a time point at which the offset is updated. Therefore, the real-time property is a little poor.

(FF) Receiving the user operation that changes the level of the depth of image plane 8 and the data held in the interactive graphics plane 10 by the operation of the button attached to a remote control or a device (i.e. the depth is expressed by the three levels such as "distant", "normal" and "close", or depth is expressed by the numerical values such as "how many cm" or "how many mm"), the UO detection module 26 updates the plane offset value in the plane shift engine 19 with use of the user operation. This update increases or decreases the plane offset depending on the number of times the right-arrow key of the remote control is pressed. Thus, the graphics can be displayed closer to the viewer or distant from the viewer by changing the number of times the right arrow or the left arrow is pressed. This enhances the operational property.

The shift amount by which the image plane 8 and the interactive graphics plane 10 are shifted is obtained by performing the calculation based on the plane offset in the plane shift engine 19 after the above-stated processing is performed. The reason why the calculation processing is necessary is that while the shift amount of the pixel data pieces in each of the image plane 8 and the interactive graphics plane 10 is defined by the number of pixels, the plane offset is often defined by units different from units of pixels.

If the plane offset is embedded in the MVC video stream, the plane shift engine 19 calculates the shift amount by which the coordinates of the pixel data pieces held in the graphics plane based on the shift amount shown by the plane offset that the offset setting unit 20a have stored in the plane shift engine 19, when output of one frame worth of the left-view data and one frame worth of the right-view data have completed. This is because the plane offset is possibly changed for each frame in some cases when the plane offset is stored in the MVC video stream.

This concludes the description of the various cases where the offset setting unit 20 sets the plane offset. The following describes a value provided by the user operation or the application.

The value provided from the user operation or the application may not be the actual shift amount in pixels, but is possibly an adjusted value from the value set in the current-state plane shift engine 19. In such case, the calculation of the plane offset value needs to be executed. For example, when the right-arrow key is pressed three times or a value "3" of a numerical value key is inputted, the plane shift engine 19 adds this value to the plane offset set in the apparatus, and calculates the plane offset based on the added value. When the value is a "+" value, the shift amount is decreased, and the graphics appears to be more distant from the viewer, for example. When the value is a "−" value, the shift amount is increased, and the graphics appears to be closer to the viewer, for example.

The following describes a change in depth.

As described in the above, when graphics such as subtitles and GUIs are shifted along the horizontal axis, the depth is changed by changing a shift amount for the subtitles, and shift amount for the GUI along the horizontal axis. For example, the closer the left-view subtitles and the right-view subtitles become in a predetermined direction, the closer the graphics are displayed to the screen. The more distant the left-view subtitles and the right-view subtitles become from one another in an opposite direction, the more distant the graphics are displayed from the screen. However, the relationship between the plane offset and the pop-out level is greatly affected by the number of inches of the TV and the characteristic of the liquid crystal of the 3D glasses. By setting stated coefficients in the terminal in advance, a value obtained by multiplying the plane offset by this coefficient can be used for the shifting in order to realize such an optical effect. Multiplying the plane offset by the coefficient in such a manner makes it possible to adjust the pop-out level of the stereoscopic video based on the characteristics of the TV, the playback apparatus 200 and the liquid crystal of the 3D glasses.

The following describes the various methods for shifting the coordinates of each of the pixel data pieces.

When the coordinates of each of the pixel data pieces is shifted in the left direction in the image plane 8 and the interactive graphics plane 10, shifted data obtained as a result of the shifting is held in each of the planes. At the timing when the data for the right view is played back, it is possible to adopt a method of shifting the shifted data held in the graphics plane in a direction opposite from the left direction by a shift amount twice as much the above-stated shift amount. In this case, it is not necessary to perform the image decoding twice.

This concludes the description of the internal structure of the playback apparatus 200.

(Implementation of the Display Mode Setting Initial Display Setting Unit 28)

The following describes the implementation of the display mode setting initial display setting unit 28. During a time period in which one title is selected, and a BD-J object corresponding to the title is valid in the playback apparatus 200, a new playlist is played back in some cases if the application in operation calls the JMF player instance according to the user operation. When the new playlist is played back, it is necessary to make the setting of the display mode again in the title.

The function of the display mode setting initial display setting unit 28 is to support: the display mode setting in the title when the title changes; the display mode setting when the playlist changes in the title; and the display mode setting set when the application expressly calls the API. Specifically, the display mode setting initial display setting unit 28 may be implemented by: creating a program that causes the MPU to execute the processing procedures shown in FIGS. 29 and 30; and installing the program in the playback apparatus 200.

Figure 29:
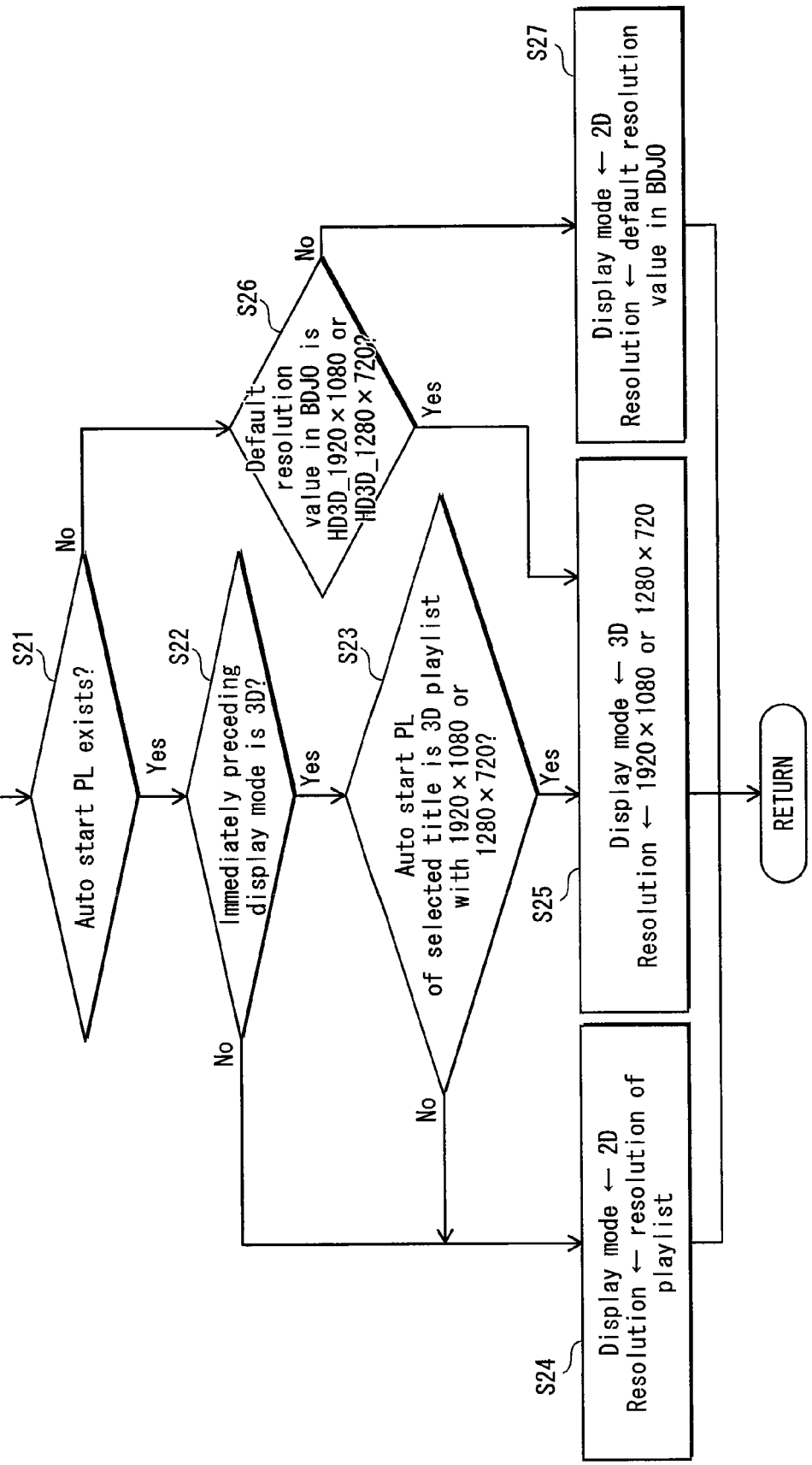
FIG. 29 shows a flowchart showing processing procedures for display mode setting when a title is changed.

FIG. 29 shows a flowchart showing processing procedures for setting the display mode when the title is changed. In this flowchart, Step S24, Step S25 and Step S27 are selectively executed in accordance with the judgment results of Step S21, Step S22, Step S23 and Step S26.

Step S21 is a judgment of whether the auto start playlist exists or not, and Step S22 is a judgment of whether the immediately preceding display mode is a 3D display mode. Step S23 is a judgment of whether or not the auto start playlist of the selected title is a 3D playlist with a resolution of 1920*1080 or a 3D playlist with a resolution of 1280*720.

When the auto start playlist does not exist, it is judged whether the default resolution of the BD-J object is HD3D_1920×1080, or HD3D_1280×720 in Step S26. If the judgment of Step S26 is Yes, the display mode is set to a 3D display mode, and the resolution is set to 1920×1080 or 1280×720 in Step S25.

If the judgment of Step S26 is No, the display mode is set to a 2D display mode in Step S27, and the resolution is set to a default resolution in the BD-J object.

When the auto start playlist does exists, it is judged whether or not the immediately preceding display mode is the 2D display mode in Step S22. If Step S22 is Yes, it is judged whether or not the playlist is a 3D playlist in Step S23 and the resolution is 1920*1080 and 1280*720 in Step S23. If the judgment of Step S22 or Step 23 is No, the display mode is set to the 2D display mode, and a resolution is set to the resolution of the auto start playlist in Step S24.

If the judgment of Step S22 is Yes, and the judgment of Step S23 is also Yes, the display mode is set to a 3D display mode, and the resolution is set to 1920*1080 and 1280*720 according to the resolution of the auto start playlist in Step S25.

This concludes the description of processing procedures for setting the display modes in the title.

Figure 30:
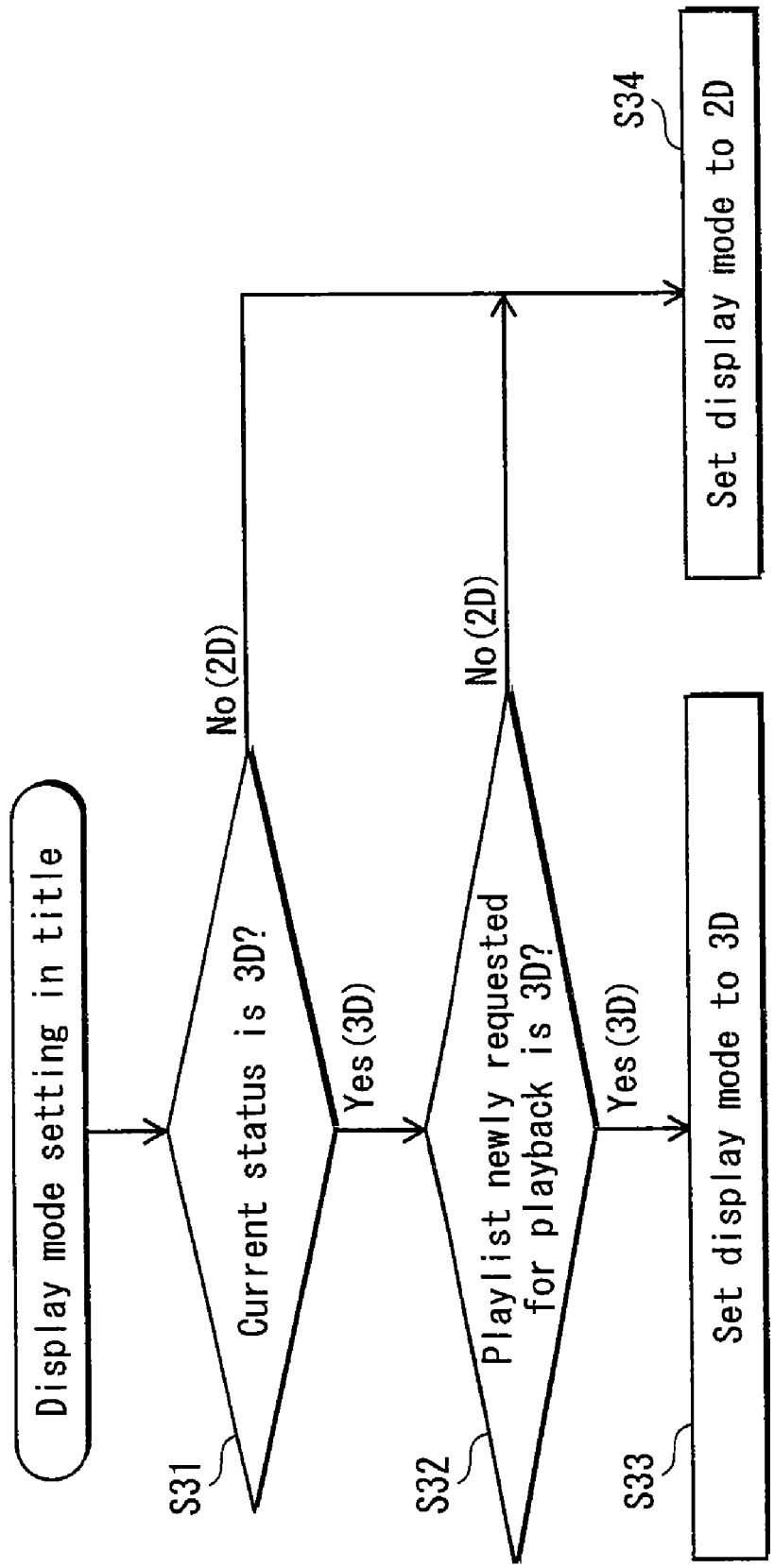
FIG. 30 shows a flowchart showing processing procedures for display mode setting in each title.

FIG. 30 is a flowchart showing the processing procedures for setting the display mode in the title. In this flowchart, Step S31 and Step S32 are serially connected to one another. Firstly, the setting of the display modes in the title starts with making request for playing back the playlist. When receiving the request for playing back the playlists, Step S31 judges whether the current status is 3D or not. If the status is 2D, the display mode is set to a 2D display mode in Step S34. Step S32 is a judgment of whether or not the playlist requested to be played back is a 3D playlist. If the playlist is the 3D playlist, Step S33 is performed, and the display mode is set to the 3D display mode. If the playlist is the 2D playlist, Step S34 is performed, and the display mode is set to the 2D display mode.

This concludes the description of the processing procedures for setting the display mode in the title.

(Implementation of the Playback Control Engine 14)

When a current playlist is selected due to some factor, the playback control engine 14 plays back the current playlist. Specifically, the playback control engine 14 needs to realize processing of: reading playlist information corresponding to the current playlist in the static scenario memory 13; and playing back a 3D stream and a 2D stream referred to by the playitem information in the playlist information. More specifically, it is necessary to: create a program that executes processing procedures shown in FIG. 32 and FIG. 33; install the program in the playback apparatus 200; and cause the MPU to execute the program.

FIG. 32 is a flowchart showing main procedures for playing back the playlist in the BD-J mode.

Step S40 is a judgment of whether the current playlist number is set by setting of the auto start playlist in the BD-J object that relates to the selected title, or generation of the JMF player instance. If the current playlist number is set, a playlist information file indicated by the current playlist number is loaded in the scenario memory in Step S41. If a plane offset exists in the playlist information in Step S42, the offset setting unit 20 sets the plane offset as the plane offset value in the plane shift engine 19. Then, the display mode in the title is set in Step S43.

In Step S44, the first playitem number in the loaded playlist information is set to the current playitem number. In Step S45, the current stream is selected from among PES streams permitted to be played back in the current playlist information.

In Step S46, what number of a stream is used is decided based on the playitem information.

In Step S47, it is judged whether the display mode determined in the Step S43 is the 2D display mode or the 3D display mode. If the display mode is the 3D display mode, the playback control engine 14 executes the playback of the 3D video stream in the 3D display mode in Step S49. If the display mode is the 2D display mode, Step S48 is performed.

Step S48 is judgments of whether the video stream indicated by the current stream number and whether the subtitles are 2D or 3D. If it is judged that the video stream and the subtitles are 2D in Step S48, the playback control engine 14 executes the playback of a 2D AV stream in the 2D display mode in Step S51. If it is judged that the video stream and the subtitles are 3D, the playback control engine 14 executes the playback of the 3D video stream in the 2D display mode in Step S50. Lastly, when the procedure reaches "end" in FIG. 32, the playback of the playlist starts.

Figure 33:
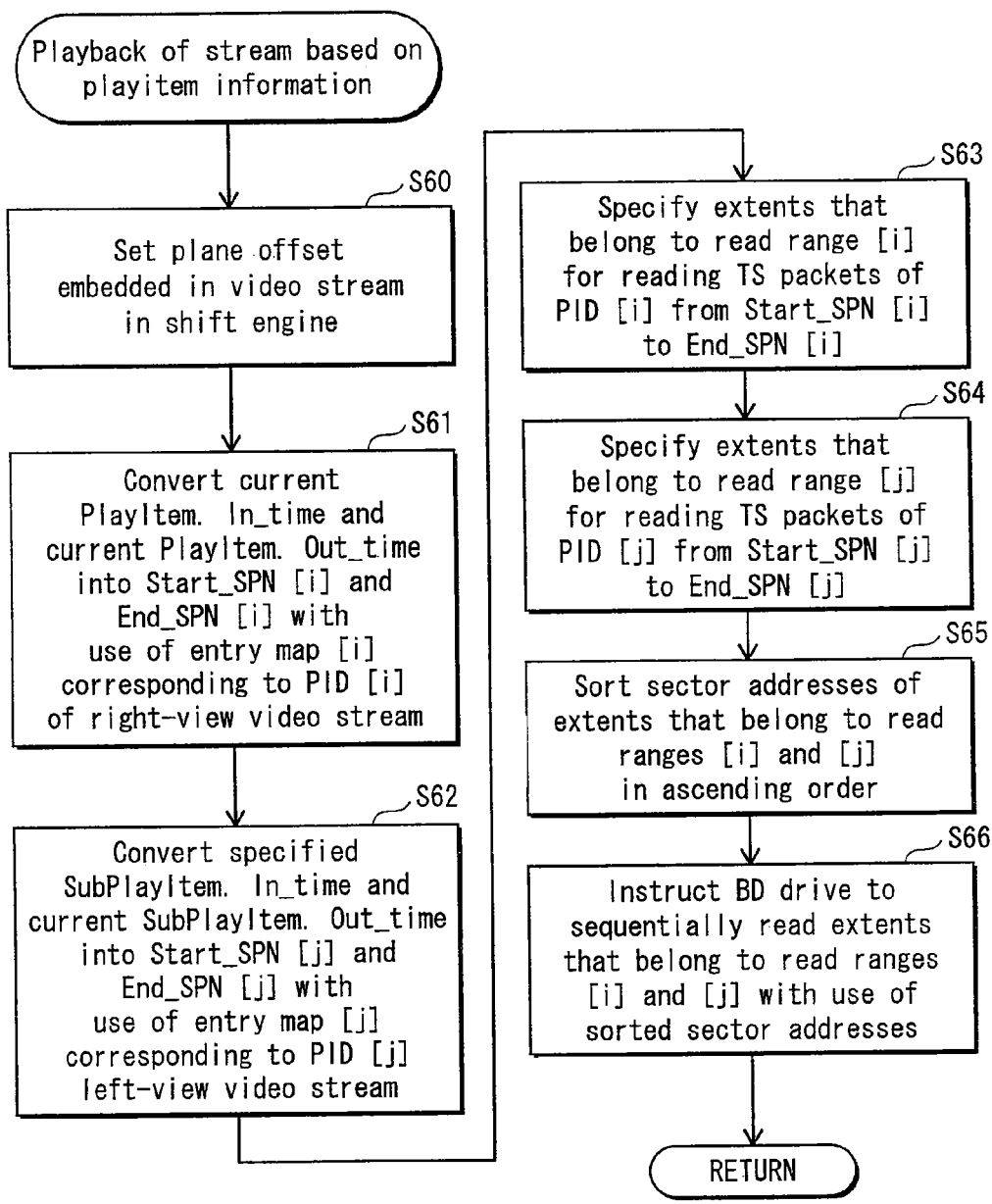
FIG. 33 shows a flowchart showing playback procedures based on playitem information.

FIG. 33 is a flowchart showing playback procedures based on the playitem information.

In Step S60, the plane offset embedded in the video stream is set in the plane shift engine 19. In Step S61, a current PlayItem.In_Time and a current PlayItem.Out_Time are converted into a Start_SPN[i] and End_SPN[i] respectively, with use of an entry map corresponding to the a packet ID of the base view stream.

The SubPlatItemIn_Time and SubPlayItemOut_Time specified with use of an entry map [j] corresponding to a packet ID [j] of the enhanced view stream are converted into Start_SPN[j] and End_SPN[j], respectively (Step S62).

The playback control engine 14 specifies an extent that falls in a read range [i] for reading Start_SPN[i] to End_SPN[i] of a TS packet [i] of the packet ID [i] (Step S63). The playback control engine 14 specifies an extent that belongs to a read range for reading Start_SPN[j] to End_SPN[j] of a TS packet [j] of the packet ID [j] (Step S64). The playback control engine 14 instructs the drive to sorts addresses of the extents that belong to the read ranges [i] and [j] in an ascending order in Step S65, and to sequentially read these extents that belong to the read ranges [i] and [j] with use of the sorted addresses in Step S66.

This concludes the description of the playback control engine 14.

(Implementation of the Plane Shift Engine 19)

The plane shift engine 19 realizes, in each display period for a video frame, the processing of: reading the graphics data from each of the image plane 8 and the interactive graphics plane 10; and compositing the graphics data with picture data (sometimes called a video frame) to be played back in each of the display periods. The plane shift engine 19 should support: reading processing and composition processing when the graphics data is to be read from the image plane 8; and reading processing and composition processing when the graphics data is to be read from the interactive graphics plane 10. Furthermore, a type of processing is determined depending on whether the stereo mode is ON or OFF. Also, a type of processing for the left view and a type of processing for the right view are different. Therefore, in order to implement the plane shift engine 19, it is necessary to: create a program that executes the processing procedures shown in FIG. 34 and FIG. 35 according to the display mode setting in the playback apparatus 200; install the program in the playback apparatus 200; and cause the MPU to execute the program.

(Processing Procedures for the 3D Video Stream at the Time of the 3D Display Mode)

Figure 34:
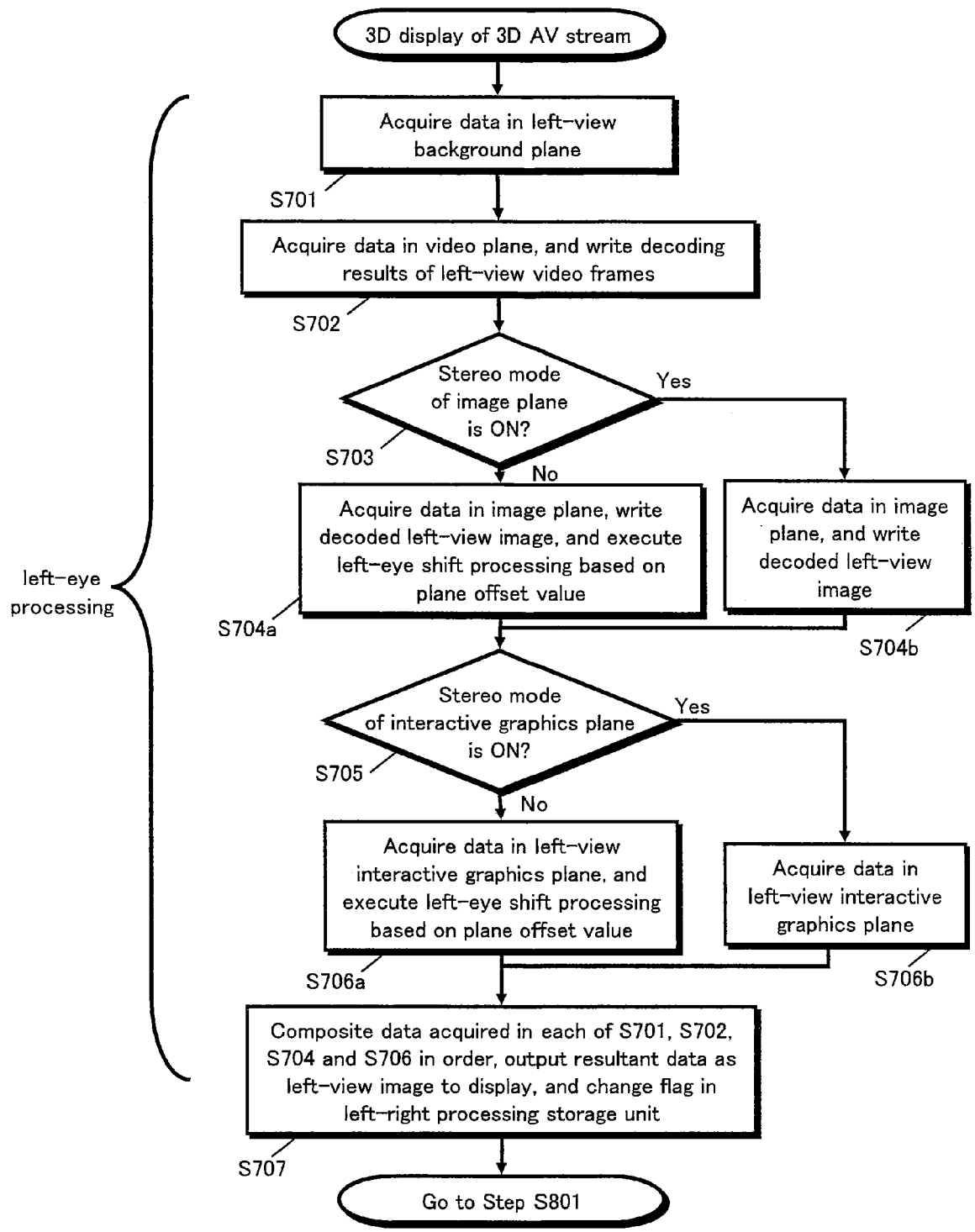
FIG. 34 shows a flowchart showing left-view processing of a 3D stream in the 3D display mode.

When the current display mode is the 3D display mode, and the playback targets are the 3D playlist and the 3D stream, the processing procedures shown in FIG. 34 and FIG. 35 are executed.

Each of FIG. 34 and FIG. 35 is a flowchart showing 3D stream processing in the 3D display mode.

Each of the flowchart in FIG. 34 and the flowchart in FIG. 35 has a loop configuration that repeats Step S701 to Step S809. Each of the flowchart in FIG. 34 and the flowchart in FIG. 35 ends under a condition that it is judged that a next frame does not exists in Step S809. Step S701 to Step S707 in FIG. 34 are process taken for the left view, and Step S801 to Step S809 in FIG. 35 are process taken for the right view. Firstly, the composition unit 15 acquires background data written in the left-view background plane for the left view. The left-view background plane stores the background data that has been written through the still image decoder 27b according to the rendering instruction by the BD-J application (Step S701).

Next, after the video decoder 5a decodes the left-view video stream, and writes the decoded left-view video stream in the video plane 6 (to which (L) is given in FIG. 5), the composition unit 15 acquires the left-view video data written in the video plane 6 (Step S702).

Then, the composition unit 15 checks the flag of the stereo mode in the image plane 8 settings in the display mode storage unit 29 in Step S703. When the stereo mode is OFF, the composition unit 15 uses the image decoder 7a to decode the left-view image, and writes the decoded left-view image in the image plane 8 (a code (L)), then plane shift engine 19 performs the shift processing for the left view (Step S704a).

When the stereo mode is ON, the composition unit 15 uses the image decoder 7a to decode the left-view image, and writes the decoded left-view image in the image plane 8 (to which the code (L) is given). When the stereo mode is ON, the plane shift engine 19 does not perform the shift processing for the left view on the decoded left-view image in the image plane 8 (to which the code (L) is given). This is because, when the stereo mode is ON, the composition unit 15 writes, in the image plane 8 (to which a (R) is given), the right-view image which is seen from the different angle from the left-view image (Step S704b).

The image plane 8 to which the code (L) is given in Step S704a or in Step S704b holds therein the image data which is stored in the image memory 7, and is decoded by the graphics decoder 8.

Next, the composition unit 15 checks a flag of the stereo mode in the interactive graphics plane 10 setting in the mode storage unit 29 in Step S705. When the stereo mode is OFF, the BD-J application writes the left-view interactive graphics 10 in the left-eye plane (to which the code (L) is given in the interactive graphics plane 10 in FIG. 5) with use of the rendering engine 21, and acquires the left-view interactive graphics from the left-eye plane (to which the code (L) is given in the interactive graphics plane 10 in FIG. 5). The plane shift engine 19 performs shift processing for the left-eye on the acquired left-view interactive graphics (Step S706a).

When the stereo mode is ON, the BD-J application writes the left-view interactive graphics in the left-eye plane (to which the code (L) is given in the interactive graphics plane 10 in FIG. 5) with use of the rendering engine 21. After that, although the BD-J application acquires left-view interactive graphics from the left-eye plane (to which the code (L) is given in the interactive graphics plane 10 in FIG. 5) for display, the plane shift engine 19 does not perform the shift processing for the left eye on the left-view interactive graphics (Step S706b).

The left-view interactive graphics plane from which the left-view interactive graphics is acquired in Step S706a and Step S706b stores therein the data that has been written through the rendering engine 21 according to the rendering instruction by the BD-J application in the BD-J mode.

In case HDMV mode, the left-view interactive graphics plane stores therein the decoding result of the graphics data extracted from a graphics stream instead of graphics data drawn by the BD-J application.

In Step S707, the composition unit 15 composites: the background data written in the background plane 11 to which the code (L) is given in Step S701; video data written in the video plane 6 to which the code (L) is given in Step S702; the subtitle data written in the image plane 8 to which the code (L) is given in Step S704; and the GUI data written in the interactive graphics plane 10 to which the code (L) is given in Step S706 in order. Then, the resultant composited data is outputted to the display as left-view data. In this case, if the stereo mode is OFF in Step S703 and Step S705, data obtained as a result of the shift processing performed in the corresponding planes are used for composition. As the final process of Step S707, the flag in the left-right processing storage unit is changed when the data is outputted to the display. Note that each process in Step S701 to 707 is processed as process for the left eye. Which eye to process is determined by referring to the left-right processing storage unit 17.

Next, the processing for the right eye is performed after the processing for the left eye in Step S701 to S707 is completed. FIG. 35 is a flowchart for describing the processing for the right eye. The composition unit 15 checks the flag of the stereo mode in the background plane 11 setting in the display mode storage unit 29 in Step S801. When the stereo mode is OFF, the composition unit 15 writes the left-view background data held in the background plane 11 to which the code (R) is given, and acquires the background data from the background plane 11 to which the code (R) is given (Step S802a). When the stereo mode is ON, the composition unit writes the right-view background data held in the background plane 11 to which the code (R) is given, and acquires the right-view background data held in the background plane 11 to which the code (R) is given (Step S802*b*).

Next, the composition unit 15 checks the flag of the stereo mode in the video plane 6 setting in the display mode storage unit 29 in Step S803. When the stereo mode is OFF, the composition unit 15 uses the video decoder 5*a* to decode the left-view video stream, writes the decoded image in the video plane 6 (to which the code (R) is given in FIG. 5), and acquires the left-view video data from the video plane 6 (to which the code (R) is given in FIG. 5) (Step S804*a*). When the stereo mode is ON, the composition unit 15 uses the video decoder 5*b* to decode the right-view video stream, writes the decoded right-view video stream in the video plane 6 (to which the code (R) is given in FIG. 5), and acquires the right-view video data from the video plane 6 the video plane 6 (to which the code (R) is given in FIG. 5) (Step S804*b*).

Then, the composition unit checks the flag of the stereo mode in the image plane 8 setting in the display mode storage unit 29 in Step S805. When the stereo mode is OFF, the composition unit 15 writes the left-view image decoded by the image decoder 7*a* in the image plane 8 (to which the code (R) is given). After that, the plane shift engine 19 performs processing for the right eye on the left-view image written in the image plane 8 (to which the code (R) is given) (Step S806*a*). When the stereo mode is ON, the composition unit 15 writes, in the image plane 8 (to which the code (R) is given), the right-view image decoded by the image decoder 7*a*. However, When the stereo mode is ON, the plane shift engine 19 does not perform the shift processing (Step S806*b*).

The image plane 8 from which the images are acquired in Step S806*a* and Step S806*b* stores therein the subtitle data that has been stored in the image memory 7, and decoded by the image decoder 7 (image decoders 7*a* or 7*b*).

Next, the composition unit 15 checks the flag of the stereo mode in the interactive graphics plane 10 setting in the display mode storage unit 29 in Step S807. When the stereo mode is OFF, the right-eye plane (to which the code (R) is given in the interactive graphics plane 10 in FIG. 5) contains left-view interactive graphics written by the BD-J application using the rendering engine 21. Then the plane shift engine 19 performs the shift processing for the right eye on the left-view interactive graphics written in the right-eye plane (to which the code (R) is given in the interactive graphics plane 10 in FIG. 5) (Step S808*a*).

When the stereo mode is ON, the BD-J application uses the rendering engine 21 to write the right-view interactive graphics in the right-eye plane (to which the code (R) is given in the interactive graphics plane 10 in FIG. 5). However, the plane shift engine 19 does not perform the shift processing on the right-view interactive graphics written in the right-eye plane (to which the code (R) is given in the interactive graphics plane 10 in FIG. 5) (Step S808*b*).

In Step S809, the composition unit 15 composites: the background data written in the background plane 11 (to which the code (R) is given) in Step S802; the video data written in the video plane 6 (to which the code (R) is given) in Step S804; the image data written in the image plane 8 (to which the code (R) is given) in Step S806; and the GUI data written in the interactive graphics plane 10 in Step S808 in order. In case the stereo mode is OFF in Step S805 and Step S807, data obtained as a result of the shift processing performed in the corresponding plane are targeted for the composition. The resultant composited data is outputted to the display as the right-view data. When the composited data is outputted to the display, the flag in the left-right processing storage unit 17 is changed. Note that Step S801 to Step S809 is processed for the right eye. Whether or not the current process is for the right eye is judged by referring to the left-right processing storage unit 17.

As long as frames are continuously inputted, the above-stated processing is repeated (Step S810).

Note that when the method for acquiring the offset from the header area of the AV stream is adopted in the terminal, and the update of each frame is implemented, it is necessary to update an offset value in the plane shift engine 19 to a value corresponding to the next frame by the offset setting unit 20 during Step S810.

This concludes the description of the 3D stream processing in the 3D display mode.

(Processing Procedure in the 2D Display Mode)

When the display mode is the 2D display mode, the AV stream to be played back may be one of the left-view stream and the right-view stream that compose the 3D stream, or may be a 2D stream. A description is given, taking a case where the 2D stream is used as an example.

Figures 36A, 36B:
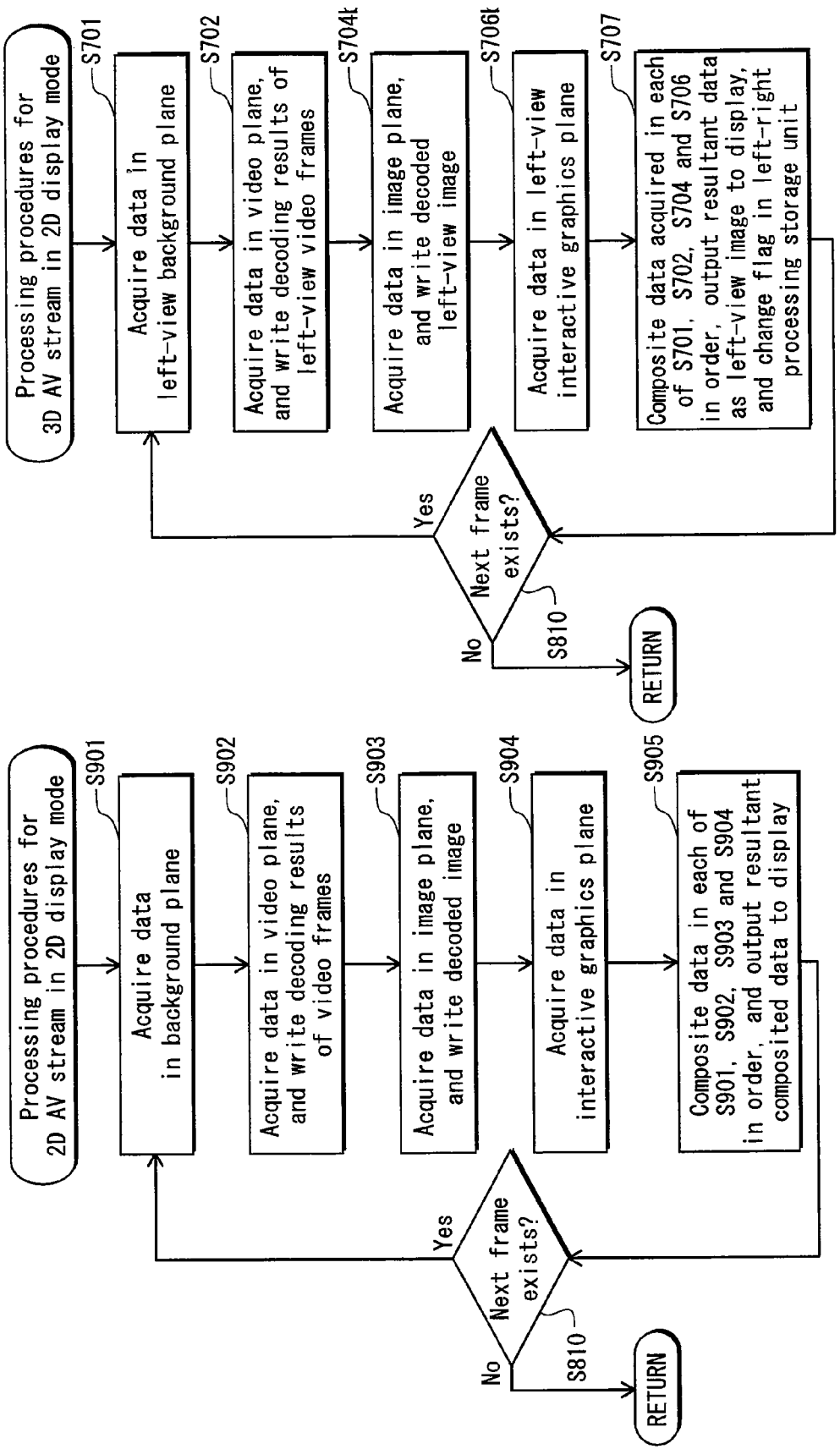
FIG. 36 shows a flowchart showing processing procedures for a 2D AV stream in the 2D display mode.

When the current display mode is the 2D display mode, processing procedures in FIG. 36A and FIG. 36B are executed.

FIG. 36A is a flowchart showing processing for the 2D stream in the 2D display mode.

Firstly, in Step S901, the composition unit 15 acquires the background data written in the background plane 11. Next, the video decoder 5*a* decodes the 2D video stream, and writes the decoded video data held in the video plane 6 (to which the code (L) is given), and the composition unit 15 acquires the video data (Step S902).

Then, in Step S903, the composition unit 15 uses the image decoder 7*a* to decode the 2D subtitle stream, writes the decoded image data held in the image plane 8 (to which the code (L) is given), and acquires the image data.

Next, in Step S904, the BD-J application uses the rendering engine 21 to write the 2D graphics in the left-eye plane (to which the code. (L) is given in the interactive graphics plane 10 in FIG. 5). The composition unit 15 acquires the interactive graphics data from the interactive graphics plane 10 (to which the code (L) is given).

In Step S905, the composition unit 15 composites: data held in the background plane 11 obtained in Step S901, data obtained in the video plane 6 in Step S902, data obtained in the image plane 8 in Step S903 and data obtained in the interactive graphics plane 10 in Step S904 in order, and outputs the resultant composited data to the display. As long as frames are continuously inputted, processing returns to S901 (Step S810).

FIG. 36B is a flowchart showing the 2D display processing with use of one of the left-view stream and the right-view stream that compose the 3D stream (in this case, left-view video stream is used) in the 2D display mode.

The flowchart of FIG. 36B is created based on FIG. 34, and the same reference numerals are given to the steps that are same as the steps in the flowchart of FIG. 34. The outline of the processing is almost the same, but is briefly described. Firstly, in Step S701, the composition unit 15 acquires the background data from the background plane 11 (expressed as a code (L)).

Next, the left-view video data is decoded by the video decoder 5*a* in the video plane 6 (to which the code (L) is given), then the composition unit 15 acquires the left-view video data from the video plane 6 (to which the code (L) is given) (Step S702).

Then, in Step S704b, the left-view image data is decoded by the image decoder 7a in the image plane 8 (to which the code (L) is given), then the composition unit 15 acquires the stated image data from the image plane 8 (to which the code (L) is given).

Next, in Step S706b, the composition unit 15 acquires the left-view interactive graphics data, which is written by BD-J application using the rendering engine 21, held in the interactive graphics plane 10 (to which the code (L) is given).

In S707, the composition unit 15 composites: the data held in the background plane 11 obtained in Step S701; the data held in the video plane 6 obtained in Step S702; the data held in the image plane 8 obtained in Step S704; and the data held in the interactive graphics plane 10 obtained in Step S706 in order, and outputs the resultant composited data to the display. As long as frames are continuously inputted, processing returns to Step S701 (Step S810).

This concludes the description of the processing procedures in the 2D display mode.

(Processing Procedures for Updating the Offset Updating by the BD-J Application)

The following describes what causes a change in depth by the BD-J application.

Figure 37:
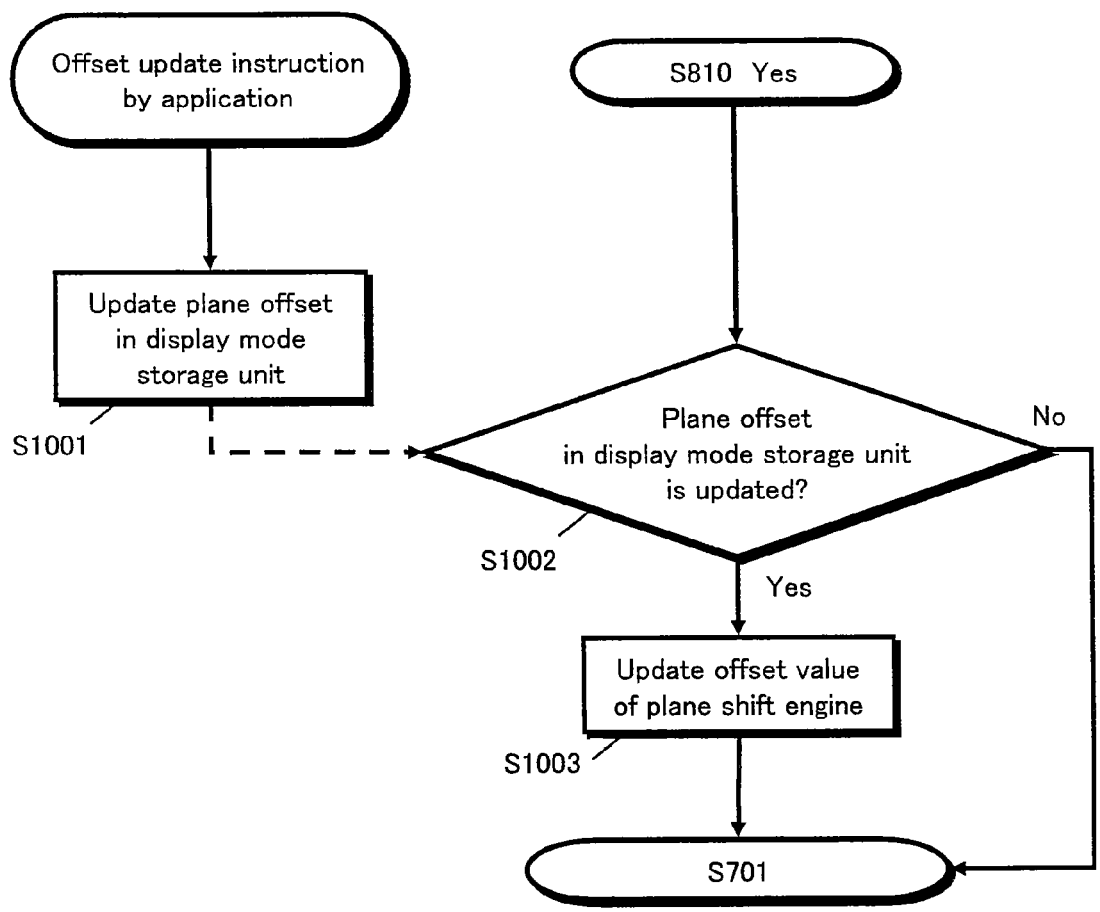
FIG. 37 shows a flowchart showing processing procedures when the BD-J application gives an offset update instruction.
Figure 38:
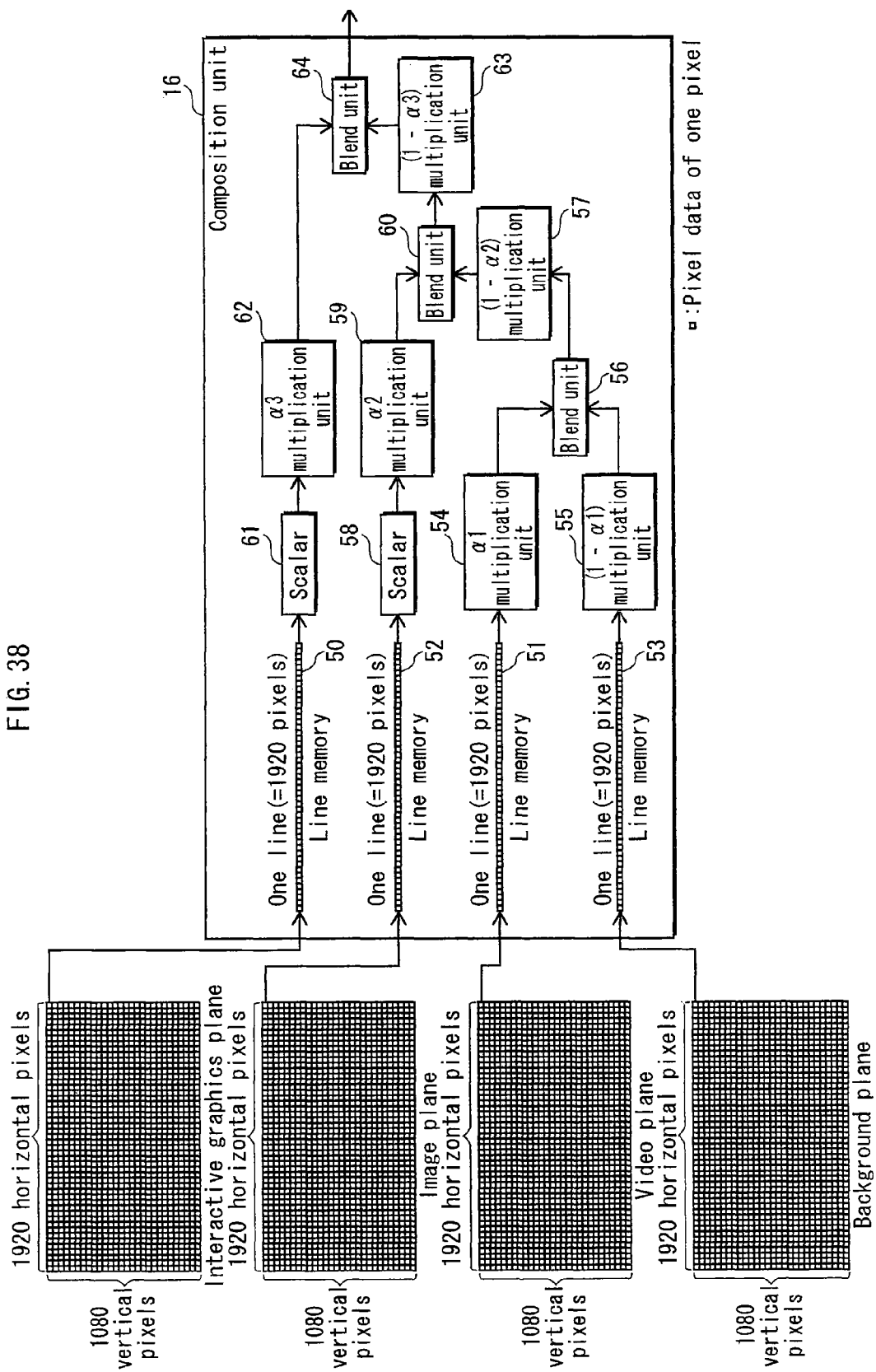
FIG. 38 shows a structure of a composition unit 15.

The following describes, with reference to FIG. 37, processing in a case where the application started by the BD-J module calls the API that changes the depths of data held in the image plane 8 and data held in the interactive graphics plane 10.

FIG. 37 is a flowchart showing processing procedures when the BD-J application gives an instruction for updating the offset. In the flowchart of FIG. 37, Step S1001, Step S1002 and Step S1003 are added to Step 701 to Step S810 shown in FIG. 34 and FIG. 35 for display processing for the 3D stream in the 3D display mode.

Up on receiving the calls from the API for changing the depth of the graphics plane, the BD-J module updates the plane offset of the plane which is a target of the display mode storage unit 29 based on the plane offset received in Step S1001.

In this case, if the target plane is the image plane 8, the BD-J module updates the plane offset in the image plane 8 setting, and if the target plane is the interactive graphics plane 10, the BD-J module updates the plane offset in the interactive graphics plane 10 setting.

Meanwhile, in Step S1002, the BD-J module checks whether the image plane 8 setting in the display mode storage unit 29 or the plane offset in the interactive graphics plane 10 setting is updated or not. If the plane offset is updated in Step S1002 (Step S1002: Yes), the BD-J module updates the plane offset in the plane shift engine 19 (Step S1003). Note that if the image plane 8 setting is updated in Step S1003, the BD-J module updates the plane offset value in the image plane 8 in the plane shift engine 19, and if the interactive graphics plane 10 setting is updated in Step S1003, the BD-J module updates the plane offset value in the interactive graphics plane 10 in the plane shift engine 19. If the plane offset is not updated (Step S1002: No), Step S1003 is not performed, and Step S701 starts.

As described in the present embodiment, it is possible to adjust a distance of how close the subtitle graphics are to the viewer, and a distance of how far the subtitle graphics are to the viewer from the display by moving coordinates of each of the pixel data pieces in the graphics plane (e.g. shifting in a direction horizontal to the display screen).

Furthermore, even in a case where both the right-view graphics (right-view interactive graphics) and left-view graphics (left-view interactive graphics) are not recorded on the recording medium (i.e. only the 2D graphics and 2D interactive graphics are provided), and therefore the subtitle graphics will normally would appear to be buried in the stereoscopic video because the subtitle graphics can be displayed only in a position on the display screen, it is possible to display the subtitles and GUI in a position (e.g. a position at which the object appear to be closer to the viewer than a position at which the 3D video is displayed) that does not interfere with the depth position in which the video stereoscopically pops out, by storing the 2D graphics in (2D interactive graphics) in a corresponding plane (to which a code (L) or (R) is provided) and adjusting the offset. Thus, it is possible to composite the subtitles and the GUI, and display the composited data while preventing the unpleasant stereoscopic display of the video as much as possible. Therefore, the appearance of the stereoscopic video can be kept pleasant and will reduce the eye strain. Since the depth of the subtitle graphics can be adjusted by the above-stated adjustment, it is not necessary to prepare the left-view graphics and the right-view graphics for the stereoscopic playback of the video. Therefore, even in a case where a BD-ROM whose capacity is limited, and only graphics data for one eye can be recorded on the media, it is possible to provide the user with preferable stereoscopic view.

For an authoring studio, it is possible to skip the generation process of one of the right-view graphics for the stereoscopic playback, which reduces the man-hours of generating films.

Second Embodiment

In the first embodiment, the shifting of the data held in each plane is realized by shifting content in each memory element in the plane memory. However, the present embodiment relates to the improvement that realizes the above-stated shifting when the pixel data pieces stored in the plane memory is read by the composition unit 15 in units of lines. In a pixel data aggregate with a resolution of 1920*1080 or 1280*720, a line (i.e. a group of 1920 horizontal pixels or a group of 1280 horizontal pixels) is referred to as line data. The composition unit 15 composites line data read from each of the video plane 6, the background plane 11, the image plane 8 and the interactive graphics plane 10.

Each of FIG. 39A, FIG. 39B and FIG. 39C shows a structure of the composition unit 15. As shown in FIG. 39A, FIG. 39B and FIG. 39C, the composition unit 15 is composed of line memories 50 to 53, an $\alpha 1$ multiplication unit 54, a $(1-\alpha 1)$ multiplication unit 55, a blend unit 56, a $(1-\alpha 2)$ multiplication unit 57, a scalar 58; a2 multiplication unit 59, a blend unit 60, a scalar 61, an $\alpha 3$ multiplication unit 62, a $(1-\alpha 3)$ multiplication unit 63, and a blend unit 64.

The line memory 50 stores therein line data read from the interactive graphics plane 10.

The line memory 51 stores therein line data read from image plane 8.

The line memory 52 stores therein line data read from the video plane 6.

The line memory 53 stores therein line data read from the background plane 11.

The $\alpha 1$ multiplication unit 54 multiplies, by a transmittance $\alpha 1$, brightness of the line data composing pictures stored in the line memory 51.

The $(1-\alpha 1)$ multiplication unit 55 multiplies, by a transmittance $(1-\alpha 1)$, brightness of the line data composing the graphics data stored in the line memory 53.

The blend unit 56 blends the line data whose pixels each is multiplied by the transmittance $\alpha 1$ by the $\alpha 1$ multiplication unit 54 with the line data whose pixels each is multiplied by the transmittance $(1-\alpha 1)$ by the $(1-\alpha 1)$ multiplication unit 55.

The $(1-\alpha 2)$ multiplication unit 57 multiplies the output from the blend unit 56 by the transmittance $(1-\alpha 2)$.

The scalar 58 enlarges the line data read from the line memory 52.

The $\alpha 2$ multiplication unit 59 multiplies, by the transmittance $\alpha 2$, brightness of the line data composing the picture enlarged by the scalar 58.

The blend unit 60 blends the line data multiplied by the transmittance $\alpha 2$ with the line data whose pixels each is multiplied by the transmittance $(1-\alpha 2)$ by the $(1-\alpha 2)$ multiplication unit 57.

The scalar 61 enlarges the line data read from the line memory 50.

The $\alpha 3$ multiplication unit 62 multiplies, by the transmittance $\alpha 3$, brightness of the line data that is read by the line memory 50, and composes the graphics enlarged by the scalar 61.

The $(1-\alpha 3)$ multiplication unit 63 multiplies, by the transmittance $(1-\alpha 3)$, brightness of the line data that is an output result obtained from the blend unit 60.

The blend unit 64 blends the line data pieces each multiplied by the transmittance $\alpha 3$ with the line data whose pixels each is multiplied by the transmittance $(1-\alpha 3)$ by the $(1-\alpha 3)$ multiplication unit 63.

This concludes the description of the structure of the composition unit 15.

The plane shift engine 19 described in the first embodiment realizes the transfer processing of: reading pixel data pieces in units of lines from memory elements in the background graphics plane 11, the video plane 6, the image plane 8 and the interactive graphics plane 10, and storing the pixel data pieces in the line memories 50 to 53. In this transfer processing, it is possible to realize processing that is equivalent to the shifting of coordinates of each of the pixel data pieces in the memory elements as described in the first embodiment by changing the addresses of the line memories 50 to 53 to which the pixel data pieces are transferred.

FIG. 39A, FIG. 39B and FIG. 39C show processes for executing the shifting of coordinates of pixel data pieces composing each line data in the plane in the right direction. FIG. 39A shows pixel data pieces on $y^{th}$ line that exist in the graphics plane. FIG. 39B shows pixel data pieces on $y^{th}$ line stored in the line memories. As shown in FIG. 39B, if the plane offset is F pixels, it can be seen that pixel data pieces at coordinates (F+1, y) to (1919, 0) on $y^{th}$ line are stored. Also, it can be seen that empty space corresponding to F pixels exists at the right end of a memory element string in the line memory.

FIG. 39C shows that transparent pixel data pieces are added. It can be seen that the transparent pixel data pieces are added in the empty space corresponding to F pixels.

FIG. 40A, FIG. 40B and FIG. 40C shows processes for executing the shifting of coordinates of pixel data pieces composing each line data in the plane in the left direction. FIG. 40A shows pixel data pieces on $y^{th}$ line that exist in the graphics plane. FIG. 40B shows pixel data pieces on $y^{th}$ line stored in the line memory. As shown in FIG. 40B, if the plane offset is F pixels, it can be seen that pixel data pieces on $y^{th}$ line at coordinates (0, y) to (1919-F, 0) are stored. Also, it can be seen that empty space corresponding to F pixels exists on the left end of a memory element string in the line memory.

FIG. 40C shows that transparent pixel data pieces are added. It can be seen that the transparent pixel data pieces are added in the empty space corresponding to F pixels.

This concludes the description of processes for executing the shifting of coordinates of pixel data pieces composing each line data in the plane.

Figure 41:
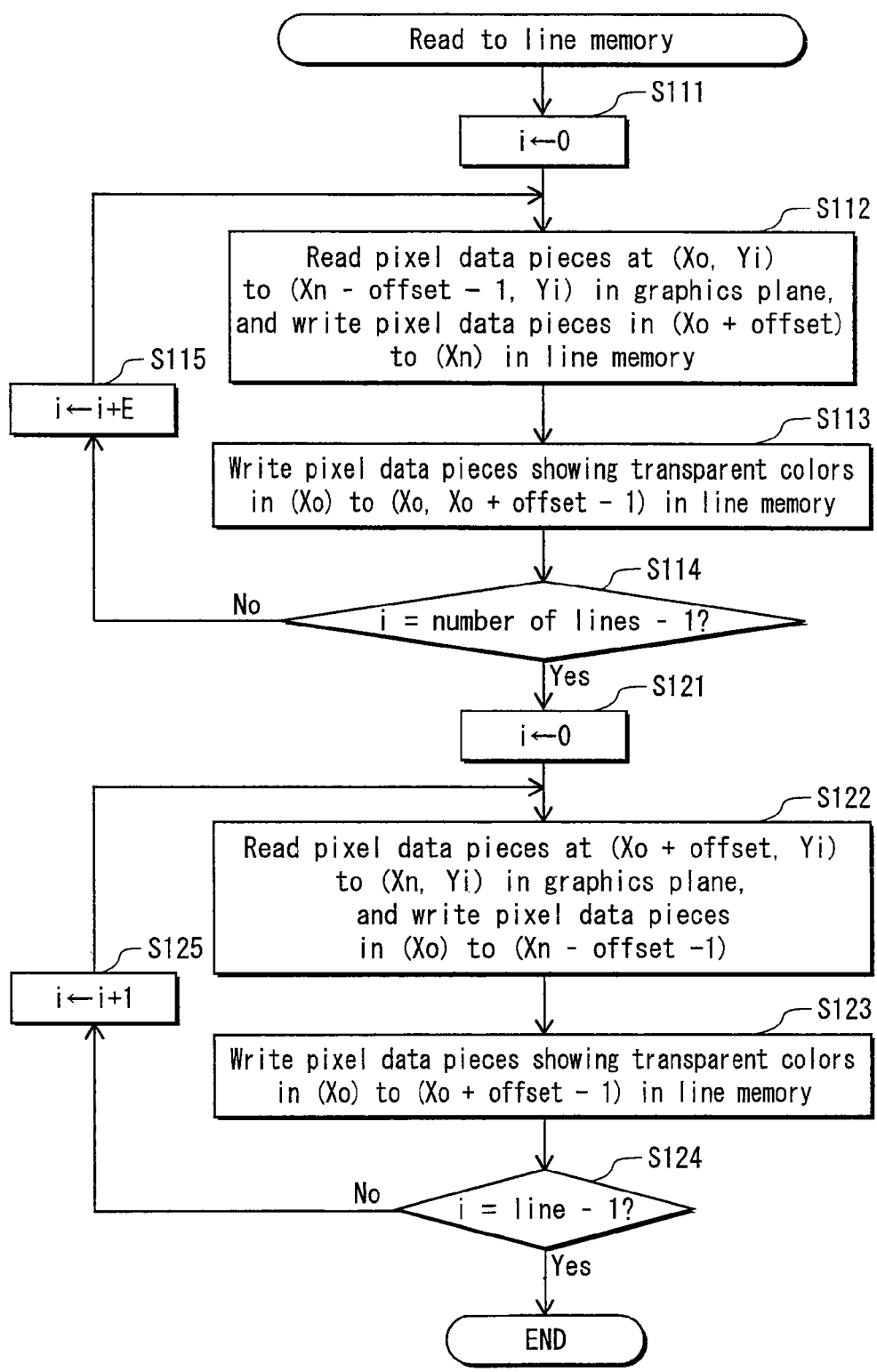
FIG. 41 shows a flowchart showing processing procedures for storing data in a line memory.

The plane shift engine 19 that executes the shifting of coordinates of pixel data pieces composing each line data in the plane can be implemented by creating a program that causes the MPU to execute the processing procedures shown in a flowchart of FIG. 41, and installing the program in the playback apparatus 200. The following describes the implementation of the plane shift engine 19 by software.

FIG. 41 is a flowchart showing processing procedures for storing pixel data pieces in the line memory.

Processing from Step S112 to Step S115 has a loop configuration that repeats Step S112 to Step S115 after a parameter i is set to 0 in Step S111. This loop ends under a condition that the parameter i becomes a value (the number of lines-1) in Step S114. As long as it is judged that the parameter i is not a value (the number of lines-1) in Step S1.14, the parameter i is incremented, and Step S112 to Step S115 are repeated. In Step S112, the plane shift engine 19 reads pixel data pieces (Xo,Yi) to (Xn−plane offset−1, Yi) in the graphics plane, and writes the pixel data pieces in (Xo+plane offset) to (Xn). In Step S113, the plane shift engine 19 writes transparent pixel data pieces in Xo to Xo+offset−1 in the line memory.

Processing from Step S121 to Step S125 has a loop configuration that repeats Step S121 to Step S125 after a parameter i is set to 0 in Step S121. This loop ends under a condition that the parameter i becomes a value (the number of lines-1) in Step S124. As long as it is judged that the parameter i is not a value (the number of lines-1) in Step S124, the parameter i is incremented, and Step S122 to Step S125 are repeated. In Step S122, the plane shift engine 19 reads pixel data pieces (Xn+plane offset, Yi) to (Xn, Yi) in the graphics plane, and writes the pixel data pieces in (Xo) to (Xn−plane offset−1). In Step S123, the plane shift engine 19 writes transparent pixel data pieces in (Xo) to (Xo+offset−1) in the line memory.

This concludes the description of the processes for executing the shifting of coordinates of pixel data pieces composing each line data in the plane in the left direction.

According to the present embodiment as described in the above, the memory access to the graphics plane can be less frequent since the shifting of coordinates of pixel data held in the right direction and the left direction is realized in each line memory when the plane shift engine 19 reads the pixel data pieces in the graphics plane for each line data.

(Notes)

This concludes the description of the best modes of carrying out the invention known to the applicant at the time of application. However, further improvements and variations related to the technical topics indicated below can be added. Whether to carry out the invention as indicated in the embodiments or to use these improvements and variations is arbitrary, and is left to the discretion of the one who carries out the invention.

(Implementation as the Recording Medium)

The playback apparatus 200 includes a local storage including a built-in media library and a removable media. Therefore, since the playback apparatus 200 is expected to write data in the built-in media drive and the local storage, the playback apparatus 200 described in the present Description has a function as the recording medium. When the playback apparatus 200 functions as the recording medium, the playback apparatus 200 executes the writing of a management object in the following two manners (1) and (2).

(1) When the playback apparatus 200 has a function of playing back the virtual package, the playback apparatus 200 write the BD-J object in the following way. That is, when the BD-ROM is loaded, the playback apparatus 200 acquires additional contents corresponding to the BD-ROM from a WWW server via the network in accordance with a request from an application. The acquired additional contents include the BD-J object in which the GUI management table is written. A control unit, in the playback apparatus 200, that perform recording control writes the acquire BD-J object in the local storage in accordance with the request from the application. Thus, it is possible to configure the virtual package by compositing the contents in the BD-ROM with the additional contents recorded in the local storage.

In the BD-ROM are recorded an identifier of a disc root certificate, an identifier of an organization that distributes the BD-Rom contents and an identifier of the BD-ROM. An area in which the additional contents are stored are specified by a file path including the identifier of the disc root certificate, the organization identifier and the BD-ROM identifier.

The application performs writing by sending, to the control unit, the file path that specifies the area in which the additional contents are stored.

When the local storage has a file system that limits the names of directories and files to 255 characters or less, the file path used for writing to the local storage includes file names and extensions in a 8.3-format file system in which directory names are 8 characters or less and file names and extension names are three characters or less.

(2) If the playback apparatus 200 has a function of receiving the BD-J object from an on-demand manufacture service or an electrical sell-through services (MODEST), the playback apparatus 200 writes the BD-J object as follows.

That is, when the playback apparatus 200 receives the BD-J object from an on-demand manufacture service or an electrical sell-through services (MODEST), the playback apparatus 200 creates a default directory and a MODEST directory under the root directory in the removable media, and creates the BDMV directory under the MODEST directory. The MODEST directory is a first MODEST directory. The first MODEST directory is created when the user receives the service for the first time. When the user receives the service for the second time onwards, the control unit in the playback apparatus 200 creates a MODEST directory corresponding to a service from the second time onwards.

As described in the above, acquiring the BD-J object in which the GUI management table is written, the control unit writes a start-up program in the default directory, and writes the BD-J object in the BDMV directory under the MODEST directory. This start-up program is a program to be executed first when the recording medium is loaded in the playback apparatus 200. The start-up program causes the playback apparatus 200: to display a menu from which user operation of selecting the BDMV directory is received, and to execute a root change function. This root change function is a function of causing the MODEST directory to which the BDMV directory belongs to be recognized as the root directory when the user performs the selection operation on the menu. The root change function makes it possible to execute the playback control based on the acquired BD-J object by the same control procedures as the control procedures for playing back the BD-ROM.

(Java™ Application)

The BD-J application may be, for example, an Electronic Commerce (EC) client application, or may be an online game played against opponents on the Internet. Furthermore, by working together with a search engine, various online services can be provided to the user.

(Units for Integrating the GUI Table)

Although in the embodiment, the GUI management object is provided in the BD-J object, the invention may be configured so as to provide the GUI management table to correlate PlayList information and PlayItem information, and so that the timing at which the current PlayList becomes the current PlayItem or when the current PlayItem becomes the specified PlayItem, the plane memory is released, and plane memories for stereoscopic playback and for planar playback may be reserved. This enables the area of the memory device to be managed with more precise time accuracy.

(Video Stream for Stereoscopic View)

Recording left view and right view video streams on a BD-ROM is only one example. Playback may also be provided by recording on the BD-ROM, for each picture, as an EnhancedView video stream, a video stream indicating per pixel depth values.

(Package to be Implemented)

When implementing an playback apparatus, the following BD-J Extensions are preferably implemented in the playback apparatus. The BD-J Extensions include various packages that have been specialized for providing functions exceeding GEM [1.0.2] to a Java™ format. Packages to which BD-J Extensions are provided are as follows.

org.bluray.media

This package provides specialized functions to be added to the Java™ Media FrameWork. Control for angles, audio, and subtitle selection are added to the package.

org.bluray.ti

This package includes a structure for referring to an API for operating by mapping "services" to "titles" according to GEM [1.0.2] and referring to title information from a BD-ROM, and a structure for selecting a new title.

org.bluray.application

This package includes an API for managing life cycles of applications. Also, this package includes an API for referring to necessary information for signaling when executing applications.

org.bluray.ui

This package includes a class that defines a constant number for key events specialized in the BD-ROM, and realizes synchronization with the video playback.

org.bluray.vfs

This package provides a binding scheme for binding contents that are recorded on the BD-ROM (on-disk contents) and contents in the Local Storage that are not recorded on the BD-ROM (off-disk contents) and playing back the contents seamlessly, regardless of the location of the contents.

The Binding Scheme correlates contents on the BD-ROM (AV clips, subtitles, BD-J applications) with related contents in the Local Storage. This Binding Scheme realizes seamless playback regardless of the location of the contents.

(Structure of the Graphics Plane)

When the image plane 8 and the interactive graphics plane 10 are composed of SDRAM, a unique control for shifting the coordinates of the pixel data pieces stored in the SDRAM is necessary.

The SDRAM includes a ROW address decoder that outputs a ROW address output at time-divided address pins to a memory array, a COLUMN address decoder that outputs a COLUMN address output at time-divided address pins to a memory array, a page data buffer that holds one page length worth of data read from the memory array, and outputs the one page length worth of data at the address pins. Since the SDRAM uses a condenser as a storage element, natural discharge occurs. For this reason, it is necessary in the SDRAM to perform refresh on the storage elements, and additional circuits must be added for performing refresh.

When a picture is stored in the SDRAM, the plane controller forms a command by compositing the states of RAS, CAS, WE, CS, and CKE, and by compositing the command and a composition of the addresses, reading and writing are performed. For example, when using a burst transfer mode, an activated command is issued, and a ROW address is issued at the address pin of the SDRAM. After a delay of a fixed time period, a READ command is issued, and the COLUMN address is issued at the address pin.

(Programming Language Application Range)

It is described in the embodiments that Java™ language is used as the virtual machine programming language. However, the language is not limited to Java™, and other programming languages, such as B-Shell, Perl Script, and ECMA Script, which are used in UNIX™ OS and the like, may also be used.

(Changing to Multidrive)

The above-described embodiments describe a BD-ROM as an example of a recording medium, and a BD-ROM drive as an example of a specific device fulfilling a function of reading data from the BD-ROM. However, a BD-ROM is merely one example, and it is also possible to perform the operations described in the above embodiments when an optical disk medium such as BD-R, BD-RE, DVD, or CD is used as the recording medium, data having the above-described data structure is stored on such recording medium, and there is a drive device capable of reading such recording medium.

The recording media of the embodiments include all types of package media such as optical disks, semi-conductor memory cards, etc. The recording media of the embodiments described, as an example, an optical disk (for example, a preexisting read-only optical disk such as a BD-ROM or a DVD-ROM). However, the present invention is not limited to this. For example, it is possible to implement the present invention by writing 3D contents, including data that is necessary for implementing the present invention and has been broadcast or distributed over a network, with use of a terminal device fulfilling a function of writing 3D contents (for example, the function may be included in the playback apparatus, or may be included in an apparatus other than the playback apparatus), on a writable optical disk (for example, a preexisting writable optical disk such as BD-RE or DVD-RAM).

Also, it is possible to implement the present invention when the recording medium is, besides an optical disk, for example, a removable medium such as an SD memory card (semiconductor memory card).

When a semiconductor memory is used instead of the BD-ROM, data in the read buffer 1 and the read buffer 2 is transferred to the heap memory 31, the dynamic scenario memory 23 and the static scenario memory 13 via an interface (memory card I/F) for reading the data in the semiconductor memory.

More specifically, when the semiconductor memory card is inserted into a slot (not shown) in the playback apparatus 200, the playback apparatus 200 and the semiconductor memory card are electrically connected to each other via the memory card I/F. The data recorded in the semiconductor memory card is transferred to the read buffer 1, the read buffer 2, the heap memory 31, the dynamic scenario memory 23 and the static scenario memory 13 via the memory card I/F.

From a standpoint, for example, of improving the confidentiality of data and copyright protection, there are cases in which portions of the data recorded on the BD-ROM are encoded as necessary.

For example, the encoded data of the data recorded on the BD-ROM may be, for example, data corresponding to a video stream, data corresponding to an audio stream, or data corresponding to a stream that includes both video and audio.

The following describes deciphering of encoded data that is among the data recorded on the BD-ROM.

In the playback apparatus, data corresponding to a key necessary for deciphering encoded data on the BD-ROM (for example, a device key) is recorded in the playback apparatus in advance.

Meanwhile, data corresponding to the key necessary for deciphering encoded data (for example, an MKB (media key block) corresponding to the device key) and data in which the key itself, for deciphering the encoded data, is encoded (for example an encoded title key corresponding to the device key and the MKB), is recorded on the BD-ROM. Here, the device key, the MKB, and the encoded title key correspond to each other, and furthermore correspond to an identifier (for example, a volume ID) written in an area that cannot be normally copied on the BD-ROM (an area called BCA). If this composition is not correct, the code cannot be deciphered. Only if the composition is correct, the key necessary for deciphering the code (for example, a decoded title key obtained by decoding the encoded title key based on the device key, the MKB and volume key, can be elicited, and with use of the key necessary for the encoding, the encoded data can be deciphered.

When the inserted BD-ROM is played back in the playback apparatus, encoded data cannot be played back unless the BD-ROM includes a device key that is paired with a title key or MKB (or corresponds to a title key or MKB). The reason is that the key necessary for deciphering the encoded data (the title key) is itself encoded when recorded on the BD-ROM (as an encoded title key), and if the composition of the MKB and the device key is not correct, the key necessary for deciphering the code cannot be elicited.

On the other hand, the playback apparatus is configured so that, if the composition of the encoded title key, MKB, device key, and volume ID is correct, the video stream is decoded, for example with use of the key necessary for deciphering the code (the decoded title key obtained by decoding the encoded title key based on the device key, the MKB and the volume ID), and the audio stream is decoded by the audio decoder.

Although in the present embodiments, a BD-ROM is described as an example of a recording medium, the recording medium is not limited to being a BD-ROM, and the present invention can be implemented even when using, for example, a readable/writable semiconductor memory (for example, a semiconductor memory card having a nonvolatile property such as an SD card).

For example, the playback apparatus may be configured to record data corresponding to data recorded on the BD-ROM on a memory card with use of digital distribution, and to play back the data from the semiconductor memory card. When distributing the necessary data with use of digital distribution and recording the distributed data, it is preferable to distribute the data after having performed partial or entire decoding of the distributed data as necessary, and leaving data that is necessary for the semiconductor memory card in an encoded state.

The following describes operation using, for example, digital distribution, for recording data (distributed data) corresponding to the data described in the above embodiments on the semiconductor memory.

The operations described above may be configured to be performed by the playback apparatus described in the embodiments, or by a terminal apparatus dedicated to recording distributed data on a semiconductor memory that is separate from the playback apparatus in the embodiments. Here, an example of the playback apparatus performing the operations is described. Also, an SD card is described as an example of the recording destination.

When recording distributed data to the SD memory card inserted in the slot of the playback apparatus, first, transmission is requested of the distributed data to a distribution server (not illustrated) that accumulates the distributed data. The playback apparatus reads, from the SD memory card, information for uniquely identifying the SD memory card that is inserted at the playback apparatus at this time (for example, a specific identification number assigned individually to the particular SD memory card, more specifically, a serial number of the SD memory card, etc.), and transmits the read identification information to the distribution server along with the distribution request.

This identification information for uniquely identifying the SD memory card corresponds to, for example, the above-described volume ID.

Meanwhile, in the distribution server, decoding is performed so that necessary data among the data that is distributed (video streams, audio streams, etc.) can be deciphered with use of the key that is necessary for deciphering the code (for example, the title key), and the necessary data is stored in the server.

For example, a private key is stored in the distribution server, and the distribution server is configured so that different public keys are dynamically created to correspond respectively to the semiconductor memory card-specific identification numbers.

Also, the distribution server is configured so that encoding is possible towards the key that is necessary for deciphering the encoded data itself (the title key) (in other words, configured so that an encoded title key can be generated).

The generated public key information includes information corresponding to the above-described MKB, volume ID, and encoded title key. If the composition of, for example, the semiconductor memory card-specific identification number, the actual public key included in the public key information described later, and the device key recorded in advance in the recording apparatus, is correct, the key necessary for deciphering the code (for example, the title key obtained by decoding the encoded title key based on, for example, the device key, the MKB, and the semiconductor memory card-specific identification number) is acquired, and with use of this acquired key (title key) necessary for deciphering the code, decoding of the encoded data can be performed.

Next, the playback apparatus records the received public key information and distributed data in the recording area of the semiconductor memory card inserted in the slot.

Next, the following describes an exemplary method for decoding and playing back encoded data, from among the data included in the public key information recorded in the recording area of the semiconductor memory card and the data included in the distribution data.

The received public key information is, for example, recorded on a device list indicating the public key itself (for example, the MKB and the encoded title key), signature information, the semiconductor memory card-specific identification number, and information pertaining to a device to be invalidated.

The signature information includes, for example, hash values of the public key information.

In the device list, information is recorded pertaining to, for example, an apparatus that is possibly performing unauthorized playback. This is for example a device key, an identification number of the playback apparatus, or an identification number of a decoder in the playback apparatus recorded in advance on the playback apparatus, information for uniquely specifying the device, a part included in the apparatus, or a function (program) of the apparatus possibly performing unauthorized playback.

The following description pertains to playback of encoded data from among the distribution data recorded in the recording area of the semiconductor memory card.

First, a check is performed pertaining to whether the encoded key itself may be operated before decoding the encoded data with use of the public key itself.

Specifically, the following checks are performed:

(1) whether there is a match between the semiconductor memory identification information included in the public key information and the specific identification number stored in advance on the semiconductor memory card, (2) whether there is a match between a hash value of the public key information calculated in the playback apparatus, and a hash value included in the signature information, and (3) whether, based on information indicated in the device list included in the public key information, the playback apparatus performing playback is possibly performing unauthorized playback (for example, by checking whether the device key included in the device list matches the device key stored in the playback apparatus in advance). These checks may be performed in any order.

Control is performed so that the playback apparatus does not decode the encoded data if any of the following is satisfied, in the above-described checks 1 to 3: i) the semiconductor memory-specific identification information included in the public key information does not match the specific identification number stored in advance on the semiconductor memory card, ii) the hash value of the public key information calculated in the playback apparatus does not match the hash value included in the signature information, or iii) a judgment is made that the playback apparatus performing the playback is possibly performing unauthorized playback.

Also, a judgment is made that the composition of the semiconductor memory-specific identification number, the public key included in the public key information, and the device key recorded in advance in the playback apparatus, is correct if i) the semiconductor memory card-specific identification information included in the public key information matches the specific identification number saved on the semiconductor memory card in advance, (ii), the hash value of the public key information calculated in the playback apparatus matches the hash value included in the signature information, and (iii) a judgment is made that the playback apparatus is not possibly performing unauthorized playback. When the composition is judged to be correct, the encoded data is deciphered with use of the key necessary for deciphering the code (based on a device key, the MKB and the semiconductor memory-specific identification number).

For example, when the encoded data is a video stream and an audio stream, the video decoder decodes (decodes) the video stream with use of the key necessary for deciphering the code (the title key obtained by decoding the encoded title key), and the audio decoder decodes (decodes) the audio stream with use of the key necessary for deciphering the code.

According to this type of structure, for any playback apparatus, parts, function (program), etc. that is possibly performing unauthorized use at the time of electronic distribution, information for the identification of such is provided to the device list, and if distribution is attempted, since playback decoding with use of public key information (the public key) can be suppressed on the playback apparatus side if information is included that is indicated in the device list, even if the composition of the semiconductor memory-specific identification number, the public key included in the public key information, and the device key recorded in the playback apparatus in advance, is correct, since control can be performed so that the deciphering of the encoded data is not performed, use of distributed data on an unauthorized device can be suppressed.

Also, it is preferable to use a structure in which the semiconductor memory card-specific identifier recorded in advance on the semiconductor memory card is stored in a highly confidential recording area. The reason is that when the specific number recorded on the semiconductor memory card (for example, in the example of an SD memory card, the SD memory card serial number, etc.) has been altered, illegal copying is facilitated. The reason is that different specific identification numbers are allocated to different semiconductor memory cards, but if the specific identification numbers are altered to be the same, the judgment in (1) becomes meaningless, and there is a possibility of illegal copying, corresponding to the number that was altered, being performed.

Accordingly, it is preferable for the information that is the semiconductor memory card-specific identification number to be recorded in a high-confidentiality recording area.

To realize this type of structure, for example by providing a recording area (called a second recording area) that is separate from the recording area (called a first recording area) that stores normal data as recording areas for recording high-confidentiality data that is semiconductor memory card-specific identifiers), and providing a control circuit for accessing the recording area, access to the second recording area can be made only via the control circuit.

For example, the data recorded in the second recording area has been encoded and recorded. For example, a circuit for decoding the encoded data is built into the control circuit. When there is access of the data in the second recording area via the control circuit, the structure need merely be such that the code is decoding and the decoded data is returned. Also, if the control circuit stores information of a storage location of data recorded in the second recording area, and there is a request to access the data, the corresponding storage location of the data need merely be specified, and the data read from the specified storage location be returned.

Upon issuing an access request to the data recorded in the second recording area to the control circuit via the memory card I/F (for example, semiconductor memory-specific identification number), applications that operate in the playback apparatus that request recording to the semiconductor memory card with use of digital distribution, the control circuit that received the request reads the data recorded in the second recording area and returns the data to the application operating in the playback apparatus. Along with the semiconductor memory card-specific identification number, the distribution request for the necessary data need only be requested from the distribution server, and the public key information sent from the distribution server and the corresponding request for distribution of the data, may be recorded to the first recording area.

Also, an application operating in the playback apparatus, that requests recording on the semiconductor memory card with use of digital distribution, before issuing the request to the control circuit via the memory card I/F to access the data recorded on the second recording area (for example, the semiconductor memory card-specific identification numbers), preferably checks in advance whether the application has been altered. For example, a digital certificate compliant with preexisting X.509 specifications may be used in the check for alteration.

Also, access to the distribution data recorded in the first recording area of the semiconductor memory card need not necessarily be access via a control circuit on the semiconductor memory card.

(Implementation as a Program)

The application program described in the embodiments can be made as described below. First, the software developer, with use of a programming language, writes a source program to realize the content of the flowcharts and the functional structural elements. When writing the source program that embodies the content of the flowcharts and the functional structural elements, the software developer uses the class structures, variables, array variables, and external function calls to write the program in accordance with the syntax of the programming language.

The written source programs are given as files to a compiler. The compiler translates the source programs and creates an object program.

The translation by the compiler is made up of the processes of syntax analysis, optimization, resource allocation, and code generation. Syntax analysis involves performing lexical analysis and semantic analysis of the source programs, and converting the source programs to an intermediary program. Optimization involves performing operations to divide the intermediary program into basic blocks, analyze the control flow of the intermediary program, and analyze the data flow of the intermediary program. In resource allocation, to improve suitability with a command set of a targeted processor, variables in the intermediary program are allocated to a register or a memory in a targeted processor. Code generation is performed by converting the intermediary commands in the intermediary program into program code, and obtaining an object program.

The object program generated here is made up of one or more program codes for executing, on a computer, the steps of the flowcharts and the various processes carried out by the functional structural elements in the embodiments. Here, program code may be any of various types such as native code of a processor or JAVA byte code. There are various formats for realization of the steps by the program code. If it is possible to use external functions to realize the steps, call texts that call such functions become program code. Also, there are cases in which a program code for realizing one step is attributed to separate object programs. In a RISC processor in which command types are limited, the steps of the flowcharts may be realized by compositing calculation operation commands, logical calculation commands, branch instruction commands, etc.

When the object programs have been created, the programmer starts up a linker. The linker allocates the object programs and library programs to memory spaces, composites the object programs and library programs into one, and generates a load module. The load module generated thus is anticipated to be read by a computer, and causes the computer to execute the processing procedures and functional structural components shown in the flowcharts. The programs may be provided to users by being recorded on a recording medium that is readable by a computer.

(Singular Implementation of the LSI)

The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Planar view Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus 101.

Such a system LSI can be embedded into various types of devices that can play back images, such as a television, game machine, personal computer, one segment mobile phone, as well as into the playback apparatus 102. The system LSI thus greatly broadens the use of the present invention.

When an elementary buffer, video decoder, audio decoder, and graphics decoder are integrated into a system LSI, it is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, instruction cache, data RAM, and data cache; processing unit that is composed of instruction fetch unit, decoder, execution unit, and register file; and virtual multi processing unit that causes the processing unit to execute a parallel execution of a plurality of applications.

MPU Block

The MPU block is composed of: peripheral circuits such as ARM core, external bus interface (Bus Control Unit: BCU), DMA controller, timer, vector interrupt controller; and peripheral interfaces such as UART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of internal bus connection unit for controlling internal connection between blocks, access control unit for transferring data with the SD-RAM connected to outside of the system LSI, and access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and bandwidths necessary for the constituent elements are reserved. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback apparatus 200 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output compositions described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

In the embodiment, the invention is realized by middleware and hardware corresponding to the system LSI, hardware other than the system LSI, an interface portion corresponding to the middleware, an interface portion to intermediate between the middleware and the system LSI, an interface portion to intermediate between the middleware and the necessary hardware other than the system LSI, and a user interface portion, and when integrating these elements to form the playback apparatus, particular functions are provided by operating the respective elements in tandem.

Appropriately defining the interface corresponding to the middleware and the interface for the middleware and the system LSI enables parallel, independent development of the user interface portion, the middleware portion, and the system LSI portion of the playback apparatus respectively, and enables more efficient development. Note that there are various ways of dividing up the respective interface portions. For example, when the described video recorder 5a, video recorder 5b, audio decoder 9, and composite unit 15 are included on a chip in the system LSI 102, development of an interface portion between the middleware to control these units and the middleware corresponding to these units is performed when developing the chip. After completion, including the developed middleware and interface portion in a storage unit such as a memory of the playback apparatus, along with integrating the chip into the playback apparatus, enables performing development of the playback apparatus and the chip in parallel, thereby improving development efficiency.

Versatility is improved when the same interface portion is used regardless of the type of developed chip and the middleware pertaining to the developed chip.

Needless to say, the portion structured as a system LSI in the above description is not limited to being structured as an LSI, and may instead be configured with use of a signal processing circuit that includes corresponding functions to those to be included in the system LSI.

INDUSTRIAL APPLICABILITY

The present application relates to a technique of compositing subtitles and graphics with a stereoscopic video stream, and displaying the resultant data in the playback apparatus that plays back the stereoscopic video stream, and is particularly applicable in a stereoscopic video playback apparatus that composites the subtitles and the graphics as well as the stereoscopic video stream, and outputs the resultant data stereoscopically.

DESCRIPTION OF REFERENCE NUMERALS

100 BD-ROM
200 playback apparatus
300 remote control
400 TV
500 crystal liquid shutter glasses
101 front end unit
102 system LSI
103 memory device
104 back end unit
105 nonvolatile memory
106 host microcomputer
107 network I/F
110 BD drive
111 local storage
1, 2 read buffer
3 virtual file system
4 demultiplexer
5a, 5b video decoder
6 video plane
7a, 7b image decoder
7c, 7d image memory
8 image plane
9 audio decoder
10 interactive graphics plane
11 background plane
12 playback state/setting register (PSR) set
13 static scenario memory
14 playback control engine
15 composition unit
16 HDMI transmission/reception unit
17 left-right processing storage unit
18 display function flag holding unit
19 plane shift engine
20 offset setting unit
22 BD-J platform
23 dynamic scenario memory
24 mode management module
25 HDMV module
26 UO detection module
27a still image memory
27b still image decoder
28 display mode setting initial display setting unit
29 display mode storage unit

The invention claimed is:

1. A playback apparatus that executes stereoscopic playback, the playback apparatus comprising:
a video decoder operable to decode a video stream to obtain video frames;
a video plane that holds the video frames;
a graphics plane that holds graphics data, the graphics data having a resolution of a predetermined number of horizontal and vertical pixels;
a compositer operable to composite the graphics data within the graphics plane with one of the video frames; and
a shift engine operable to perform plane shifting of the graphics plane, wherein
each of the video frames in the video plane is output as one of a right-view video frame and a left-view video frame, and
the plane shifting of the graphics plane includes:
prior to compositing the left-view video frame by the compositor, shifting each pixel of pixels of the graphics data within the graphics plane in one of a right direction and a left direction;
prior to compositing the right-view video frame by the compositor, shifting each pixel of the pixels of the graphics data within the graphics plane in an opposite direction from a shift direction of the graphics data prior to compositing the left-view video frame, and then transmitting resulting shifted graphics data within the graphics plane to the compositer for composition;
cropping a first rectangle area on an end portion of the graphics data in the one of the left direction and the right direction in which the shifting prior to compositing one of the left-view video frame and the right-view video frame is performed; and
adding a second rectangle area composed of transparent pixels to an opposite end of the end portion where the cropping is performed, in the graphics data of the graphics plane.

2. The playback apparatus of claim 1, wherein
a first size of the first rectangle area and a second size of the second rectangle area are defined as:
a horizontal pixel value defined by a shift amount of the graphics plane multiplied by a vertical pixel value defined by a height of the graphics plane.

3. The playback apparatus of claim 2, wherein
when the shift engine shifts coordinates of each pixel of the pixels of the graphics data in the left direction, the first rectangle area is a left end portion of the graphics plane, and
when the shift engine shifts the coordinates of each pixel of the pixels of the graphics data in the right direction, the first rectangle area is a right end portion of the graphics plane.

4. The playback apparatus of claim 1, further comprising:
a reader operable to read, from a recording medium, playlist information and an audio-visual stream referred to by the playlist information; and
a demultiplexer operable to demultiplex the audio-visual stream to acquire a video stream, wherein
an offset is embedded in the playlist information, and a shift amount by which coordinates of the pixels are shifted during the plane shifting of the graphics plane is calculated based on the offset embedded in the playlist information.

5. The playback apparatus of claim 1, further comprising:

a scalar operable to perform an enlarging/shrinking process on the graphics data of graphics plane, wherein the shifting of each of the pixels during the plane shifting of the graphics plane is applied to the graphics data after the enlarging/shrinking process is completed.

6. A playback method for executing stereoscopic playback on a computer, the playback method comprising:

decoding a video stream to obtain video frames, and storing the video frames in a video plane on the computer;

compositing graphics data within a graphics plane with one of the video frames; and performing plane shifting of the graphics plane, wherein each of the video frames in the video plane is output as one of a right-view video frame and a left-view video frame, and the plane shifting of the graphics plane includes:

prior to compositing the left-view video frame in the compositing, shifting each pixel of pixels of the graphics data within the graphics plane in one of a right direction and a left direction;

prior to compositing the right-view video frame in the compositing, shifting each pixel of the pixels of the graphics data within the graphics plane in an opposite direction from a shift direction of the graphics data prior to compositing the left-view video frame, and then using resulting shifted graphics data within the graphics plane in the compositing;

cropping a first rectangle area on an end portion of the graphics data in the one of the left direction and the right direction in which the shifting prior to compositing one of the left-view video frame and the right-view video frame is performed; and adding a second rectangle area composed of transparent pixels to an opposite end of the end portion where the cropping is performed, in the graphics data of the graphics plane.

7. A non-transitory computer-readable recording medium storing a program for causing a computer to execute stereoscopic playback, the program causing the computer to execute:

decoding a video stream to obtain video frames, and storing the video frames in a video plane on the computer;

compositing graphics data within a graphics plane with one of the video frames; and performing plane shifting of the graphics plane, wherein each of the video frames in the video plane is output as one of a right-view video frame and a left-view video frame, and the plane shifting of the graphics plane includes:

prior to compositing the left-view video frame in the compositing, shifting each of pixels of the graphics data within the graphics plane in one of a right direction and a left direction;

prior to compositing the right-view video frame in the compositing, shifting each pixel of the pixels of the graphics data within the graphics plane in an opposite direction from a shift direction of the graphics data prior to compositing the left-view video frame, and then using resulting shifted graphics data within the graphics plane in the compositing;

cropping a first rectangle area on an end portion of the graphics data in the one of the left direction and the right direction in which the shifting prior to compositing one of the left-view video frame and the right-view video frame is performed; and adding a second rectangle area composed of transparent pixels to an opposite end of the end portion where the cropping is performed, in the graphics data of the graphics plane.

* * * * *

UNITED STATES PATENT AND TRADEMARK OFFICE
CERTIFICATE OF CORRECTION

| | | |
|---|---|---|
| PATENT NO. | : 8,306,387 B2 | Page 1 of 1 |
| APPLICATION NO. | : 12/508207 | |
| DATED | : November 6, 2012 | |
| INVENTOR(S) | : Ken Yamashita et al. | |

It is certified that error appears in the above-identified patent and that said Letters Patent is hereby corrected as shown below:

On the Cover Page; (54) and Col. 1, line 1, Title, change
"PLAY BACK APPARATUS," to --PLAYBACK APPARATUS,--.

At column 60, line 64 (claim 4, line 4) of the printed patent, please change
"information; and
a demultiplexer operable to demultiplex the audio-visual stream to acquire a
    video stream, wherein
an offset is embedded in the playlist information, and
a shift amount by which coordinates of the pixels are shifted during the plane
    shifting of the graphics plane is calculated based on the offset embedded
    in the playlist information." to
--information, wherein
an offset is embedded in a header area of the video stream that is multiplexed
    into the audio-visual stream, and
a shift amount by which coordinates of the pixels of the graphics data are shifted
    during the plane shifting of the graphics plane is calculated based on the
    offset.--

Signed and Sealed this
Twelfth Day of February, 2013

Teresa Stanek Rea
*Acting Director of the United States Patent and Trademark Office*